US011312571B2

(12) United States Patent
Garcia et al.

(10) Patent No.: US 11,312,571 B2
(45) Date of Patent: Apr. 26, 2022

(54) STACKABLE INVENTORY STORAGE MODULES, STORAGE SYSTEMS, AND METHODS OF USING THE SAME

(71) Applicant: AMAZON TECHNOLOGIES, INC., Seattle, WA (US)

(72) Inventors: Benjamin Douglas Garcia, Seattle, WA (US); William Scott Kalm, Seattle, WA (US); Vahideh Kamranzadeh, Seattle, WA (US); Dinesh Mahadevan, Seattle, WA (US); Seshachalamgupta Motamarri, Seattle, WA (US); Tyson Wittrock, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 225 days.

(21) Appl. No.: 16/478,415

(22) PCT Filed: Jan. 16, 2018

(86) PCT No.: PCT/US2018/013922
§ 371 (c)(1),
(2) Date: Jul. 16, 2019

(87) PCT Pub. No.: WO2018/136443
PCT Pub. Date: Jul. 26, 2018

(65) Prior Publication Data
US 2020/0385209 A1 Dec. 10, 2020

Related U.S. Application Data

(63) Continuation-in-part of application No. 15/797,562, filed on Oct. 30, 2017, now Pat. No. 10,815,082, (Continued)

(51) Int. Cl.
*G06F 7/00* (2006.01)
*B65G 1/137* (2006.01)
(Continued)

(52) U.S. Cl.
CPC .......... *B65G 1/1373* (2013.01); *B65G 1/026* (2013.01); *B65G 1/127* (2013.01); *B65G 35/06* (2013.01)

(58) Field of Classification Search
CPC ...... B65G 1/1373; B65G 35/06; B65G 1/127; B65G 1/026; G06Q 10/08; G06Q 50/28
(Continued)

(56) References Cited

U.S. PATENT DOCUMENTS 1,905,924 A 4/1933 MacLauchlan
2,999,579 A 9/1961 Kostrzewa
(Continued)

FOREIGN PATENT DOCUMENTS

DE 2013005 A1 9/1971
DE 2552914 A1 6/1976
(Continued)

OTHER PUBLICATIONS

U.S. Appl. No. 15/408,128, filed Jan. 17, 2017, Battles et al.
(Continued)

*Primary Examiner* — Yolanda R Cumbess
(74) *Attorney, Agent, or Firm* — BakerHostetler

(57) ABSTRACT

In one embodiment, an inventory storage module has a first conveyor segment, a second conveyor segments offset from the first segment along a vertical direction, a first vertical lift at a first end of the module, and a second vertical lift at a second end of the module, which together define a movement path that is elongate along a longitudinal direction between the first and second ends. The storage module can translate inventory storage containers around the movement path until a desired one of the inventory storage containers is presented at one of the first end and the second end. In
(Continued)

another embodiment, a plurality of instances of the storage module are arranged in a vertical stack of independently controllable storage modules.

20 Claims, 31 Drawing Sheets

Related U.S. Application Data which is a continuation-in-part of application No. 15/656,738, filed on Jul. 21, 2017, now Pat. No. 10,287,097, which is a continuation-in-part of application No. 15/656,642, filed on Jul. 21, 2017, now Pat. No. 10,322,878, which is a continuation-in-part of application No. 15/656,552, filed on Jul. 21, 2017, now Pat. No. 10,696,480, which is a continuation-in-part of application No. 15/408,207, filed on Jan. 17, 2017, now Pat. No. 10,273,085, which is a continuation-in-part of application No. 15/408,182, filed on Jan. 17, 2017, now Pat. No. 10,179,695, which is a continuation-in-part of application No. 15/408,128, filed on Jan. 17, 2017, now Pat. No. 10,239,690.

(51) Int. Cl.
   - *B65G 35/06* (2006.01)
   - *B65G 1/127* (2006.01)
   - *B65G 1/02* (2006.01)

(58) Field of Classification Search
   USPC .................. 700/213–216, 218, 228, 230
   See application file for complete search history.

(56) References Cited

U.S. PATENT DOCUMENTS

| | | | |
|---|---|---|---|
| 3,184,030 A | 5/1965 | Herbert | |
| 3,809,208 A | 5/1974 | Shields | |
| 3,904,022 A | 9/1975 | Lutz | |
| 4,093,086 A | 6/1978 | Lucas et al. | |
| 4,346,803 A | 8/1982 | Haessler et al. | |
| 4,372,723 A | 2/1983 | De Coene et al. | |
| 4,378,873 A | 4/1983 | Cloudy | |
| 4,465,417 A | 8/1984 | Baumann et al. | |
| 4,645,058 A | 2/1987 | Meyn | |
| 4,934,507 A | 6/1990 | Blocker | |
| 4,972,937 A | 11/1990 | Aarts | |
| 5,387,064 A | 2/1995 | Cardinal | |
| 5,465,827 A | 11/1995 | Nakagawa et al. | |
| 5,472,309 A * | 12/1995 | Bernard, II | B65G 1/0485 |
| | | | 414/807 |
| 5,707,199 A | 1/1998 | Faller | |
| 6,059,229 A | 5/2000 | Luria | |
| 6,098,786 A | 8/2000 | Brumm et al. | |
| 6,336,549 B1 | 1/2002 | Jen | |
| 6,626,282 B1 | 9/2003 | Nishizawa et al. | |
| 6,752,583 B2 | 6/2004 | Rajewski | |
| 6,784,391 B2 | 8/2004 | Takizawa | |
| 6,814,214 B2 | 11/2004 | Warlow et al. | |
| 6,814,221 B2 | 11/2004 | Goussev | |
| 7,090,068 B2 | 8/2006 | Matsuo | |
| 7,381,022 B1 | 6/2008 | King | |
| 7,637,367 B1 | 12/2009 | Cannell | |
| 7,798,305 B2 | 9/2010 | Camelli | |
| 8,308,418 B2 | 11/2012 | Ma et al. | |
| 8,807,320 B2 | 8/2014 | Fortenbery et al. | |
| 8,882,433 B2 | 11/2014 | Bonora et al. | |
| 8,939,296 B2 | 1/2015 | Weyler et al. | |
| 8,972,045 B1 | 3/2015 | Mountz et al. | |
| 9,028,613 B2 | 5/2015 | Kim et al. | |
| 9,139,363 B2 | 9/2015 | Lert | |
| 9,434,558 B2 | 9/2016 | Criswell | |
| 9,520,012 B2 | 12/2016 | Stiernagle | |
| 9,550,626 B2 | 1/2017 | Parodi et al. | |
| 9,630,545 B1 | 4/2017 | Corrigan et al. | |
| 9,718,625 B2 | 8/2017 | Huang | |
| 9,796,527 B1 | 10/2017 | Kaukl et al. | |
| 10,322,878 B2 | 6/2019 | Mahadevan et al. | |
| 10,807,798 B1 | 10/2020 | Kalm et al. | |
| 10,815,082 B2 | 10/2020 | Kalm et al. | |
| 2008/0093313 A1 | 4/2008 | Huber | |
| 2008/0298943 A1 | 12/2008 | Siegel et al. | |
| 2010/0316468 A1 | 12/2010 | Lert et al. | |
| 2011/0313811 A1 | 12/2011 | Urban et al. | |
| 2012/0118699 A1 | 5/2012 | Buchmann et al. | |
| 2015/0098775 A1 | 4/2015 | Razumov | |
| 2015/0175354 A1 | 6/2015 | Kharkover | |
| 2015/0178673 A1 | 6/2015 | Penneman | |
| 2015/0352721 A1 | 12/2015 | Wicks et al. | |
| 2015/0360865 A1 | 12/2015 | Massey | |
| 2016/0075512 A1 | 3/2016 | Lert, Jr. | |
| 2016/0178033 A1 | 6/2016 | Chung | |
| 2016/0214796 A1 | 7/2016 | Stefani et al. | |
| 2017/0036859 A1 | 2/2017 | Lopes Ribeiro | |
| 2017/0107056 A1 | 4/2017 | Kadaba et al. | |
| 2017/0225890 A1 | 8/2017 | Li | |
| 2018/0037410 A1 | 2/2018 | DeWitt | |
| 2018/0201445 A1 | 7/2018 | Battles et al. | |
| 2018/0215534 A1 | 8/2018 | Munholland | |
| 2018/0346242 A1 | 12/2018 | Grosse et al. | |

FOREIGN PATENT DOCUMENTS

| | | | | |
|---|---|---|---|---|
| DE | 2552914 A1 * | 6/1976 | ............. | B65G 1/127 |
| DE | 3941754 A1 | 6/1991 | | |
| DE | 102013008872 A1 | 11/2014 | | |
| FR | 2292646 A1 | 6/1976 | | |
| GB | 1516120 A | 6/1978 | | |
| JP | S54-031175 A | 3/1979 | | |
| JP | 61-114907 A | 6/1986 | | |
| JP | H01-162611 A | 6/1989 | | |
| JP | H05-294181 A | 11/1993 | | |
| JP | H05-294412 A | 11/1993 | | |
| JP | H05-319517 A | 12/1993 | | |
| WO | WO 2002/074663 A1 | 9/2002 | | |
| WO | WO 2007/036250 A1 | 4/2007 | | |
| WO | WO 2014/092145 A1 | 6/2014 | | |
| WO | WO 2015/147033 A1 | 10/2015 | | |

OTHER PUBLICATIONS

U.S. Appl. No. 15/408,207, filed Jan. 17, 2017, Battles et al.
U.S. Appl. No. 15/408,182, filed Jan. 17, 2017, Battles et al.
U.S. Appl. No. 15/721,280, filed Sep. 29, 2017, Kalm et al.
"Vertical Lift Modules—Shuttle XP Family Flexible Storage Solutions in a Compact Footprint"; http://www.kardexremstar.com/us/materials-handling-storage-solutions/vertical-lift-modules.html; kardexremstar; accessed Mar. 16, 2018; 8 pages.
"Modular Diamond Phoenix Horizontal Carousels"; https://www.modula.us/products/modula-diamond-phoenix-horizontal-carousels.html; Modula HC; accessed Mar. 16, 2018; 6 pages.
"Robots are AutoStore's iconic laborers"; http://www.autostoresystem.com/Products/Robot; AutoStore; accessed Mar. 19, 2018; 5 pages.
"3D-Matrix Solution"; https://www.ssi-schaefer.com/en-us/products/order-picking/automated-order-picking/3d-matrix-solution-53844; SSI Schafer; accessed Mar. 19, 2018; 4 pages.
"Dematic Multishuttle 2"; http://www.dematic.com/en-us/supply-chain-solutions/by-technology/storage-systems/dematic-multishuttle-2/; Dematic; accessed Mar. 19, 2018; 6 pages.
"AS/RS Solutions"; https://www.intelligrated.com/solutions/asrs-solutions; Honeywell Integrated; © 2018; accessed Mar. 19, 2018; 2 pages.
"AS/RS Systems for Distribution & Manufacturing"; http://www.cisco-eagle.com/material-handling-systems/asrs-systems; Cisco-Eagle; © 2018; accessed Mar. 19, 2018; 6 pages.
"Power Automation Systems—PowerStor Deep Lane ASRS"; https://www.youtube.com/watch?v=zJOAVOWluro; Power Automation Systems; Sep. 2011; accessed Mar. 19, 2018; 2 pages.

(56) References Cited

OTHER PUBLICATIONS

"AutoStore Logistic—Technical presentation"; htttps://www.youtube.com/watch?v=iyVDMp2bL9c; Aug. 2009; accessed Mar. 19, 2018; 3 pages.

"Scalable multi-level shuttle Navette at Karl Storz: A future-proof investments"; https://www.youtube.com/watch?v=iEvqkQFp1Uw; SSI Schafer; Jun. 2016; accessed Mar. 19, 2018; 2 pages.

"Automated Vertical Carousels"; https://www.youtube.com/watch?v=5STR9jKABxQ; Cisco-Eagle; Dec. 2015; accessed Mar. 19, 2018; 2 pages.

International Patent Application No. PCT/US2018/013922; Int'l Search Report and the Written Opinion; dated Jun. 21, 2018; 16 pages.

International Patent Application No. PCT/US2018/013920; Int'l Search Report and the Written Opinion; dated Jun. 21, 2018; 16 pages.

International Patent Application No. PCT/US2018/013922; Written Opinion; dated Jan. 23, 2019; 8 pages.

\* cited by examiner

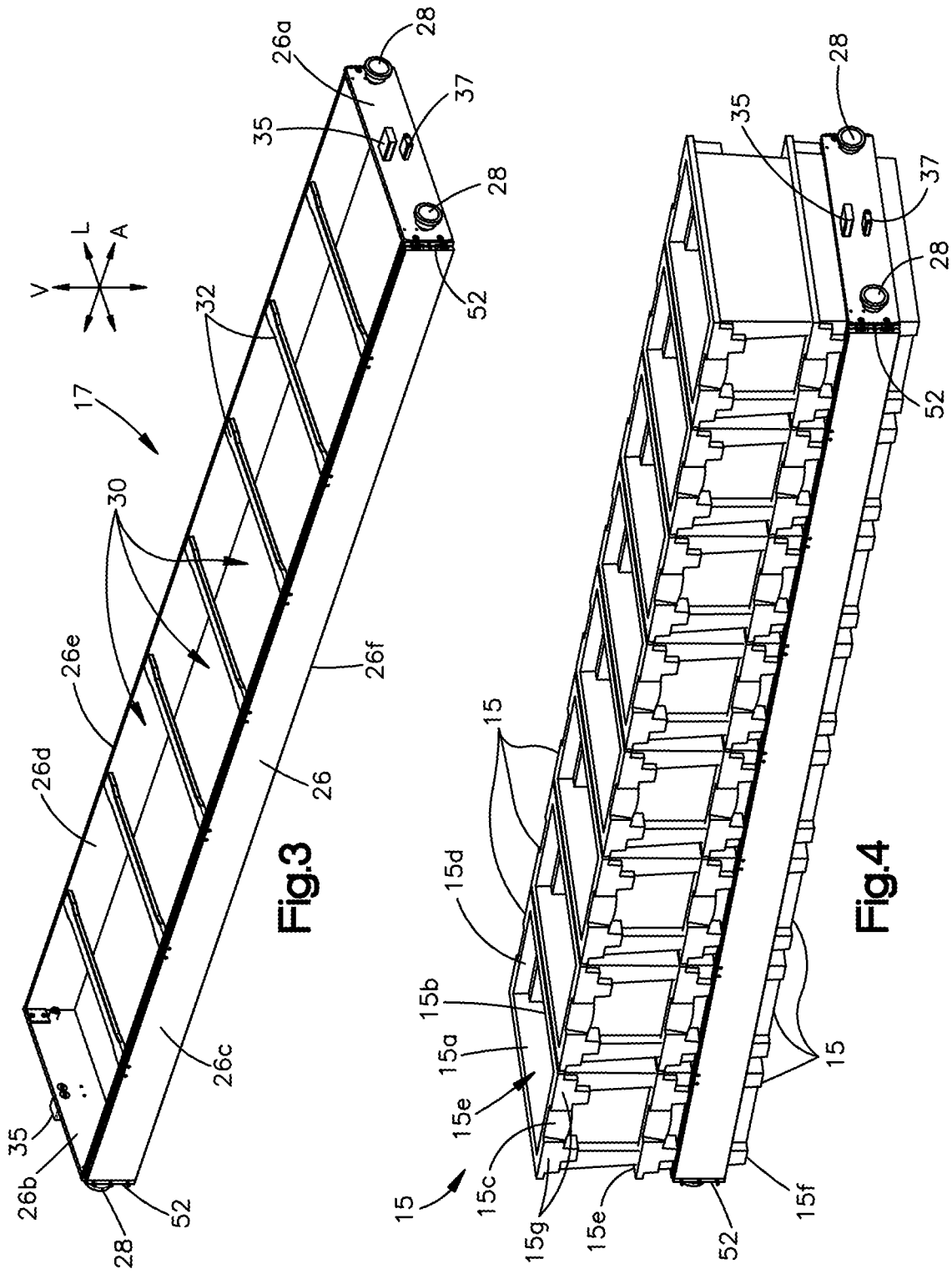

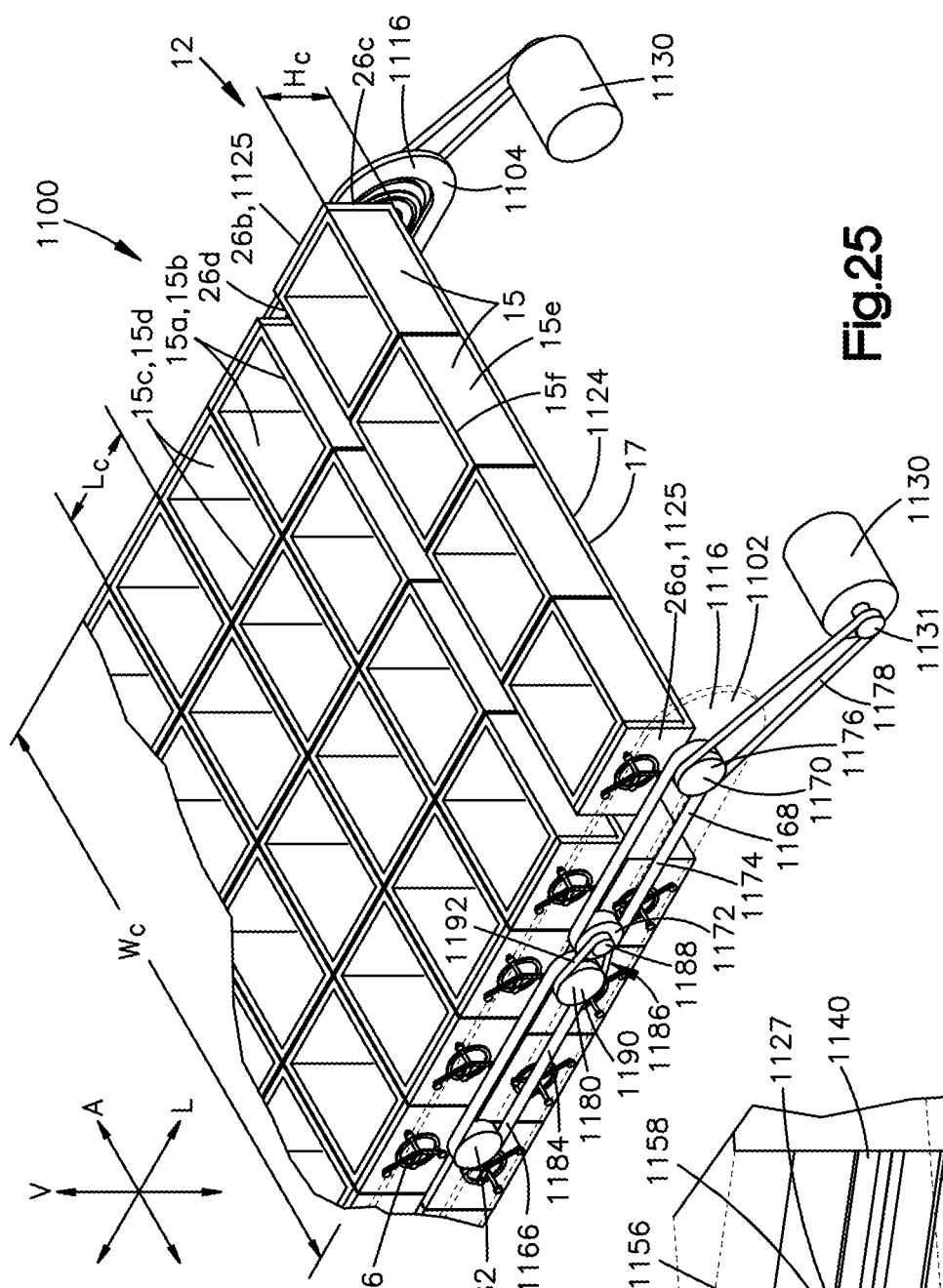
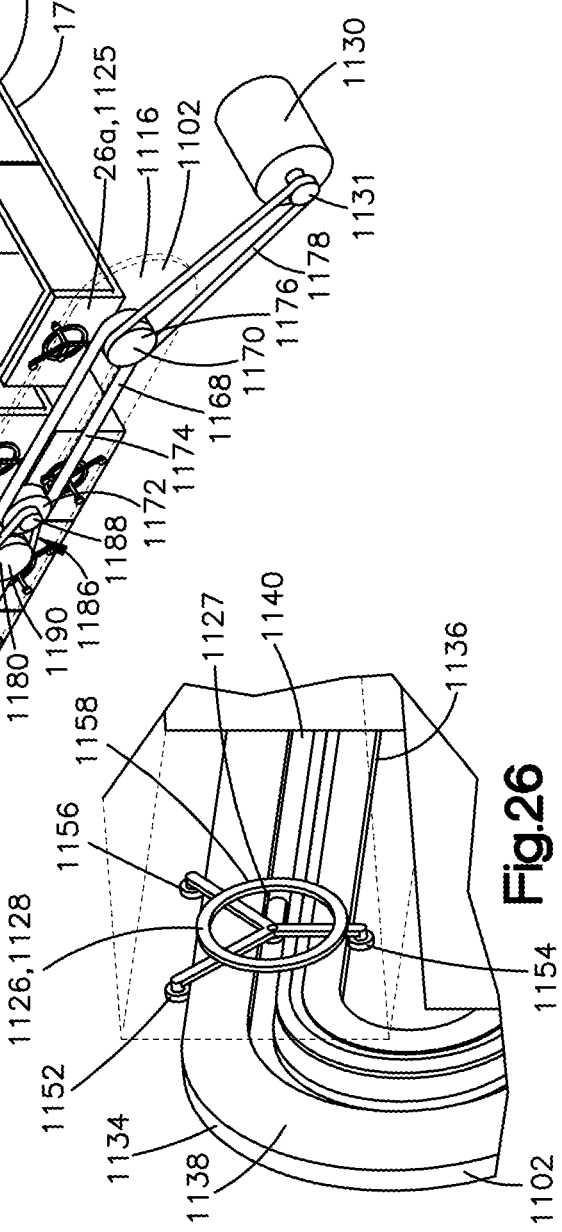
Fig.25
Fig.26

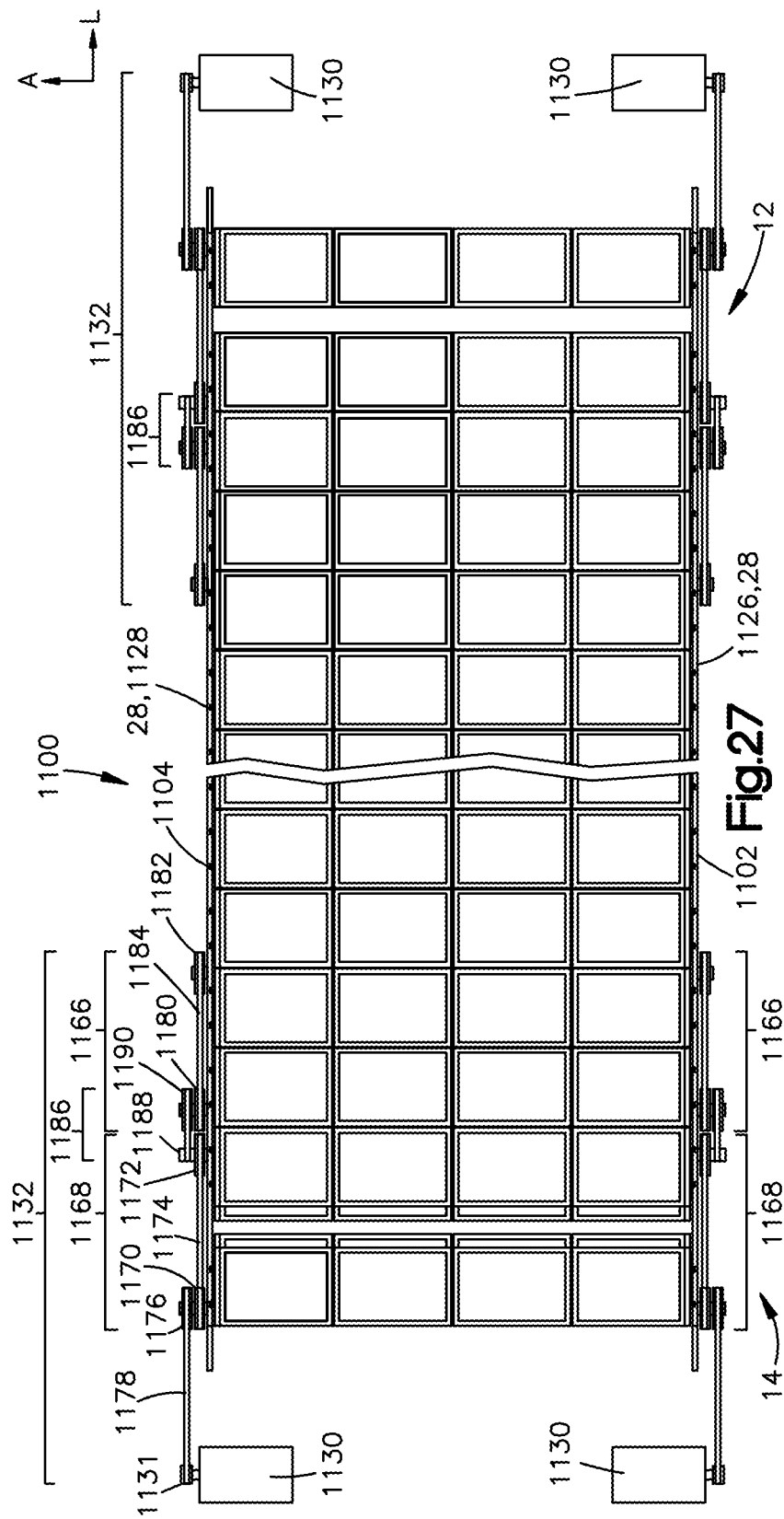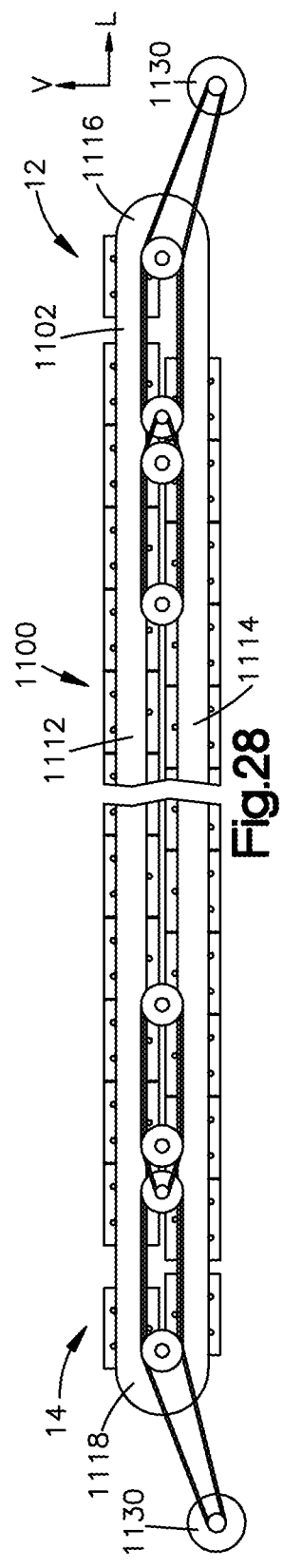

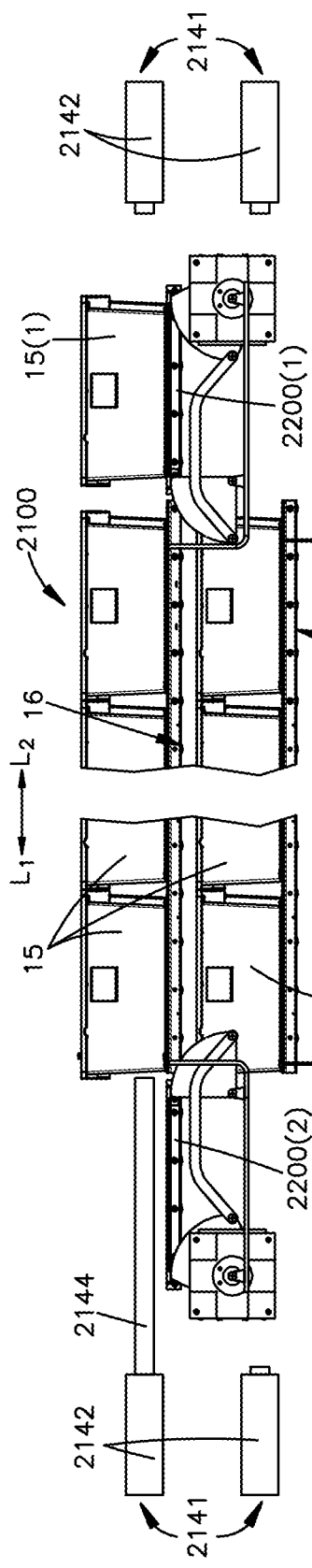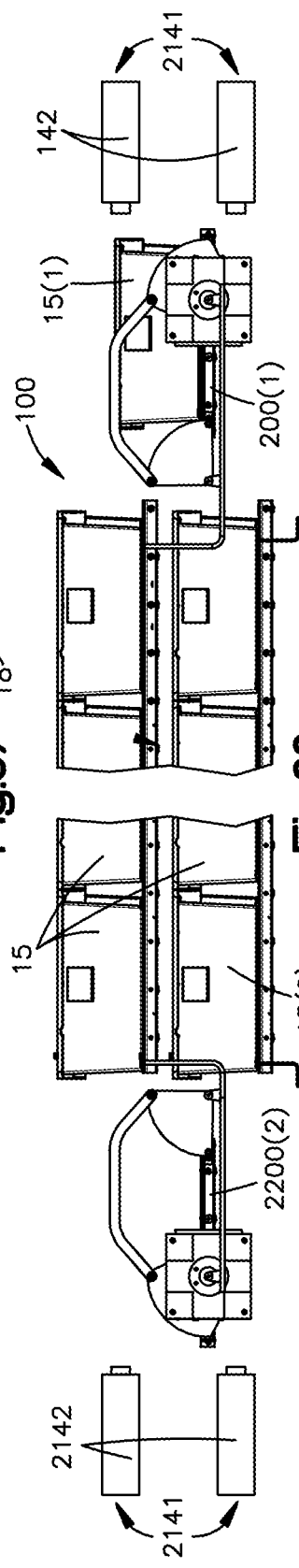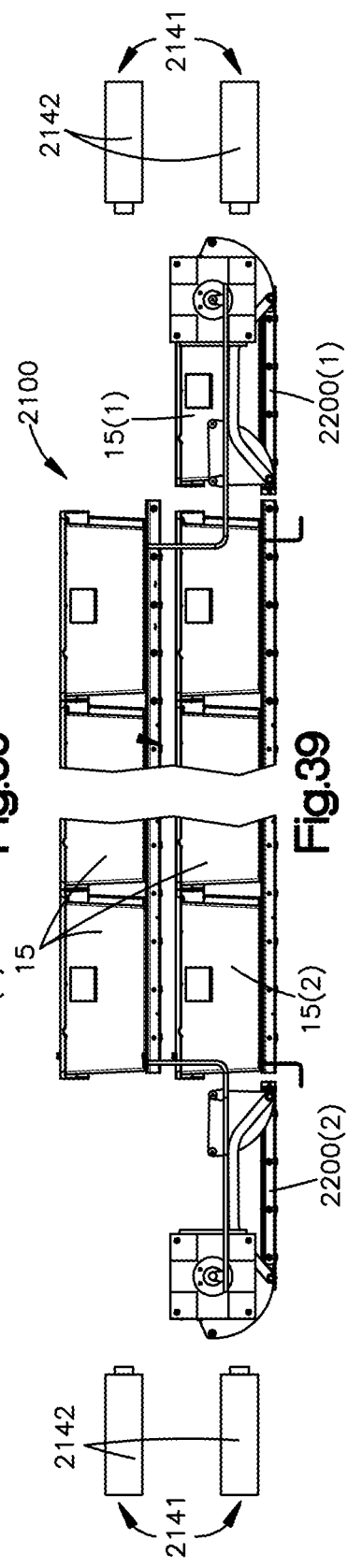

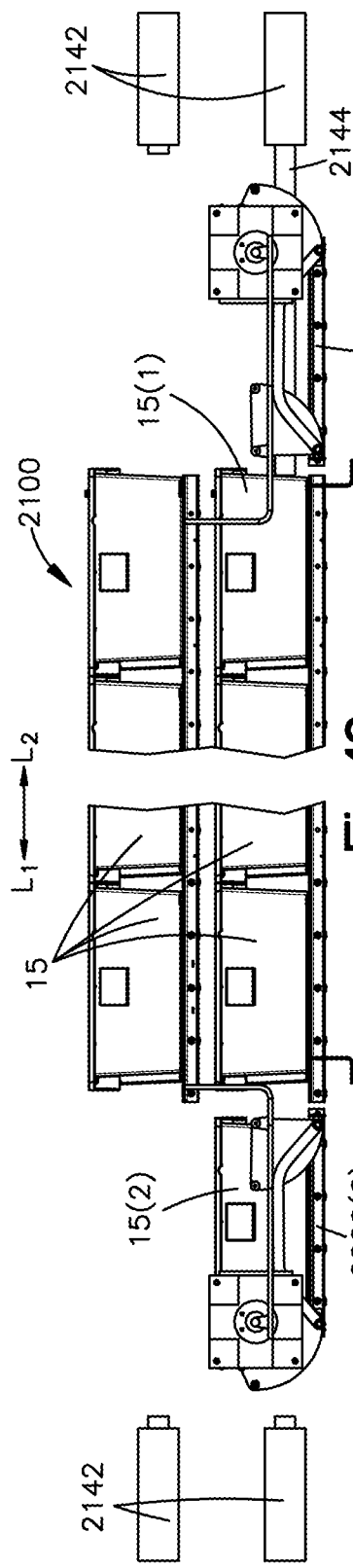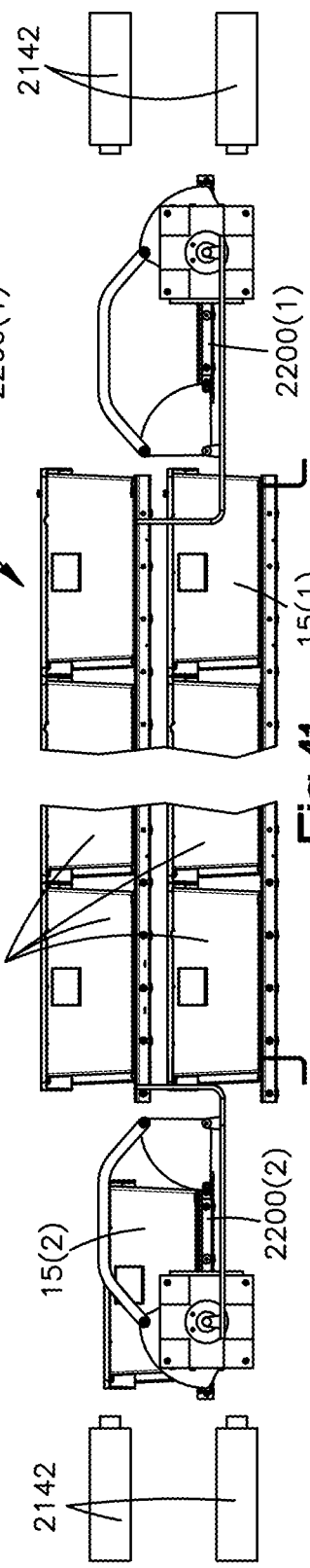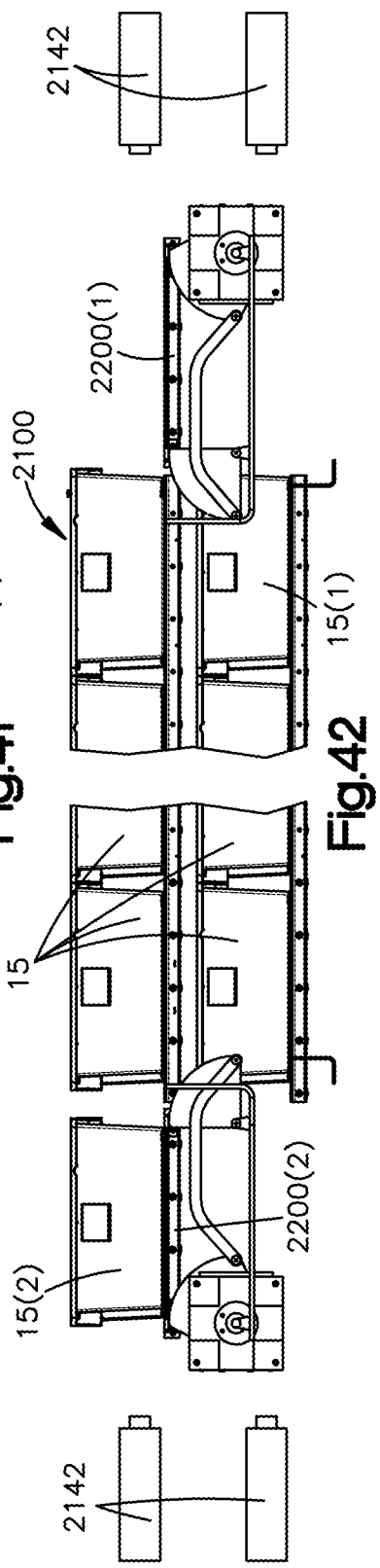

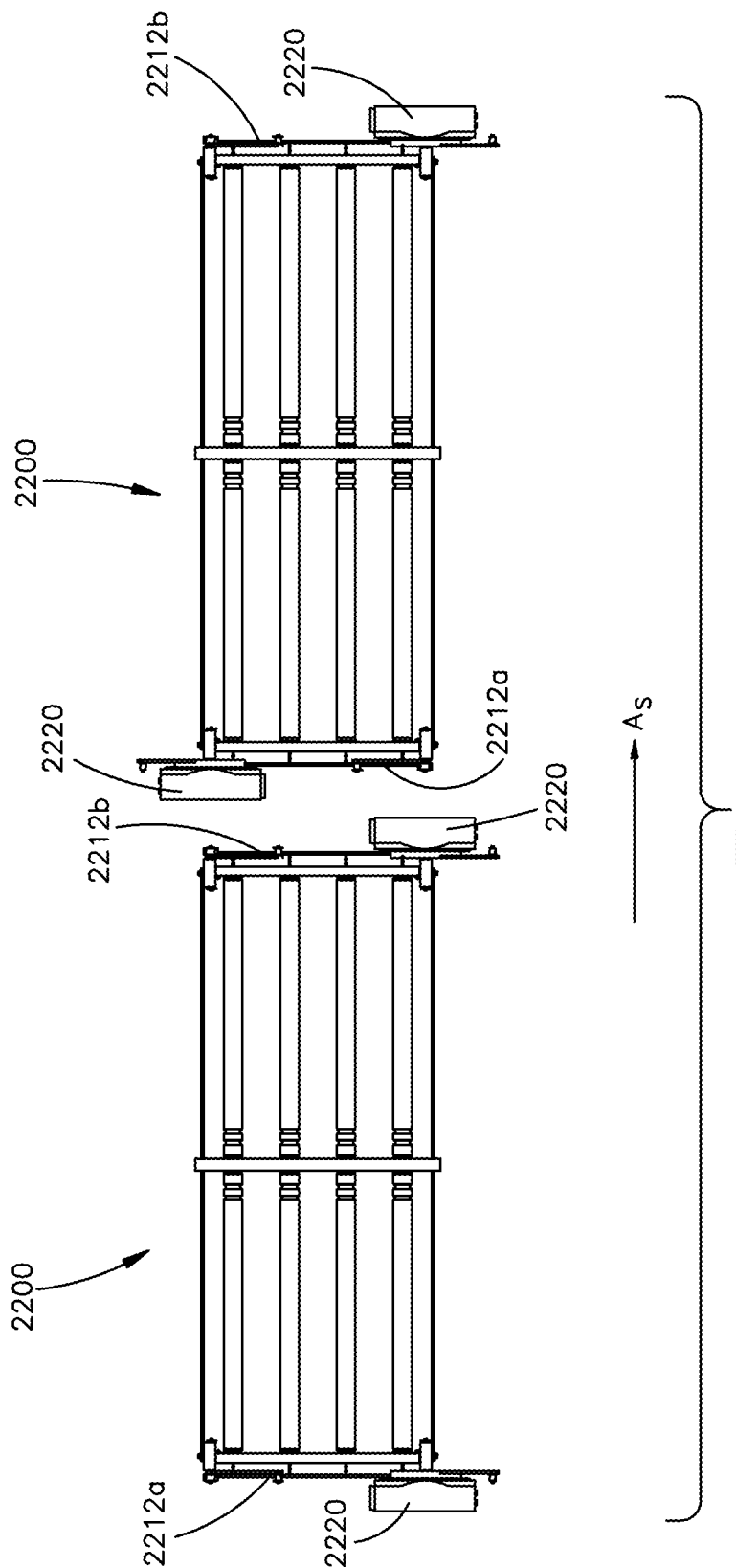

STACKABLE INVENTORY STORAGE MODULES, STORAGE SYSTEMS, AND METHODS OF USING THE SAME

CROSS-REFERENCE TO RELATED CASES

This application is a U.S. national stage application of International Patent Application No. PCT/US2018/013922, filed Jan. 16, 2018, which claims the benefit of U.S. patent application Ser. No. 15/408,128, filed on Jan. 17, 2017, U.S. patent application Ser. No. 15/408,182, filed on Jan. 17, 2017, U.S. patent application Ser. No. 15/408,207, filed on Jan. 17, 2017, U.S. patent application Ser. No. 15/656,642, filed on Jul. 21, 2017, U.S. patent application Ser. No. 15/656,552, filed on Jul. 21, 2017, U.S. patent application Ser. No. 15/656,738, filed on Jul. 21, 2017, U.S. patent application Ser. No. 15/797,562, filed on Oct. 30, 2017, the teachings of all of which are hereby incorporated by reference as if set forth in their entirety herein.

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, a human can carry the inventory item down an aisle in the warehouse to the desired shelving unit and place the inventory item on the desired shelving unit where it is stored until it is needed. When an order is placed, a human can travel down the aisle to the desired shelving unit, retrieve the inventory item from the desired shelving unit, and place the inventory item on a conveyor belt that carries the inventory item downstream for packaging and shipping. There are some systems in which containers are oriented in rows, and the entire row moves up or down vertically under the control of an operator.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3 shows a perspective view of one of the container carriers of FIG. 1 according to one embodiment;

FIG. 4 shows a perspective view of the container carrier of FIG. 3 supporting a plurality of inventory storage containers;

FIG. 25 shows an enlarged perspective view of one end of the storage module of FIG. 24;

FIG. 26 shows an enlarged perspective view of an inside of a guiderail at the end of FIG. 25;

FIG. 27 shows a top plan view of the storage module of FIG. 24;

FIG. 28 shows a side elevation view of the storage module of FIG. 24;

FIG. 37 shows a side view of the storage module of FIG. 32 with each of the vertical lifts in a raised position and the container carriers in a first rotational position;

FIG. 38 shows a side view of the storage module of FIG. 32 with each of the vertical lifts in an intermediate position and the container carriers in a second rotational position;

FIG. 39 shows a side view of the storage module of FIG. 32 with each of the vertical lifts in a lowered position and the container carriers in a third rotational position;

FIG. 40 shows a side view of the storage module of FIG. 32 with each of the vertical lifts in a lowered position and the container carriers in a fourth rotational position;

FIG. 41 shows a side view of the storage module of FIG. 32 with each of the vertical lifts in an intermediate position and the container carriers in a fifth rotational position;

FIG. 42 shows a side view of the storage module of FIG. 32 with each of the vertical lifts in a raised position and the container carriers in a sixth rotational position;

FIG. 44 shows a top view of two vertical lifts according to one embodiment.

DETAILED DESCRIPTION

Overview the Various Embodiments

Figure 1:
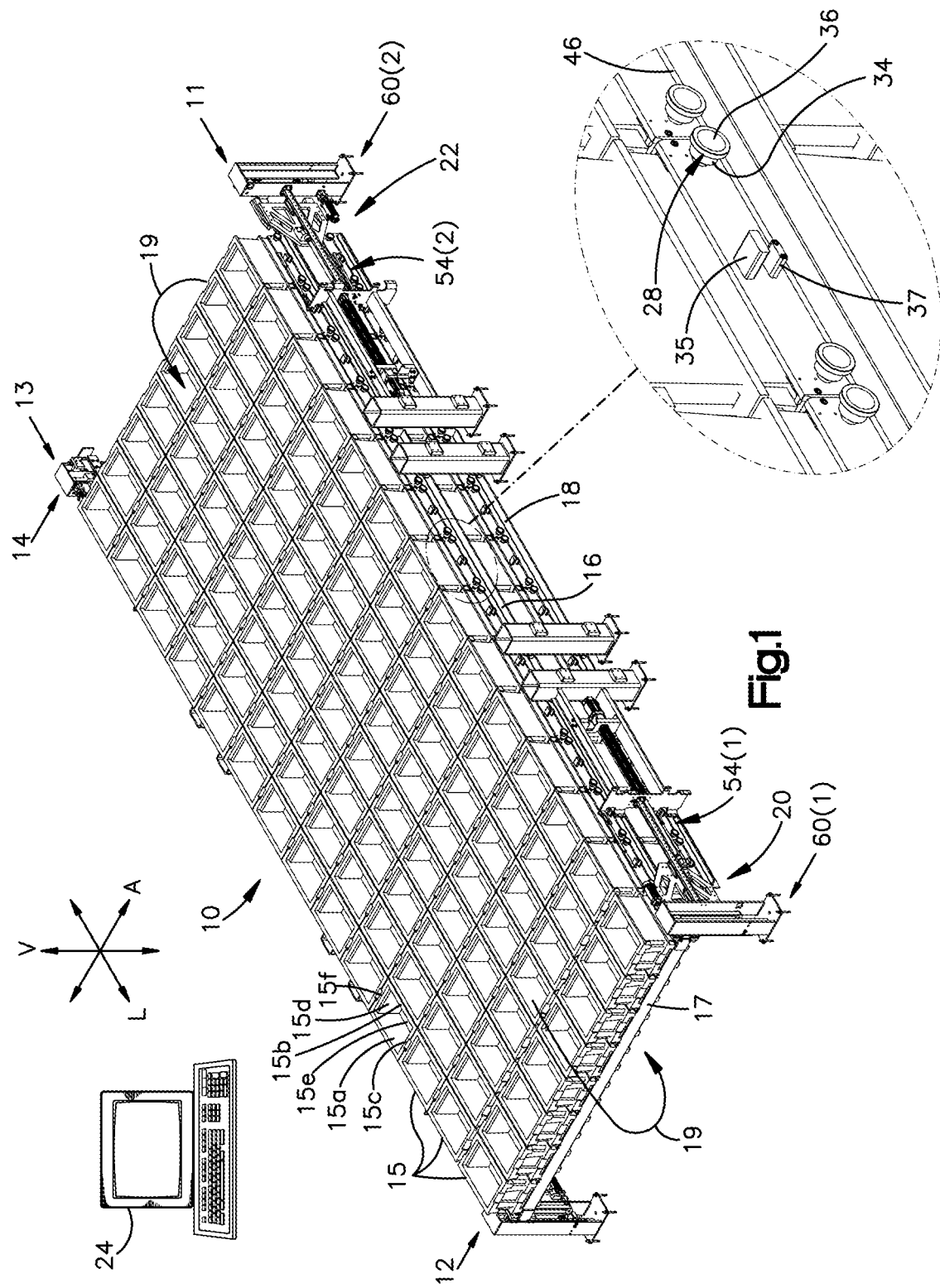
FIG. 1 shows a perspective view of a storage module according to a first embodiment having a plurality of container carriers, each supporting a plurality of inventory storage containers.

In inventory storage facilities, storage density is an important characteristic. Packing inventory items closer together reduces the overall volume that is needed to store the inventory items. Thus, a smaller building or structure can be used to store inventory items that are packed closer together. Alternatively, in an existing storage facility, increasing density can free up warehouse space that can be used to store additional inventory items, thereby increasing the capacity of the storage facility. Presented herein are inventory storage modules and storage systems that can have a higher storage density than the conventional shelving units discussed above.

Examples described herein are directed to devices, systems, and techniques for managing item storage and retrieval using stackable storage modules. In particular, the examples described herein may enable high-density storage systems including automated item storage and retrieval, with little to no human assistance. Such storage systems may be achieved by using an item movement management system (e.g., a set of computing devices) that coordinates the actions of automated material handling equipment, including stackable storage modules, using item-level data. The storage modules in their various forms described herein may enable improved item storage and retrieval as compared to conventional storage techniques. For example, the storage modules may enable improved storage density, decreased time needed for storage and retrieval of items, and fewer lost items. These improvements, along with others, may result in increased system throughput, decreased capital expenses for new storage facilities, and decreased overall operating costs.

Referring to FIGS. 1, 11, 24, and 32, various embodiments of an inventory storage module 10, 100, 1100, and 2100 are shown that are configured to store inventory items. In general, each inventory storage module has a first module end 12 and a second module end 14 spaced from one another along a longitudinal direction L. Each storage module also has a first module side 11 and a second module side 13 spaced from one another along a lateral direction A, perpendicular to the longitudinal direction L. The longitudinal direction L can be a first horizontal direction, and the lateral direction A can be a second horizontal direction.

Each storage module is elongate from its first module end 12 to its second module end 14 along the longitudinal direction L. For example, each storage module has a module length along the longitudinal direction L from its first module end 12 to its second module end 14 that is greater than a module width of the storage module from its first module side 11 to its second module side 13 along the lateral direction A. The module length can also be greater than a module height along a vertical direction V, perpendicular to both the longitudinal direction L and the lateral direction A. The overall dimensions (e.g., module length, module width, and module height) of each storage module may be selected to optimize storage density of the stackable storage module or other suitable parameter. For example, the dimensions may be selected to fit within a particular structure (e.g., a shipping container or warehouse).

Each storage module has a plurality of conveyor segments that define a movement path 19. Each movement path 19 can have a closed shape, such as a rectangle, a loop, an oval, or any other suitable closed shape. For example, each storage module has a first conveyor segment 16 and a second conveyor segment 18 that extend along the longitudinal direction L. Each storage module also has a third conveyor segment 20 adjacent the first module end 12 and a fourth conveyor segment 22 adjacent the second module end 14. Each of the first and second conveyor segments 16 and 18 are configured to transfer inventory storage containers 15 along the longitudinal direction L between the third and fourth conveyor segments 20 and 22. Thus, the first and second conveyor segments 16 and 18 can be considered to be longitudinal conveyor segments.

In some embodiments, the first and second longitudinal conveyor segments 16 and 18 can be offset from one another along the vertical direction V. Thus, the first and second longitudinal conveyor segments 16 and 18 can be considered to be upper and lower conveyor segments, respectively. In such as case, the movement path 19 is defined in a plane that extends along the vertical direction V and the longitudinal direction L. Further, in such embodiments, the module height can be defined from the first longitudinal conveyor segment 16 to the second longitudinal conveyor segment 18. In alternative embodiments (not shown), the first and second longitudinal conveyor segments 16 and 18 can be offset from one another along the lateral direction A. In such embodiments, the movement path 19 is defined in a plane that extends along the longitudinal direction L and the lateral direction A (i.e., a horizontal plane).

The first and second conveyor segments 16 and 18 extend between the first module end 12 and the second module end 14, and between the first module side 11 and the second module side 13. The first and second conveyor segments 16 and 18 are each elongate along the longitudinal direction L. For example, each of the first and second conveyor segments 16 and 18 has a segment length along the longitudinal direction L and a segment width along the lateral direction A, where the segment length is greater than the segment width. Each of the longitudinal conveyor segments 16 and 18 can include a conveyor surface, and the storage module can be configured to transfer storage containers 15 along the conveyor surfaces along the longitudinal direction L. The conveyor surfaces can be defined by conveyor elements such as tracks, belts, rollers, skate wheels, balls, any other suitable conveyor elements for translating the storage containers 15, or any suitable combination of conveyor elements.

Each of the third and fourth conveyor segments 20 and 22 are configured to transfer storage containers 15 between the first and second conveyor segments 16 and 18. Thus, the third and fourth conveyor segments 20 and 22 can be considered to be connecting conveyor segments. The third and fourth conveyor segments 20 and 22 are offset from one another along the longitudinal direction L. Each of the third and fourth conveyor segments 20 and 22 are configured to transfer storage containers 15 between the first and second conveyor segments 16 and 18. For example, each of the third and fourth conveyor segments 20 and 22 can be configured to convey storage containers 15 along the vertical direction V from one of the first and second conveyor segments 16 and 18 to the other one of the first and second conveyor segments 16 and 18. In some embodiments (e.g., FIGS. 1-10 and FIGS. 32-44), the third and fourth conveyor segments 20 and 22 can each be implemented as a vertical lift that is configured to transfer the storage containers 15 along the vertical direction V between the first and second conveyor segments 16 and 18. Thus, the first and second conveyor segments 16 and 18 can each define a discontinuous conveyor segment, and the vertical lifts can transfer the storage containers 15 between the discontinuous conveyor segments. In other embodiments (e.g., FIGS. 11-21 and 24-31), the third and fourth conveyor segments 20 and 22 can include conveyor surfaces such as (without limitation) tracks that connect the first and second conveyor segments 16 and 18. Thus, in such embodiments, the first to fourth conveyor segments 16, 18, 20, and 22 together can define a continuous conveying surface or track.

The first to fourth conveyor segments 16, 18, 20, and 22 together define the movement path 19. The movement path 19 can be elongate along the longitudinal direction L. The movement path 19 can be considered to be a closed movement path in that that first to fourth conveyor segments 16, 18, 20, and 22 transfer storage containers 15 only around the movement path 19, without transferring storage containers 15 outside of the movement path 19. However, it will be understood that the storage containers 15 can be removed from, and placed back into, the movement path 19 by a person or machine such as a robotic arm.

The conveyor segments of each storage module are configured to translate the storage containers 15 around the movement path 19 until a desired one of the storage containers 15 is presented at one of the first module end 12 and the second module end 14. Each storage module can include one or more movement systems (e.g., 50(1)-50(4) in FIG. 2, 106 in FIG. 14, 1129 in FIG. 24, 2141 in FIG. 37) that are configured to move the inventory storage containers 15 along the movement path 19. Each movement system can include a catch (e.g., 52 in FIGS. 5, 402a and 402b in FIGS. 14-17, 1174 and 1184 in FIG. 25) that is configured to engage at least one of a container carrier 17 (discussed below) and a storage container 15 so as to move the at least one of the container carrier 17 and a storage container 15 along the movement path 19.

The movement systems and conveyor segments 16, 18, 20, and 22 operate together to translate the storage containers 15 around the movement path 19 until a desired one of the storage containers 15 is presented at one of the first module end 12 and the second module end 14. At such position, the desired storage container 15 can be accessed by a person, or machine such as a robotic arm, so that an inventory item can then be placed onto the desired storage container 15 for storage or can be removed from the desired storage container 15 to fulfill a customer order or for further transporting or processing. Additionally or alternatively, the person or machine can remove storage containers 15 from the storage module and place storage containers 15 onto the storage module.

Each storage module can operate in a unidirectional manner such the storage containers 15 can be moved in only a first direction (that is, clockwise or counterclockwise) around the movement path. Alternatively, each storage module can operate in a bidirectional manner such the storage containers 15 can be selectively rotated in one of the first direction and a second direction, opposite the first direction. The movement and positioning of storage containers 15 can be controlled by a controller 24, which can be in wired or wireless communication with the segments of the storage module. The controller 24 can control the speed and optionally the direction in which the storage containers are translated. Further, the controller 24 can stop translation of the storage containers when a desired storage container is presented at one of the first and second ends 12 and 14.

Each storage container 15 can be any suitable storage container configured to carry one or more inventory items therein. Preferably, the inventory storage containers 15 are open-top plastic totes configured to carry items in an e-commerce supply chain. The totes are of a size that an individual person or robot can lift. For example, and with reference to FIGS. 1 and 3, each storage container 15 can be a rectangular structure, such as a bin or tote, formed from a rigid material such as high-density plastic, wood, aluminum, or other suitable material. Each storage container 15 can have a pair of opposed container sidewalls 15a and 15b that are spaced opposite from one another. Each storage container 15 can have a pair of opposed container end walls 15c and 15d that are spaced opposite from one another. The opposed container end walls 115c and 115d can extend between the opposed container sidewalls 15a and 15b. Similarly, the opposed container sidewalls 15a and 15b can extend between the opposed container end walls 15c and 15d.

Each container 15 has a width $W_S$ from one of the sidewalls 15a and 15b to the other one of the sidewalls 15a and 15b, and can have a length $L_S$ from one of the end walls 15c and 15d to the other one of the end walls 15c and 15d. In some embodiments, the length $L_S$ can be greater than the width $W_S$. Each storage container 15 can further have an upper end 15e and a bottom surface 15f spaced from one another along the vertical direction V. The bottom surface 15f can extend between the opposed sidewalls 15a and 15b and between the opposed end walls 15c and 15d. The upper end 15e can be open for ease of access in placing inventory items into, and retrieving inventory items from, the storage container 15. Each container 15 can have a height Hs from the upper end 15e to the bottom surface 15f.

The size of a storage container 15 may be selected to optimize storage density of the stackable storage module or other suitable parameter. This may depend on the size and type of items to be stored in the storage container 15. For example, the storage container 15 may have a height of about 18", a width of about 18", and a length of about 24". However, the dimensions of the storage container 15 can be different than those just recited. The items held by the storage container 15 can be any suitable item stored in a material storage facility including, for example, personal electronic devices, computers, recreational equipment, food products, television sets, clothing, household supplies, automotive parts, books, loaded pallets, and any other suitable object capable of being stored.

The storage containers 15 can be stackable on top of one another. For example, the bottom surface 15f of an upper one of the storage containers 15 can be received in the opening of the upper end 15e of a lower one of the storage containers 15. The upper end 15e of the lower storage container 15 can be configured to support the bottom surface 15f of the upper storage container 15 such that the bottom surface 15f of the upper storage container 15 nests inside the opening of the lower storage container 15. Each container 15 can also include at least one protrusion 15g, each extending outwardly from at least one of the container sidewalls and end walls. For example, each container 15 can include a plurality of protrusions 15g, each extending outwardly from at least one of the sidewalls and end walls at a corner of the container 15 adjacent the upper end 15e. At least one protrusion 15g can define a handle that is configured to be configured to be engaged by a human hand for carrying. At least one protrusion 15g can include a lower surface that is configured to be engaged by a tine of an end effector of a robotic arm (not shown), fork lift, or other lifting machine. For example, a storage container 15 can include a pair of the protrusions 15g disposed on opposite sides or ends of the container 15 that are configured to engage a pair of tines.

Each storage container 15 may include an identifier (e.g., bar code, QR code, radio-frequency identification (RFID) tag, and any other suitable identifier). The identifier may be used to uniquely identify the storage container 15. In some examples, the identifier may include non-volatile data storage, which may be associated with the storage container 15 and/or its contents. Data can be read/written to the data storage each time the stackable storage module is accessed. This data may contain status of the stackable storage module, inventory stowed in the stackable storage module, and/or destination information for each storage container 15. In this manner, inventory information may be updated when the identifiers are read.

In some embodiments, as shown in FIGS. 1-10, 11-21, and 24-31, the storage module can include a plurality of container carriers 17, where each container carrier 17 is configured to support at least one of the inventory storage containers 15. In such embodiments, the conveyor segments 16, 18, 20, and 22 can be configured to transfer the container carriers 17 around the movement path 19 until a desired one of the container carriers 17 is presented at one of the first and second module ends 12 and 14. Thus, the first and second conveyor segments 16 and 18 can be configured to transfer the carriers 17 along the longitudinal direction L, and the third and fourth conveyor segments 20 and 22 can be configured to transfer container carriers 17 between the first and second conveyor segments 16 and 18.

Each container carrier 17 can have a rectangular or other suitably shaped carrier body 26. The carrier body 26 can have a pair of opposed carrier sides 26a and 26b that are spaced opposite from one another along the lateral direction A. The carrier body 26 can have a pair of opposed carrier ends 26c and 26d that are spaced opposite from one another along the longitudinal direction L. The opposed carrier ends 26c and 26d can extend between the opposed carrier sides 26a and 26b. Similarly, the opposed carrier sides 26a and 26b can extend between the opposed carrier ends 26c and 26d. The carrier body 26 has a width $W_S$ from one of the carrier sides 26a and 26b to the other one of the carrier sides 26a and 26b, and has a length $L_S$ from one of the carrier ends 26c and 26d to the other one of the carrier ends 26c and 26d.

Each container carrier 17 can include at least one conveyor-segment engagement feature that is configured to engage the conveyor segments 16, 18, 20, and 22 so that the container carrier 17 can be translated around the movement path 19. Each of the at least one conveyor-segment engagement feature can be disposed at one of the carrier sides 26a or 26b or can be disposed at another location of the container carrier 17. In some embodiments, the at least one conveyor-segment engagement feature can include at least one wheel assembly 28, such as a plurality of wheel assemblies 28. However, it will be understood that, in alternative embodiments, the at least one conveyor segment engagement feature can include a feature other than a wheel assembly. For example, each conveyor-segment engagement feature can be a rod or pin that engages a bearing or chain of tracks of the conveyor segments 16, 18, 20, and 22.

In at least some examples, the container carrier 17 also includes an identifier. The identifiers may be used to identify a position of the container carrier 17 (and the storage container 15) with respect to the stackable storage module. In some examples, the stackable storage module (or system in which the stackable storage module is implemented) may include any suitable combination of encoders, RFID readers and antenna, cameras, and/or other sensing devices for identifying and locating the container carriers 17 and/or the storage containers 15.

Each storage module can include one or more sensors to provide sensor data that can be used to manage the operation of the stackable storage module. For example, a position sensor may be used to detect positions of the storage container carriers and/or containers 15. As an additional example, an optical scanner may be used to scan the identifier. Other sensors relating to control of the drive motor of the movement system may also be provided. In some examples, other sensors are provided to detect when items protrude out of the storage containers 15 in a way that could be problematic. For example, because the tolerances between modules or between levels of a module may be very tight, it may be desirable that items do not extend beyond a top of the storage containers 15.

Each storage module may also include any suitable number of mechanical connections, electrical connections, and network connections to stabilize each module or stack of modules, and to implement the techniques described herein. For example, the mechanical connections may be used to couple two or more stackable storage modules together. The electrical connections may be used to provide power to each movement system and other electrical devices (e.g., sensors). The network connections may enable computer control of the stackable storage modules. In some examples, the stackable storage module may include a local computing device, control chip, or other device to control the operation of the stackable storage module. The device may include non-volatile data storage to store certain data associated with the stackable storage module. For example, such data may include location data for storage containers 15, location data for items in the storage containers 15, and an order of the storage containers 15 (e.g., location of a storage container 15 with respect to other storage containers 15 and/or the carrier movement path 19).

Each storage module can be modular in the sense that each storage module can be fully functional on its own, and multiple instances of the storage modules can be grouped together in clusters (e.g., a group of more than one stackable storage module). When grouped into clusters, each stackable storage module remains independently controllable by the item movement management system. A cluster of stackable storage modules can be assembled in a fixed structure (e.g., in a warehouse to augment or replace vertical shelving units or other conventional storage means), in a mobile structure (e.g., a shipping container), and in other mobile and non-mobile arrangements. Use of clusters of stackable storage modules may enable increased flexibility with item storage.

A plurality of instances of each storage module can be arranged in a cluster of storage modules in a modular storage and retrieval system as shown in FIGS. 10, 12, 13, 29, and 43. Each system can include at least one vertical stack of the storage modules, where each vertical stack comprises at least two storage modules stacked on top of one another along the vertical direction V. In some embodiments, each modular storage and retrieval system can include a plurality of the vertical stacks of storage modules that are offset from one another along the lateral direction A. In each of the systems, the storage modules can be independently operated such that the storage containers 15 of each storage module can be driven around its corresponding movement path independently of the storage containers 15 of other storage modules being driven around their corresponding movement paths. Thus, the movement paths of each storage module can be independent from and unconnected to the movement paths of the other storage modules.

Each modular storage and retrieval system can include a robotic manipulator (e.g., 96) that is configured to retrieve inventory items from the storage containers 15 and/or remove the storage containers 15 from the storage module. The robotic manipulator can also be configured to place inventory items into the storage containers 15 and/or place storage containers 15 onto the storage module. The robotic manipulator may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). The robotic manipulator may include any suitable type and number of sensors disposed throughout the robotic manipulator (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator, including an end effector.

The sensors may be in communication with a management device that is local to the robotic manipulator (e.g., a robotic manipulator controller) and/or may be in direct communication with an item movement management system. In this manner, the management device may control the operation of the robotic manipulator and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

In some examples, depending on the application for the robotic manipulator, different end effectors (e.g., end of arm tools) may be selected. Information about the end effectors available may be organized in terms of grasping function. A grasping function may define functionally how an end effector is capable of manipulating an object. The grasping function may differ between end effectors with respect to capacities, categories, and physical limitations. Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

In some examples, the robotic manipulators or other material handling device may be configured to move vertically and/or horizontally to service the cluster. For example, the robotic manipulator may be mounted on a horizontal and/or vertical track to enable it to move with respect to the vertical stacks. Other material conveyance devices (e.g., 306 in FIG. 13) may also be disposed on each floor adjacent to the robotic manipulators. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices may be used to transport items and/or storage containers 15 to and from the robotic manipulators. In some examples, first other material conveyance devices transport items to the robotic manipulators for placement in the storage containers of the stackable storage modules. Second other material conveyance devices may transport other items from the robotic manipulators (e.g., items that have been removed from the storage containers 15 of the stackable storage modules) to other locations within the facility (e.g., packaging, labeling, inspection, etc.).

Each modular storage and retrieval system (and the other modular storage and retrieval systems described herein) may include means for inspection, repairs, and removal of jams of the stackable storage modules. For example, a container carrier 17 may be adapted to support inspection or service equipment, e.g., a robotic manipulator configured to inspect the stackable storage modules, remove jams, and perform certain maintenance. As described herein, the vertical stacks may also be moveable to allow access to all of the stackable storage modules. Additionally or alternatively, movement system components such as motors and other components may be positioned near the first module end 12 and/or near the second module end 14 for ease of access for maintenance.

Figure 22:
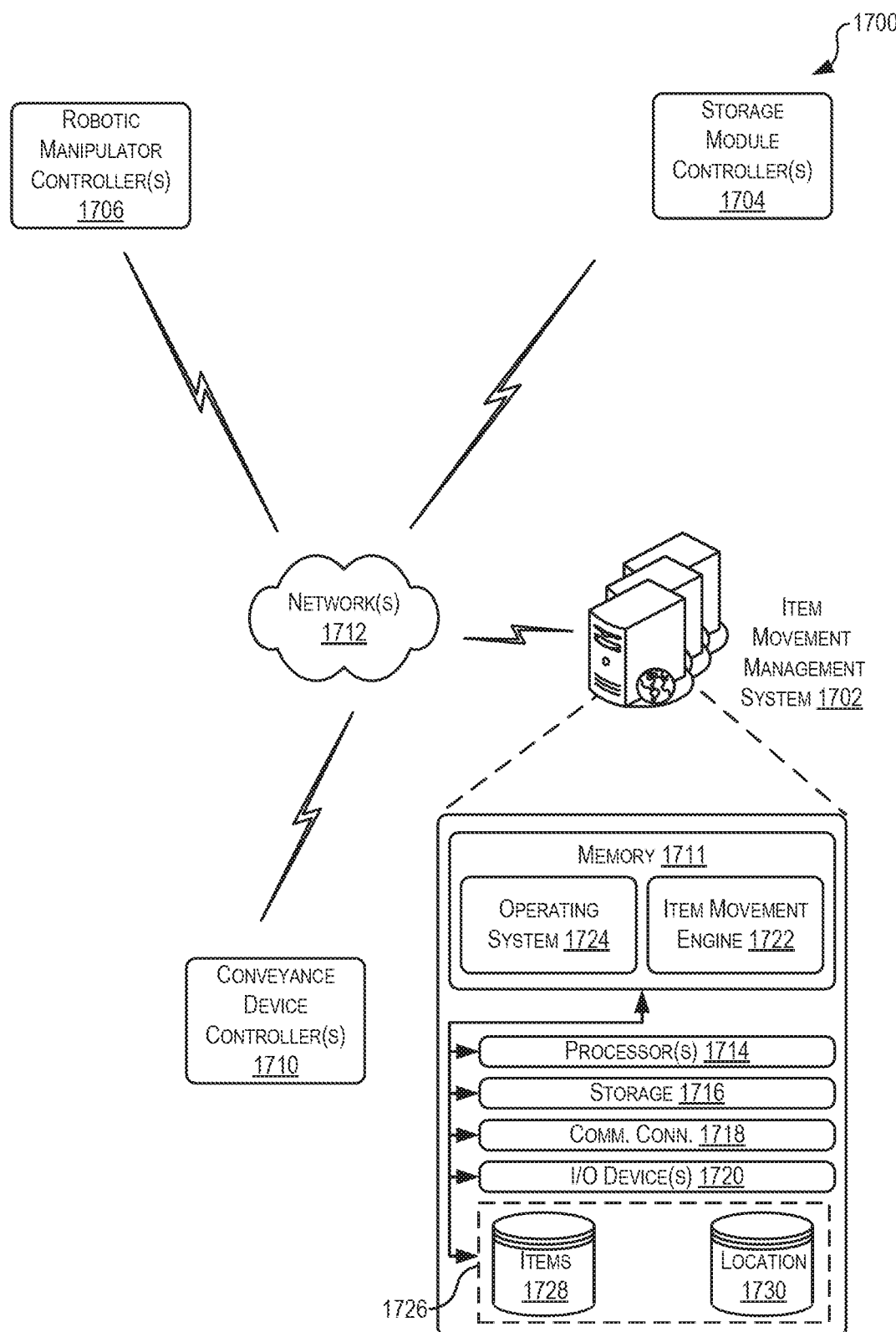
FIG. 22 illustrates an example schematic architecture or system relating to managing item storage and retrieval using stackable storage modules, according to at least one example.

FIG. 22 illustrates an example schematic architecture or system 1700 relating to managing item storage and retrieval that can be used with each of the storage modules 10, 100, 1100, and 2100. The architecture 1700 includes an item movement management system 1702, storage module controller(s) 1704, robotic manipulator controller(s) 1706, and conveyance device controller(s) 1710 in communication with each other via one or more networks 1712. The network 1712 may include any one or a combination of many different types of networks, such as cable networks, the Internet, wireless networks, cellular networks, satellite networks, other private and/or public networks, or any combination thereof. In some examples, certain ones of the elements of the architecture 1700 communicate via a first network, while other elements communicate via a second network. The networks 1712 may also include wireless personal area networks such as Bluetooth, Wi-Fi, and other similar wireless networks. In some examples, the elements of the architecture 1700 are electrically coupled to each other instead of, or in addition to, the network 1712.

The storage module controller(s) 1704, the robotic manipulator controller(s) 1706, and the conveyance device controller(s) 1710 may include any suitable combination of software and/or hardware to control their respective devices. For example, the storage module controller 1704 may include any suitable control circuitry capable of independent control of the movement systems (e.g., drive motors). The robotic manipulator controller 1706 may include any suitable control circuitry capable of receiving, processing, executing, and generating instructions relating to movement of the degrees of freedom of the robotic manipulator. The conveyance device controllers 1710 may include any suitable control circuitry such as speed sensors, variable speed drive, power switch, etc. in communication with drive motors of material handling equipment described herein.

The item movement management system 1702 may be configured to manage aspects of managing item storage and retrieval using stackable storage modules. To this end, the item movement management system 1702 may include any suitable combination of one or more computing devices such as, but not limited to, a server, a virtual machine instance, a set of servers or set of virtual machines, a mobile phone, a smartphone, a PDA, a laptop computer, a desktop computer, a thin-client device, a tablet computer, etc. The item movement management system 1702 may function to manage the operation of the other elements in the architecture 1700.

Turning now to the item movement management system 1702 in detail, in some examples, the item movement management system 1702 may include at least one memory 1711 and one or more processing units (or processor(s)) 1714. The processor(s) 1714 may be implemented as appropriate in hardware, computer-executable instructions, firmware, or combinations thereof. Computer-executable instruction or firmware implementations of the processor(s) 1714 may include computer-executable or machine-executable instructions written in any suitable programming language to perform the various functions described.

The memory 1711 may store program instructions that are loadable and executable on the processor(s) 1714, as well as data generated during the execution of these programs. Depending on the configuration and type of the item movement management system 1702, the memory 1711 may be volatile (such as RAM) and/or non-volatile (such as ROM, flash memory, etc.). The item movement management system 1702 may also include additional removable storage and/or non-removable storage 1716 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1711 may include multiple different types of memory, such as SRAM, DRAM, or ROM. While the volatile memory described herein may be referred to as RAM, any volatile memory that would not maintain data stored therein once unplugged from a host and/or power would be appropriate. The memory 1711 and the additional storage 1716, both removable and non-removable, are both additional examples of non-transitory computer-readable storage media.

The item movement management system 1702 may also include communications connection(s) 1718 that allow the item movement management system 1702 to communicate with a data store, another computing device or server, user terminals and/or other devices (e.g., the robotic manipulator controllers 1706, the storage module controllers 1704, the conveyance device controllers 1710) via the networks 1712. In this manner, the communications connections 1718 can include network interfaces to enable connection to network devices. The item movement management system 1702 may also include I/O device(s) 1720, such as a keyboard, a mouse, a pen, a voice input device, a touch input device, a display, speakers, a printer, etc.

Turning to the contents of the memory 1711 in more detail, the memory 1711 may include an operating system 1724 and/or one or more application programs or services for implementing the features disclosed herein including an item movement engine 1722. In some examples, the item movement engine 1722 may be configured to manage item storage and retrieval using stackable storage modules.

The item movement management system 1702 may also include a data store 1726. In some examples, the data store 1726 may include one or more data stores, databases, data structures, or the like for storing and/or retaining information associated with the item movement management system 1702. For example, the data store 1726 may include databases, such as an item database 1728 and a location database 1730.

The item database 1728 may be used to store information about the items stored and retrieved from the stackable storage modules as described herein. For example, the item database 1728 may include characteristics or properties of the items. The item database 1728 may be organized according to unique item identifiers such as serial numbers assigned by a materials handling facility, serial numbers assigned by a manufacturer, RFID tag numbers, and any other unique identifier. The characteristics or properties included in the item database may include, for example, weight, dimensions, volume, item type, special considerations (e.g., fragile, toxic, flammable, etc.), whether reserved for an order, expected time for storage, stock item images, other item images (e.g., captured at different points in time while the item is being stored), and any other suitable information.

The location database 1730 may be used to store location information about the items as they move throughout a material handling facility. For example, using sensor data, the item movement management system 1702 may track the location of the items and store those locations in the location database. The location information may identify item positions at a storage container level or at some other level of granularity. For example, for a particular item, the location information may identify multiple levels of how the location may be represented e.g., storage container identifier, stackable storage module identifier, vertical stack identifier, cluster identifier, shipping container identifier, cluster of shipping containers identifiers, and any other suitable identifier.

Figure 23:
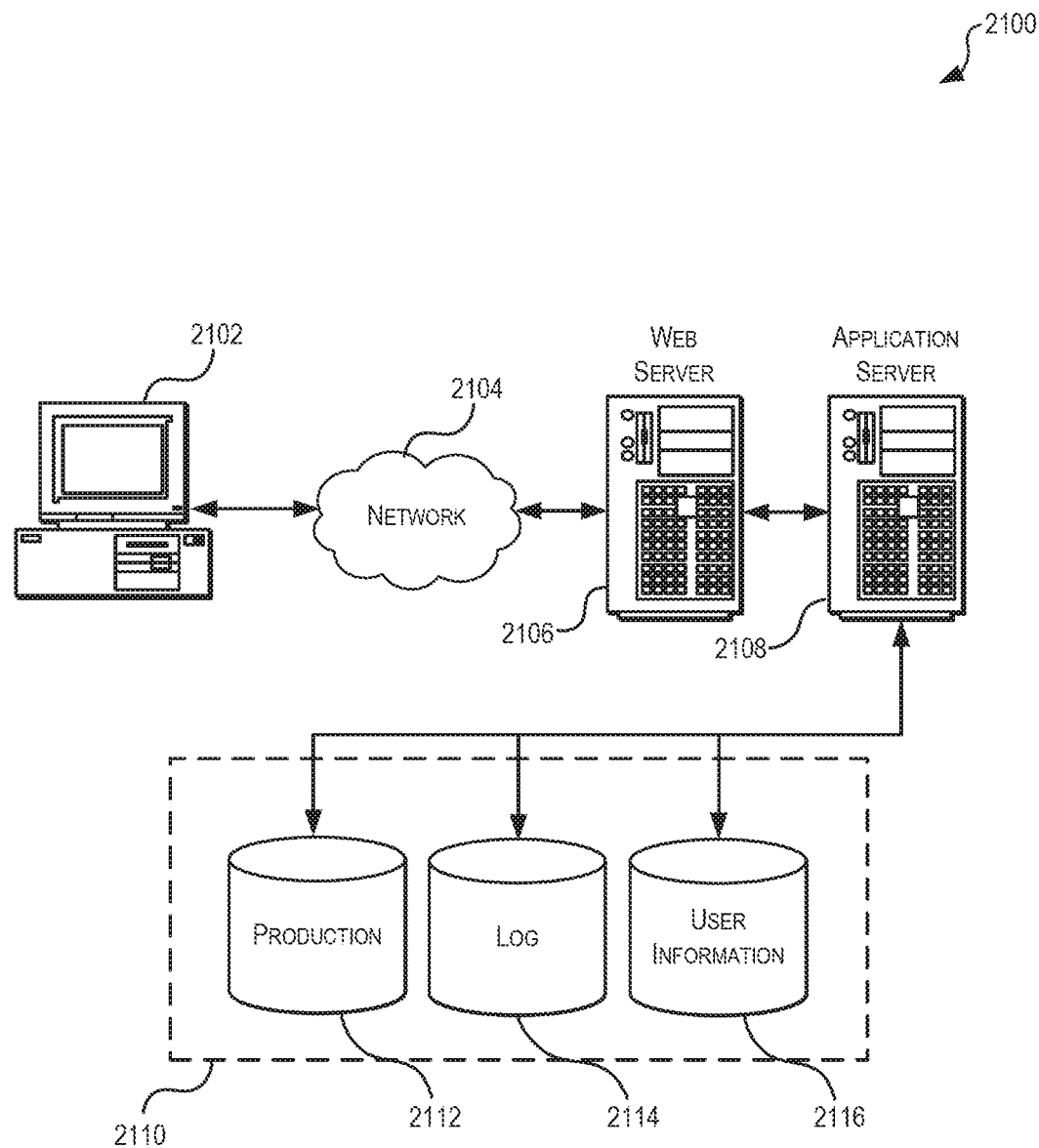
FIG. 23 illustrates an environment in which various examples can be implemented, according to at least one example.

FIG. 23 illustrates aspects of an example environment 2100 for implementing aspects in accordance with various examples. As will be appreciated, although a Web-based environment is used for purposes of explanation, different environments may be used, as appropriate, to implement various examples. The environment includes an electronic client device 2102, which can include any appropriate device operable to send and receive requests, messages, or information over an appropriate network 2104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2106 for receiving requests and serving content in response thereto, although for other networks an alternative device serving a similar purpose could be used as would be apparent to one of ordinary skill in the art.

The illustrative environment includes at least one application server 2108 and a data store 2110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 2102 and the application server 2108, can be handled by the Web server.

It should be understood that the Web and application servers are not required and are merely example components, as structured code discussed herein can be executed on any appropriate device or host machine as discussed elsewhere herein.

The data store 2110 can include several separate data tables, databases or other data storage mechanisms and media for storing data relating to a particular aspect. For example, the data store illustrated includes mechanisms for storing production data 2112 and user information 2116, which can be used to serve content for the production side. The data store also is shown to include a mechanism for storing log data 2114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2110. The data store 2110 is operable, through logic associated therewith, to receive instructions from the application server 2108 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 2102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 23. Thus, the depiction of the system 2100 in FIG. 23 should be taken as being illustrative in nature and not limiting to the scope of the disclosure.

The various examples further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk ("DVD"), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

Description of FIGS. 1 to 10

Turning now more specifically to FIGS. 1 to 10, which show a first embodiment of an inventory storage module 10. In general, as described above, the storage module 10 has a first end 12, a second end 14, a first side 11, and a second side 13. Further, the storage module 10 has first to fourth conveyor segments 16, 18, 20, and 22. In this embodiment, the first and second conveyor segments 16 and 18 are offset from one another along the vertical direction V. Thus, the first and second conveyor segments 16 and 18 can be referred to as upper and lower conveyor segments, respectively. The upper and lower conveyor segments 16 and 18 are configured to transfer container carriers 17 along the longitudinal direction L, each container carrier configured to support at least one storage container 15. The third and fourth conveyor segments 20 and 22 are implemented as first and second vertical lifts 60(1) and 60(2), respectively. Each vertical lift 60(1) and 60(2) is configured to transfer the container carriers 17 between the upper and lower conveyor segments 16 and 18. The storage module 10 can be configured such that, when the vertical lifts 60(1) and 60(2) transfer container carriers 17, at least some, up to all, of the container carriers 17 on the upper and lower conveyor segments 16 and 18 remain stationary. The storage module 10 can be configured such that, when the container carriers 17 are moved along the upper and lower conveyor segments 16 and 18, the vertical lifts 60(1) and 60(2) do not move any container carriers 17.

The conveyor segments 16, 18, 20, and 22 together define a movement path 19 having a closed shape, and the storage module 10 is configured to transfer the container carriers 17 around the movement path 19. In this embodiment, the movement path 19 has a rectangular shape, although it will be understood that the movement path 19 can have any other suitable closed shape. The movement path 19 can be elongate along the longitudinal direction L. Thus, the movement path 19 can have a length along the longitudinal direction L that is greater than a height of the movement path along the vertical direction V.

Figure 2:
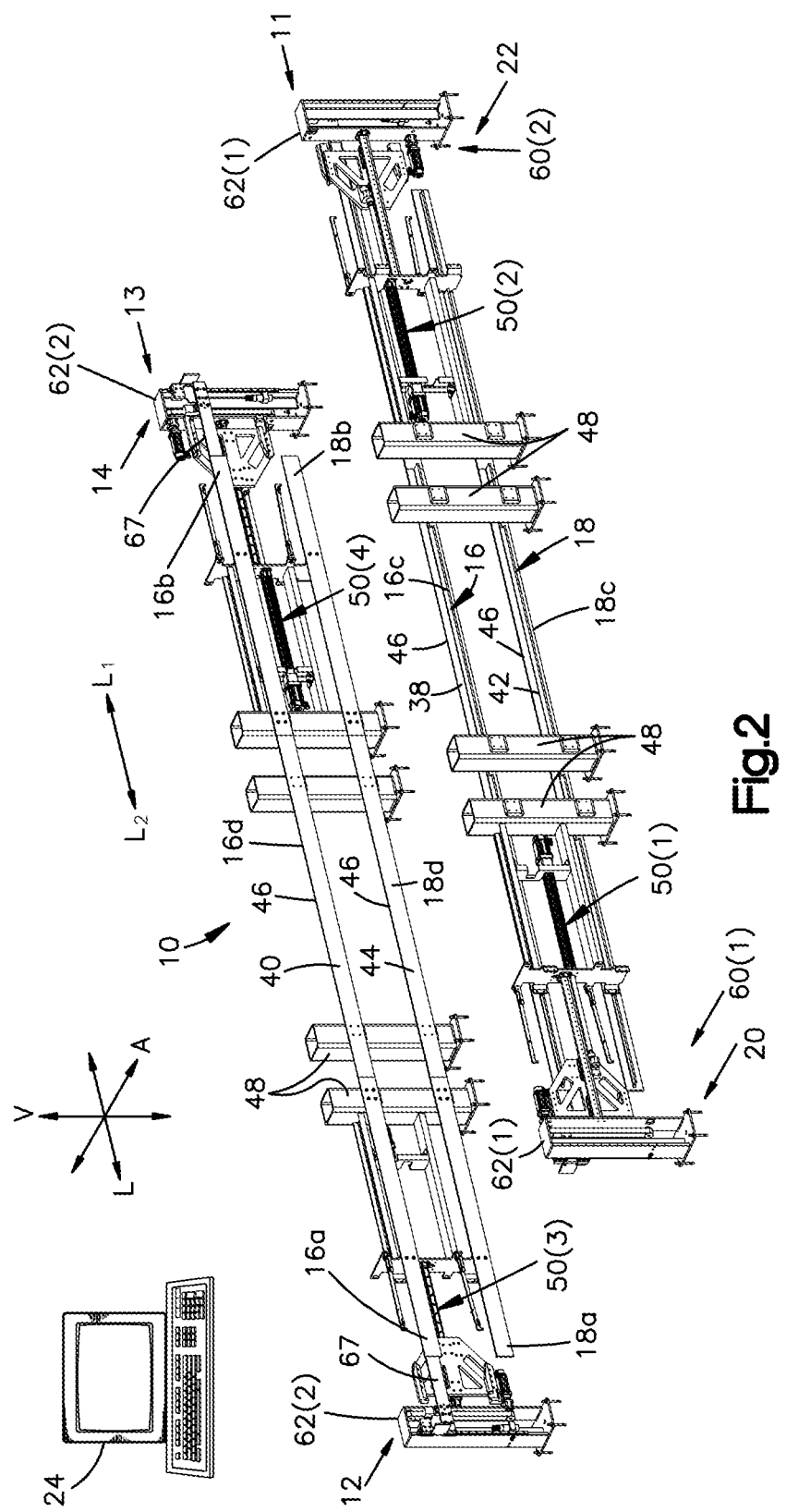
FIG. 2 shows a perspective view of the storage module of FIG. 1 without the container carriers and inventory storage containers.

Referring specifically to FIG. 2, the first conveyor segment 16 has a first segment end 16a, and a second segment end 16b that is offset from the first segment end 16a along the longitudinal direction L. The first and second segment ends 16a and 16b can be terminal free ends that are free from a fixed connection to another track. The first conveyor segment 16 is elongate from the first segment end 16a to the second segment end 16b. The first conveyor segment 16 has a first lateral side 16c and a second lateral side 16d spaced from the first lateral side 16c along the lateral direction A, perpendicular to the longitudinal direction L. The first conveyor segment 16 further has at least a one conveyor surface 46 (herein referred to as a first conveyor surface) that extends between the first and second segment ends 16a and 16b.

The first conveyor segment 16 is configured to transfer container carriers 17, and hence storage containers 15, along the first conveyor surface 46 from the first terminal free end 16a to the second terminal free end 16b along a first longitudinal direction $L_1$ when the conveyor segments operate in a clockwise direction as viewed. Additionally or alternatively, the first conveyor segment 16 can be configured to transfer container carriers 17 along the conveyor surface 46 from the second end 16b to the first end 16a along a second longitudinal direction $L_2$, opposite the first longitudinal direction $L_1$, when the conveyor segments operate in a counterclockwise direction as viewed.

Similarly, the second conveyor segment 18 has a first segment end 18a, and a second segment end 18b that is offset from the first terminal free end 18a along the longitudinal direction L. The first and second segment ends 16a and 16b can be terminal free ends that are free from a fixed connection to another track. The second conveyor segment 18 is elongate from the first segment end 18a to the second segment end 18b. The second conveyor segment 18 has a first lateral side 18c and a second lateral side 18d spaced from the first lateral side 18c along the lateral direction A. The second conveyor segment 18 further has at least one conveyor surface 46 (herein referred to as a second conveyor surface) that extends between the first and second segment ends 18a and 18b.

The second conveyor segment 18 is configured transfer container carriers 17, and hence storage containers 15, along the second conveyor surface 18e from the second end 18b to the first end 18a along the second longitudinal direction $L_2$ when the conveyor segments operate in a clockwise direction as viewed. Additionally or alternatively, the second conveyor segment 18 can configured to transfer container carriers 17 along the second conveyor surface 46 from the first end 18a to the second end 18b along the first longitudinal direction $L_1$ when the conveyor segments operate in a counterclockwise direction as viewed. The second conveyor segment 18 is offset from the first conveyor segment 16 along the vertical direction V.

The first vertical lift 60(1) is configured to transfer container carriers 17 between the first end 16a of the first conveyor segment 16 and the first end 18a of the second conveyor segment 18. For instance, the first vertical lift 60(1) transfers container carriers 17 from the first end 16a of the first conveyor segment 16 to the first end 18a of the second conveyor segment 18 when the storage module 10 operates in the counterclockwise direction, and from the first end 18a of the second conveyor segment 18 to the first end 16a of the first conveyor segment 16 when the storage module 10 operates in the clockwise direction. The first vertical lift 60(1) can be configured to move at least one container carrier 17 at a time. For example, in the embodiment shown, the first vertical lift 60(1) moves only one carrier 17 at a time. The first vertical lift 60(1) is configured to move in a direction opposite the movement path to receive each container carrier 17, and then move the container carrier 17 along the movement path. When the first vertical lift 60(1) moves the at least one container carrier between the first and second conveyor segments 16 and 18, at least some, up to all, of the container carriers on the first and second conveyor segments 16 and 18 can remain stationary. In other words, the storage module 100 can be configured such that at least some of the container carriers 17, and hence the storage containers 15, remain stationary while the first vertical lift 60(1) moves at least one container carrier 17 between the first and second conveyor segments 16 and 18.

Similarly, the second vertical lift 60(2) is configured to transfer container carriers 17 between the second end 16b of the first conveyor segment 16 and the second end 18b of the second conveyor segment 18. For instance, the second vertical lift 60(2) transfers container carriers 17 from the second end 16b of the first conveyor segment 16 to the second end 18b of the second conveyor segment 18 when the storage module 10 operates in the clockwise direction, and from the second end 18b of the second conveyor segment 18 to the second end 16b of the first conveyor segment 16 when the storage module 10 operates in the counterclockwise direction. The second vertical lift 60(2) can be configured to move at least one container carrier 17 at a time. For example, in the embodiment shown, the second vertical lift 60(2) moves only one carrier 17 at a time. The second vertical lift 60(2) is configured to move in a direction opposite the movement path to receive each container carrier 17, and then move the container carrier 17 along the movement path. When the second vertical lift 60(2) moves the at least one container carrier between the first and second conveyor segments 16 and 18, at least one, up to all, of the container carriers 17 on the first and second conveyor segments 16 and 18 can remain stationary. In other words, the storage module 100 can be configured such that at least some of the container carriers 17, and hence the storage containers 15, remain stationary while the second vertical lift 60(2) moves at least one container carrier 17 between the first and second conveyor segments 16 and 18.

The storage module 10 can include at least one controller 24 configured to provide at least one control signal to the vertical lifts 60(1) and 60(2) and to at least one movement system 50(1) to 50(4) so as to control the movement of the container carriers 17 around the movement path 19. In some embodiments, the controller 24 can control the speed in which the container carriers 17 are moved. Further, in some embodiments, the controller 24 can control the direction in which the container carriers 17 are moved. Yet further, in some embodiments, the controller 24 can stop the vertical lifts 60(1) and 60(2) and the at least one movement system 59(1) to 50(4) when a desired one of the container carriers 17 is presented at one of the first end 12 and the second end 14.

The storage containers 15 in the storage module 10 can be densely packed along the vertical direction V. In particular, the storage containers 15 on the upper conveyor segment 16 can be stacked above the storage containers 15 on the lower conveyor segment 18 so that the space between each storage container 15 on the bottom level and the first conveyor segment 16 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers, such as a spacing that is no more than 20 percent of the height of the storage containers, such as no more than 15 percent of the height of the storage containers, such as no more than 10 percent of the height of the storage containers, or such as no more than 5 percent of the height of the storage containers. Storage density is inversely proportional to the distance between a storage container and the conveyor segment 16 immediate over top of the storage container. Thus, as this distance is decreased, the storage density increases.

Referring now more specifically to the details of the storage module 10, the upper and lower conveyor segments 16 and 18 include tracks configured to support the container carriers 17, and the container carriers 17 are configured to move along the tracks. For example, the upper conveyor segment 16 includes a first upper track 38 and a second upper track 40 offset from one another along the lateral direction A by a track width WT. Similarly, the lower conveyor segment 18 includes a first lower track 42 and a second lower track 44 offset from one another along the lateral direction A by the track width WT. Each of the tracks of the upper and lower conveyor segments 16 and 18 are elongate along the longitudinal direction L. Each of the tracks of the upper and lower conveyor segments 16 and 18 can include an upper track surface 46 that is configured to support wheels of the container carriers 17.

The storage module 10 can include one or more supports that couple the upper and lower conveyor segments 16 and 18 to one another. For instance, the storage module 10 can include one or more supports, such as one or more posts 48, that are coupled to the first upper track 38 and the first lower track 42 so as to position the first upper track 38 above the first lower track 42. Similarly, the storage module 10 can include one or more supports, such as one or more posts 48, that are coupled to the second upper track 40 and the second lower track 44 so as to position the second upper track 40 above the second lower track 44. The storage module 10 can optionally include one or more supports (not shown) that couple the first upper track 38 to the second upper track 40 so as to space the first and second upper tracks 38 and 40 from one another along the lateral direction A, and one or more supports (not shown) that couple the first lower track 42 to the second lower track 44 so as to space the first and second lower tracks 42 and 44 from one another along the lateral direction A.

Referring now to FIGS. 2 and 3, each container carrier 17 is configured to support a row of inventory storage containers 15 such that the storage containers 15 are offset from one another along the lateral direction A. For example, each container carrier 17 can be configured to support the storage containers 15 in a side-by-side relation such that the opposed sidewalls 15a and 15b of each storage container 15 are spaced from one another along the lateral direction A and at least one sidewall 15a or 15b of each storage container 15 faces a sidewall 15a or 15b of one another one of the storage containers 15 along the lateral direction A. In alternative embodiments (not shown), each container carrier 17 can be configured to support the storage containers 15 in an end-to-end relation such that the opposed end walls 15c and 15d of each storage container 15 are spaced from one another along the lateral direction A and at least one end wall 15c or 15d of each storage container 15 faces an end wall 15c or 15d of one another one of the storage containers 15 along the lateral direction A. Each container carrier 17 can also be configured to support the storage containers 15 in a stacked relation, such that each of one or more containers 15 of the first row has a container stacked thereon. Thus, each container carrier can be configured to support the first row of storage containers 15 and at least a second row of storage containers 15 stacked on the first row.

As described above, each container carrier 17 can have a carrier body 26 that has a pair of opposed carrier sides 26a and 26b and that are spaced opposite from one another along the lateral direction A, and a pair of opposed carrier ends 26c and 26d that are spaced opposite from one another along the longitudinal direction L. Each carrier body 26 can have a carrier width $W_S$ along the lateral direction A from one of the carrier sides 26a and 26b to the other one of the carrier sides 26a and 26b that is greater than a carrier length $L_S$ along the longitudinal direction L from one of the carrier ends 26c and 26d to the other one of the carrier ends 26c and 26d.

Each carrier body 26 can include a carrier upper end 26e and a carrier lower end 26f spaced from one another along the vertical direction V. Each carrier body 26 can define a plurality of openings 30 that extend through the upper and lower ends 26e and 26f. Further, each carrier body 26 can include at least one divider 32, such as a plurality of dividers 32. Each divider 32 can extend from one of the carrier ends 26c and 26d to the other along the longitudinal direction L. Each divider 32 can separate adjacent ones of the openings 30. Each opening 30 can be sized to receive a storage container 15 therein. Each opening 30 can be sized such that a lower portion of a corresponding container 15 extends through the opening 30, and the carrier upper end 26e supports an upper portion of the container 15. For example, each opening 30 can have a dimension along a select direction that is greater than a corresponding dimension along the select direction of one of the storage containers 15 at its bottom surface 15f, but less than a dimension along the select direction of the storage container 15 at a location that includes the at least one protrusion 15g. Thus, when a storage container 15 is supported by a container carrier 17, the at least one protrusion 15g of the storage container 15 rests on the container carrier 17, such as on the carrier upper end 26e.

The storage containers 15 can be densely packed within each container carrier 17 along the lateral direction A. For example, the storage containers 15 carried by each container carrier 17 can be arranged side-to-side (or end-to-end) such that there is little to no space between adjacent ones of the storage containers 15. In some embodiments, storage containers 15 carried by each container carrier 17 may contact one another other. In other embodiments, the storage containers 15 may be spaced from each other by a distance that is no more than 10 percent of the overall width of each storage container 15 or no more than 5 percent of the overall width of each storage container 15.

Each container carrier 17 includes a plurality of conveyor-segment engagement features that are configured to engage the conveyor segments 16, 18, 20, and 22 so that the container carrier 17 can be translated around the movement path 19. Each conveyor-segment engagement feature includes a wheel assembly 28 that includes a wheel 34 (see the enlarged detail view in FIG. 1). Thus, each container carrier 17 includes a plurality of wheel assemblies 28, each including a wheel 34 that rotates about an axis that extends along the lateral direction A. The container carriers 17 are configured such that their respective wheels 34 roll along the upper track surfaces 46 of the conveyor segments. Each wheel assembly 28 includes a flange 36 that is outwardly spaced from the wheel 34 along the lateral direction A. Each wheel 34 has a wheel diameter along a select direction that is perpendicular its rotational axis, and each flange 36 has an outer dimension along the select direction that is greater than the wheel diameter. Each flange 36 is configured to ride along an outer side of the upper and lower tracks so as to prevent its respective wheel 34 from riding off of the tracks. Each wheel assembly can additionally or alternatively include an inward flange (not shown) that is configured in a manner similar to that described above but is inwardly spaced from the wheel 34 along the lateral direction A. Each inward flange can be configured to ride along an inner side of the upper and lower tracks so as to prevent its respective wheel 34 from riding off of the tracks.

The wheel assemblies 28 of each container carrier 17 can include a first wheel assembly 28 at a first carrier side 26a and a second wheel assembly 28 at a second carrier side 26b. The wheels 34 of the first and second wheel assemblies 28 can be spaced from one another along the lateral direction A by the track width WT. Thus, the wheels 34 of the first and second wheel assemblies 28 are spaced from one another such that the wheels 34 ride along tracks of the first to fourth conveyor segments 16, 18, 20, and 22. Each container carrier 17 can optionally include a third wheel assembly 28 at the first carrier side 26a and a fourth wheel assembly at the second carrier side 26b. The third and fourth wheel assemblies 28 can be spaced from the first and second wheel assemblies along the longitudinal direction L. The wheels 34 of the third and fourth wheel assemblies 28 can be spaced from one another along the lateral direction A by the track width WT. Thus, the wheels 34 of the third and fourth wheel assemblies 28 can be spaced from one another such that the wheels 34 ride along tracks of the first to fourth conveyor segments 16, 18, 20, and 22.

Each container carrier 17 can include at least one stop 35. Each stop 35 can be a protrusion that extends outwardly from one of the carrier sides 26a and 26b. For example, each container carrier 17 can include first and second stops 49, wherein the first stop 35 extends from a first carrier side 26a and the second stop 35 extends from a second carrier side 26b. The first and second stops 35 can be offset from one another along the lateral direction A by the track width WT. In other words, the first and second stops 35 can be aligned over the first and second tracks of one of the upper and lower conveyor segments 16 and 18 along the vertical direction V. Thus, each stop 35 can be configured to contact one of the first and second tracks to prevent the container carrier 17 from falling down below the tracks in the event that one or more of the carrier wheel assemblies 28 breaks or separates from the container carrier body 26.

Each container carrier 17 can include at least one actuator engagement feature 37 that is configured to be engaged by an actuator to move the container carrier 17 along the upper and lower conveyor segments 16 and 18. Each actuator engagement feature 37 can be a protrusion that extends outwardly from a respective one of the carrier sides 26a and 26b. For example, each container carrier 17 can include first and second engagement features 37, wherein the first engagement feature 37 extends from the first carrier side 26a and the second engagement feature 37 extends from the second carrier side 26b. In alternative embodiments, the engagement feature 37 can be a side or end of a container carrier 17 or another suitable feature such as an opening that receives a protrusion carried by an actuator assembly.

Each container carrier 17 can include at least one bumper 39, such as a plurality of bumpers 39, each disposed on an outer surface of one of the carrier ends 26c or 26d. The bumpers 39 are configured and positioned to abut adjacent container carriers 17 so as to limit contact between the container bodies 26 of adjacent container carriers 17, or prevent such contact altogether. The bumpers 39 are configured to dampen noise that results from the container carriers 17 colliding with one another as they are moved around the movement path 19. The bumpers 39 can be pieces of a noise dampening material such as rubber, silicone, or other suitable material for dampening noise, and may have any suitable shape. In the embodiment shown, the bumpers 39 are rectangular shaped blocks; however, the bumpers 39 can have other suitable shapes.

The storage containers 15 can be supported by the container carriers 17 along the upper and lower conveyor segments 16 and 18 such that the storage containers 15 are densely packed along the upper and lower conveyor segments 16 and 18. For example, the container carriers 17 carried by the upper conveyor segment 16 can be arranged end-to-end such that there is little to no space between storage containers 15 of adjacent ones of the container carriers 17. Similarly, the container carriers 17 carried by the lower conveyor segment 18 can be arranged end-to-end such that there is little to no space between storage containers 15 of adjacent ones of the container carriers 17. In some embodiments, container carriers 17 and/or storage containers 15 along each conveyor segment may contact one another other. In other embodiments, the storage containers 15 supported by adjacent container carriers 17 may be spaced from each other by a distance that is no more than 10 percent of the overall length or width of each storage container 15 along the longitudinal direction L or no more than 5 percent of the overall length or width of each storage container 15 along the longitudinal direction L. As each container carrier 17 is moved from one of the first and second conveyor segments 16 and 18 to the other, the container carrier 17 is separated from the container carriers 17 supported by the first and second conveyor segments 16 and 18, thereby avoiding collisions between the moving container carrier 17 and the container carriers 17 supported by the first and second conveyor segments 16 and 18. As a result, the storage containers 15 supported by the first and second conveyor segments 16 and 18 can be spaced closer to one another than in comparable carousel systems where all of the storage units are rotated concurrently.

Returning to FIG. 2, the storage module 10 includes at least one movement system 50 configured to engage the container carriers 17 to push the container carriers 17 along the tracks of the upper and lower conveyor segments 16 and 18. The at least one movement system 50 and the vertical lifts 60(1) and 60(2) can operate in alternating fashion. Thus, the at least one movement system can push container carriers 17 along the longitudinal direction L, while the vertical lifts 60(1) and 60(2) are not transferring container carriers 17 along the vertical direction V. The first and second vertical lifts 60(1) and 60(2) can be configured to transfer container carriers 17 along the vertical direction, while the at least one movement system 50 is not pushing container carriers 17 along the longitudinal direction L.

In some embodiments, the storage module 10 can include a plurality of movement systems 50 configured to move the container carriers 17. For instance, the storage module 10 can include a first movement system 50(1) disposed adjacent the first module end 12 that is configured to engage an container carrier 17 so as to push the container carrier 17 towards the second module end 14. The container carrier 17 engaged by the first movement system 50(1) in turn pushes the downstream container carriers 17 towards the second module end 14. The first movement system 50(1) can push the container carriers 17 along the longitudinal direction without causing any container carriers 17 to move from one of the upper and lower conveyor segments 16 and 18 to the other of the upper and lower conveyor segments 16 and 18 along the vertical direction V.

The storage module 10 can include a second movement system 50(2) disposed adjacent the second module end 14 that is configured to engage an container carrier 17 so as to push the container carrier 17 towards the first module end 12. The container carrier 17 engaged by the second movement system 50(2) in turn pushes the downstream container carriers 17 towards the first module end 12. The second movement system 50(2) can push the container carriers 17 along the longitudinal direction without causing any container carriers 17 to move from one of the upper and lower conveyor segments 16 and 18 to the other of the upper and lower conveyor segments 16 and 18 along the vertical direction V.

The storage module 10 can include a third movement system 50(3) disposed adjacent the first module end 12 and configured to engage a container carrier 17 so as to push the container carrier 17 towards the second module end 14. The container carrier 17 engaged by the third movement system 50(3) in turn pushes the downstream container carriers 17 towards the second module end 14. The third movement system 50(3) can be spaced from the first movement system 50(1) along the lateral direction A, and can be configured to operate together with the first movement system 50(1). Thus, the first movement system 50(1) can be configured to engage an container carrier 17 at its first carrier side 26a, and the third movement system 50(3) can be configured to engage the container carrier 17 at its second carrier side 26b.

The storage module 10 can include a fourth movement system 50(4) disposed adjacent the second module end 14 that is configured to engage an container carrier 17 so as to push the container carrier 17 towards the first module end 12. The container carrier 17 engaged by the fourth movement system 50(4) in turn pushes the downstream container carriers 17 towards the first module end 12. The fourth movement system 50(4) can be spaced from the second movement system 50(2) along the lateral direction A, and can be configured to operate together with the second movement system 50(2). Thus, the second movement system 50(2) can be configured to engage an container carrier 17 at its first carrier side 26a, and the fourth movement system 50(4) can be configured to engage the container carrier 17 at its second carrier side 26b.

Turning now to FIGS. 5 to 8, cross-sectional views are shown of a first corner of the storage module 10 defined by the first module end 12 and the second module side 13 (in FIG. 2). Each cross-sectional view is taken along a plane that extends along the vertical direction V and the longitudinal direction L through the container carriers 17. Note that only a portion of each container carrier 17 is shown that includes the second carrier side 26b. Further, the storage containers 15 are omitted, and the second carrier side 26b is shown as transparent so that features behind the second carrier side 26b can be viewed. It will be understood that the second corner of the first module end 12 (i.e., at the first module side 11) can be a substantial mirror image of the first corner about a plane that extends along the vertical direction V and longitudinal direction L, although embodiments of the disclosure are not so limited. Further, the second module end 14 can be implemented as a mirror image of the first module end 12 about a plane that extends along the vertical direction V and lateral direction A, although embodiments of the disclosure are not so limited. Thus, the following description can apply similarly to the second corner of the first module end 12 and to both corners of the second module end 14.

Figure 5:
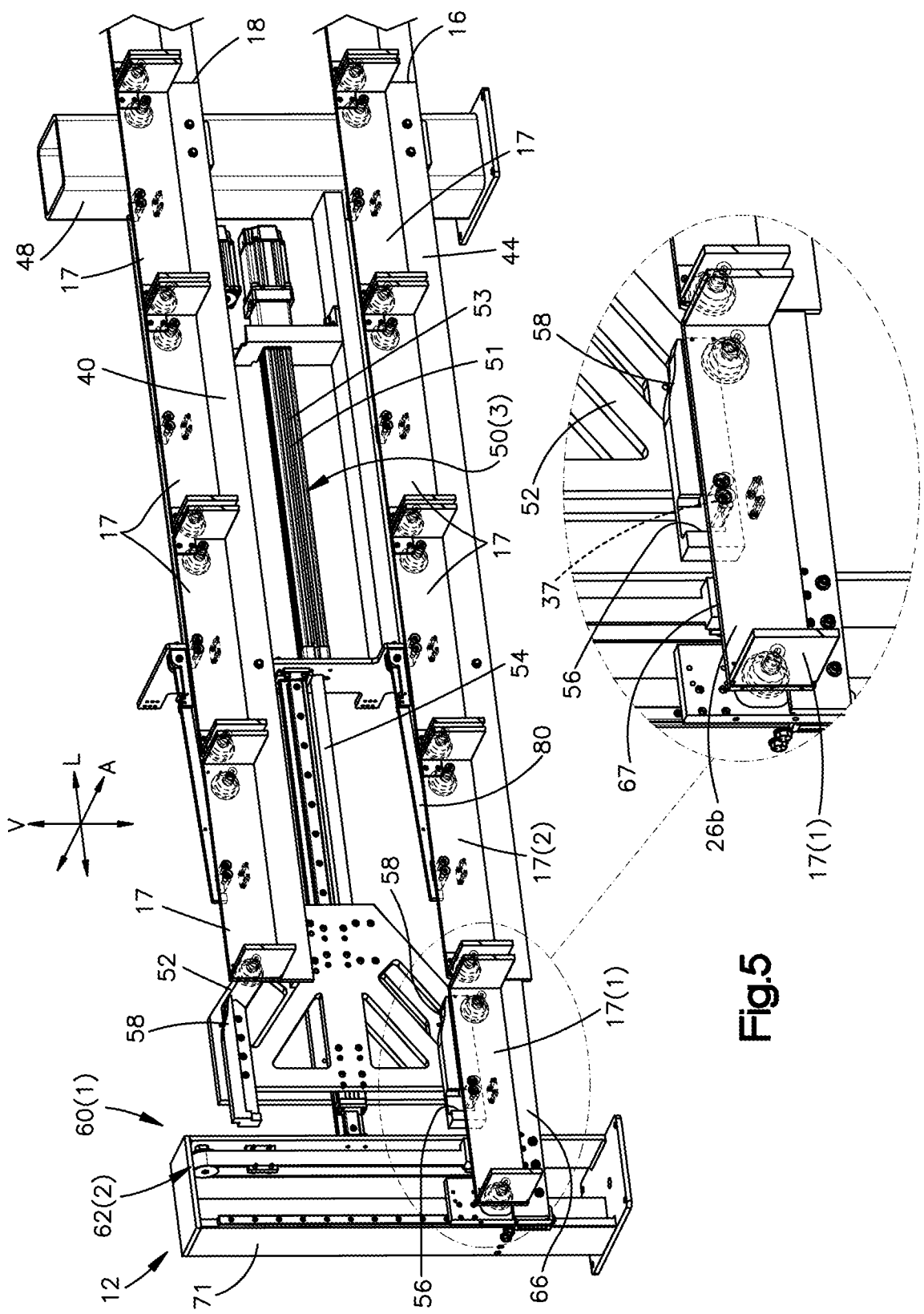
FIG. 5 shows an enlarged cross-sectional perspective view of one corner of the storage module of FIG. 1 according to one embodiment that includes an movement system in a first position and a vertical lift in a lowered position and showing a portion of the container carriers.

With specific reference to FIG. 5, each movement system can include an actuator 51 and a catch 52 that is coupled to the actuator 51. The actuator 51 is configured to move the catch 52 along the longitudinal direction L such that the catch 52 engages a container carrier 17 at a select one of the first and second module ends 12 and 14 and moves the container carrier 17 towards the other one of the first and second module ends 12 and 14. The actuator 51 can be any suitable actuator for moving the catch 52. For example, in one embodiment as shown in FIG. 5, the actuator 51 can be any suitable linear actuator, such (without limitation) a motor driven, pneumatic, or hydraulic actuator, that includes an actuator housing 53 and a piston rod 54. The catch 52 can be coupled to an end of the piston rod 54. The piston rod 54 can be configured to extend from and retract into the housing 53 along the longitudinal direction L so as to move the catch 52 along the longitudinal direction L.

The catch 52 can include a first carrier engagement surface 56 that is aligned with one of the first and second conveyor segments 16 and 18 along the longitudinal direction L. The first carrier engagement surface 56 is configured to engage a container carrier 17 so as to push the container carrier 17 along the longitudinal direction L. For example, the first carrier engagement surface 56 can be positioned so as to engage and push container carriers 17 from a respective one of the first and second vertical lifts 60(1) and 60(2) onto the upper conveyor segment 16 in a first longitudinal direction when the storage module 10 operates in a first rotational direction (e.g., clockwise or counter clockwise). The first carrier engagement surface 56 can be configured to engage an actuator engagement feature 37 of a container carrier 17. The first engagement surface 56 can extend along the vertical direction V and lateral direction A, and can face inwardly.

The catch 52 can include a second carrier engagement surface 56 that is aligned with the other one of the first and second conveyor segments 16 and 18 along the longitudinal direction L. The first and second carrier engagement surfaces 56 can be spaced from one another along the vertical direction V. The second carrier engagement surface 56 is configured to engage a container carrier 17 so as to push the container carrier 17 along the longitudinal direction L. For example, the second carrier engagement surface 56 can be positioned so as to engage and push container carriers 17 from the respective one of the first and second vertical lifts 60(1) and 60(2) onto along the lower conveyor segment 18 in the first longitudinal direction when the storage module 10 operates in a second rotational direction, opposite the first rotational direction. The second carrier engagement surface 56 can be configured to engage an actuator engagement feature 37 of a container carrier 17. The second engagement surface 56 can extend along the vertical direction V and lateral direction A, and can face inwardly. It will be understood that, in embodiments in which the storage module 10 operates in a unidirectional manner, the catch 52 can be implemented with just one of the first and second carrier engagement surfaces 56.

The catch 52 can be implemented as a plate that is attached to the end of the piston rod 54. The plate can include a plate body and the carrier engagement surfaces 56 can be attached to the plate body. In other embodiments, the carrier engagement surfaces 56 can be integral to the plate. In yet other embodiments, the catch 52 can be implemented using structure other than the plate, such as a rod or block, that includes carrier engagement surfaces 56. It will be understood that in alternative embodiments, each movement system 50 can include a pair of carrier engagement surfaces that are each controlled by their own actuator 51, rather than a shared actuator 51. Thus, each movement system can include a pair of actuators 51 offset from one another along the vertical direction V (one for each of the first and second conveyor segments 16 and 18), and each of the actuators can be coupled to a different carrier engagement surface 56.

Figure 9:
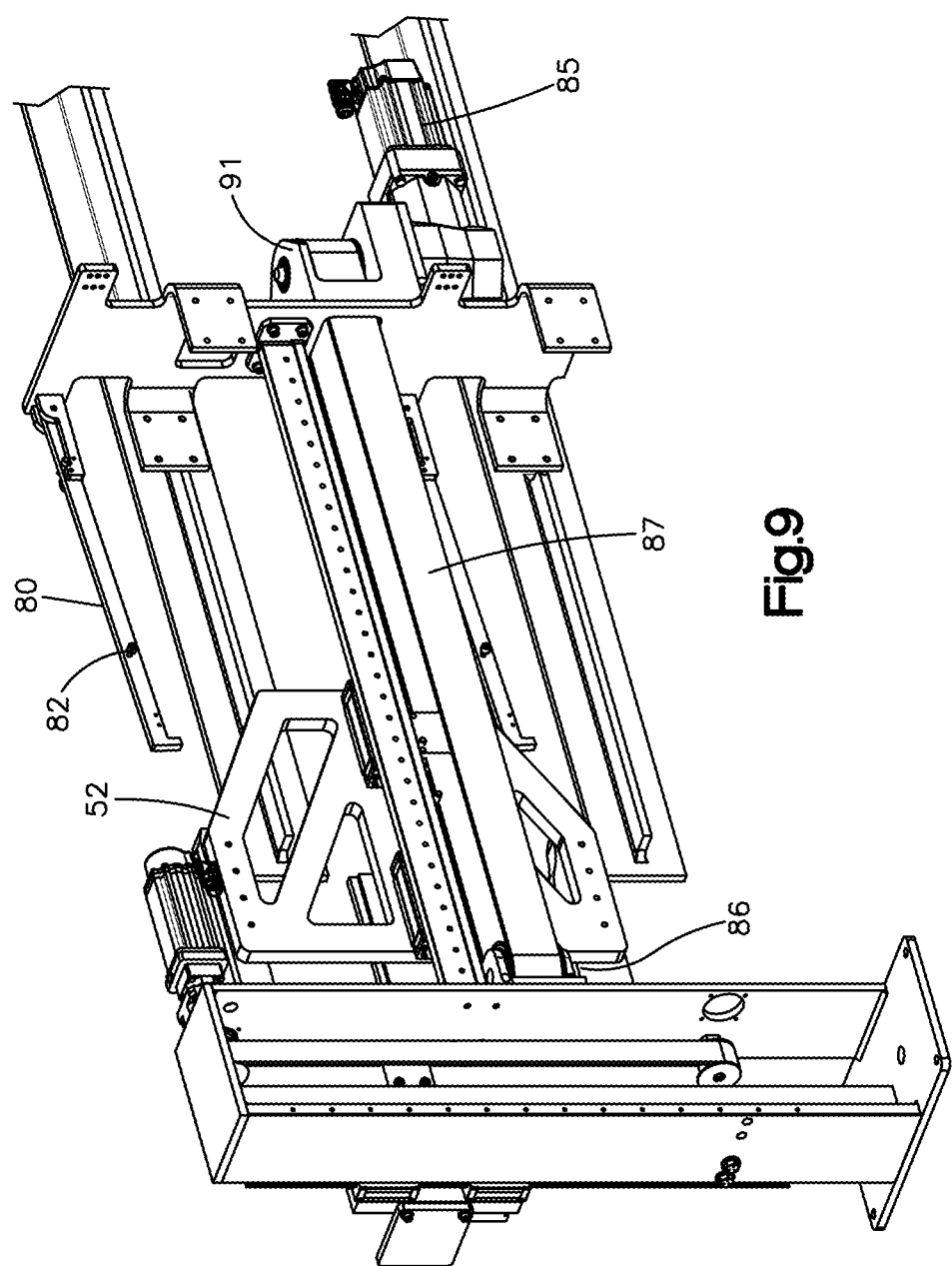
FIG. 9 shows an enlarged perspective view of the corner of the storage module of FIG. 1 according to another embodiment that includes a belt-driven movement system and a vertical lift.

Turning briefly to FIG. 9, an alternative embodiment is shown in which the actuator 51 is a belt- or chain-driven actuator that includes a drive 85 such as a motor, a pair of pulleys or gears 86 and a belt or chain 87. The pulleys or gears 86 can be positionally fixed and can be spaced apart from one another along the longitudinal direction L. The belt or chain 87 can define a closed loop that wraps around the pair of pulleys or gears 86. The catch 52 can be fastened or otherwise coupled to the belt or chain 87 between the pair of pulleys or gears 86 with respect to the longitudinal direction L. The catch 52 can include the at least one carrier engagement surface 56 configured as described above.

The drive 85 can be configured to cause the catch 52 to translate back and forth along the longitudinal direction L. For example, the drive 85 can be configured to rotate one of the pulleys or gears 86 in a first rotational direction so as to cause the belt or chain 87 to rotate around the pair of pulleys or gears 86 and the catch 52 to translate along a first longitudinal direction towards one of the pulleys or gears 86. The drive 85 can further be configured to rotate the one of the pulleys or gears 86 in a second rotational direction, opposite the first rotational direction, so as to cause the catch 52 to translate along a second longitudinal direction L, opposite the first longitudinal direction, towards the other one of the pulleys or gears 86.

Figure 7:
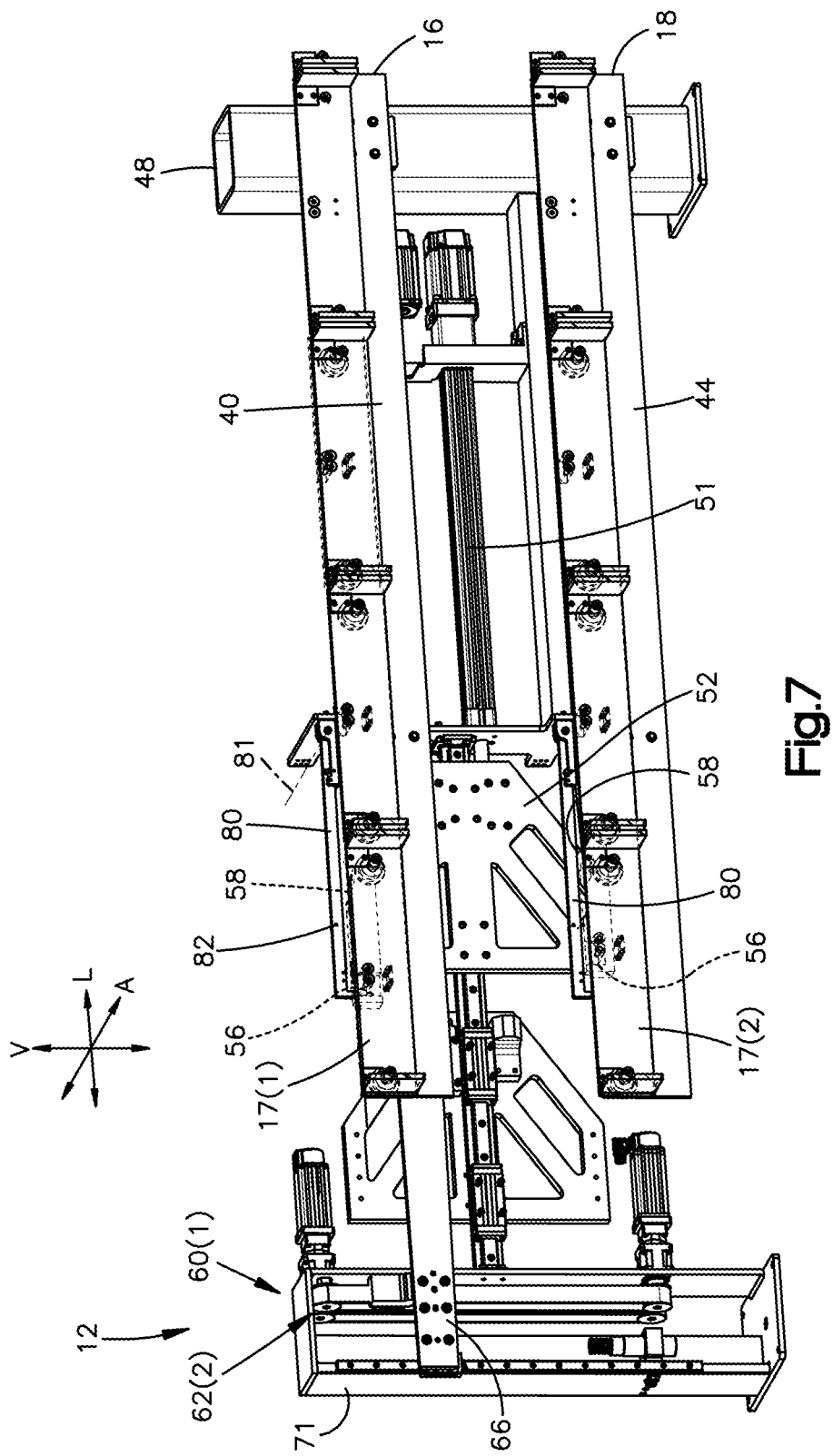
FIG. 7 shows an enlarged cross-sectional perspective view of the corner of FIG. 5 with the movement system in a second position and the vertical lift in the raised position.

With reference to FIG. 7, the storage module 10 can include a plurality of pivoting hooks 80 that are configured to engage the container carriers 17. For instance, the storage module 10 can include, for each movement system 50(1) to 50(4), an upper pivoting hook 80 and a lower pivoting hook 80 spaced from one another along the vertical direction V. As will be described in further detail below, the upper pivoting hook 80 can be configured to prevent container carriers 17 on the upper conveyor segment 16 from moving outwardly onto a respective one of the first and second vertical lifts 60(1) and 60(2). Similarly, the lower pivoting hook 80 can be configured to prevent container carriers 17 on the lower conveyor segment 18 from moving outwardly onto a respective one of the first and second vertical lifts 60(1) and 60(2).

Each pivoting hook 80 can be configured to pivot about a pivot axis 81 that extends along the lateral direction A. To support pivoting, the catch 52 can include a ramped surface 58 for the upper pivoting hook 80 and a ramped surface 58 for the lower pivoting hook 80. Each ramped surface 58 can be angled upwards as the ramped surface extends outwardly away from a center of the storage module 10. Further, each pivoting hook 80 can have an engagement surface 82 that rides along a corresponding one of the ramped surfaces 58 to raise and lower the hook 80 between raised and lowered positions. For instance, the engagement surface 82 can ride up a corresponding one of the ramped surfaces 58 so as to raise the pivoting hook 80 and ride down the corresponding one of the ramped surfaces 58 so as to lower the pivoting hook 80. In one embodiment, the engagement surface 82 can be the outer surface of a pin or wheel that extends from a body of the hook along the lateral direction A. In the lowered position, the pivoting hook 80 can act as a stop that engages a respective actuator engagement feature 37.

Referring back to FIG. 2, each vertical lift 60(1) and 60(2) is configured to transfer container carriers 17 between the upper and lower conveyor segments 16 and 18. In so doing, each vertical lift 60(1) and 60(2) can be configured to be moved between a lowered position, wherein the vertical lift is vertically aligned with the lower conveyor segment 16, and a raised position, wherein the vertical lift is vertically aligned with the upper conveyor segment 18. Each vertical lift 60(1) and 60(2) can be configured to operate in a unidirectional manner to transfer container carriers 17 from one of the upper and lower conveyor segments 16 and 18 to the other one of the upper and lower conveyor segments 16 and 18. Alternatively, each vertical lift 60(1) and 60(2) can be configured to operate in a bidirectional manner to transfer container carriers 17 from the upper conveyor segment 16 to the lower conveyor segment 18 and from the lower conveyor segment 18 to the upper conveyor segment 16.

Each vertical lift 60(1) and 60(2) includes at least one lift actuator system that is configured to move container carriers 17 between the lowered and raised positions. In some embodiments, each vertical lift 60(1) and 60(2) can include a first lift actuator system 62(1) and a second lift actuator system 62(2) that are spaced from one another along the lateral direction A. The first and second lift actuator systems 62(1) and 62(2) can be configured to operate together to move container carriers 17 between the lowered and raised positions.

Each vertical lift 60(1) and 60(2) can include at least one conveyor surface 67 that is configured to support container carriers 17 thereon. Each vertical lift 60(1) and 60(2) can be configured to move its respective at least one conveyor surface 67 between the lowered and raised positions. In the embodiment shown, the at least one conveyor surface 67 is defined by tracks 66. However, it will be understood that, in alternative embodiments, the at least one conveyor surface can be implemented using any suitable conveyor elements such as tracks, belts, rollers, skate wheels, balls, any other suitable conveyor elements for translating the container carriers 17, or any suitable combination of conveyor elements.

Figure 6:
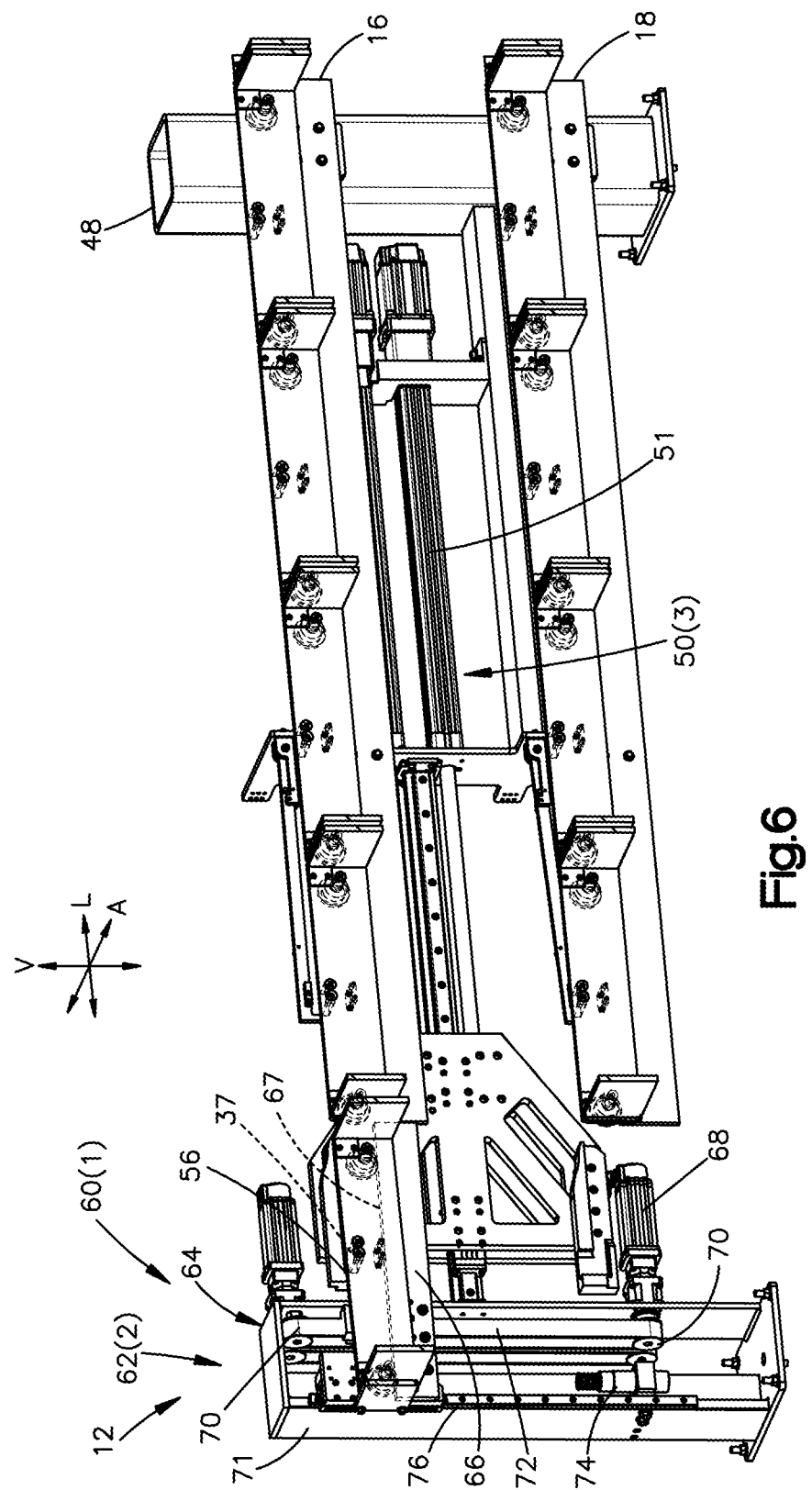
FIG. 6 shows an enlarged cross-sectional perspective view of the corner of FIG. 5 with the movement system in the first actuated position and the vertical lift in a raised position.

With reference to FIG. 6, each lift actuator system 62(1) and 62(2) can include an actuator 64 and a track 66 that is coupled to the actuator 64. The actuator 64 is configured to raise the track 66 to a raised position where the track 66 is aligned with one of the upper tracks of the upper conveyor segment 16. The actuator 64 is further configured to lower the track 66 to a lowered position where the track 66 is aligned with one of the lower tracks of the lower conveyor segment 18. The track 66 includes an upper track surface 67 that is configured to support wheels 34 of the container carriers 17. The container carriers 17 are sized and positioned such that their respective wheels 34 roll along the upper track surface 67 of the track 66. Optionally, the upper track surface 67 can be ramped downward as it extends away from a center of the storage module 10 so as to prevent a container carrier 17 on the track 67 from rolling from vertical lift towards the upper and lower conveyor segments 16 and 18 as the vertical lift is moving between the raised and lowered positions. The ramped surface 67 can further be used to create separation between a container carrier 17 received on the ramped surface 67 and the container carriers 17 that are disposed on the upper and lower conveyor segments 16 and 18.

The actuator 64 can include a belt- or chain-driven actuator that includes a drive 68 such as a motor, a pair of pulleys or gears 70, and a belt or chain 72. Note that, in alternative embodiments, each actuator 64 can be any other suitable actuator such as a linear actuator described above in relation to the movement systems 50(1) to 50(4). The storage module 10 can further include a support 71 that supports the actuator 64. The pulleys or gears 70 can be positionally fixed and can be spaced apart from one another along the vertical direction V. The belt or chain 72 can define a closed loop that wraps around the pair of pulleys or gears 70. The track 66 can be fastened to the belt or chain 72. For example, the track 66 can be fastened to the belt or chain 72 between the pair of pulleys or gears 70 with respect to the vertical direction V.

The drive 68 can be configured to cause the track 66 to translate up and down along the vertical direction V. For example, the drive 68 can be configured to rotate one of the pulleys or gears 70 in a first rotational direction so as to cause the belt or chain 72 to rotate around the pair of pulleys or gears 70 and the track 66 to translate along a first vertical direction towards one of the pulleys or gears 70. The drive 68 can further be configured to rotate the one of the pulleys or gears 70 in a second rotational direction, opposite the first rotational direction, so as to cause the track 66 to translate along a second vertical direction, opposite the first vertical direction, towards the other one of the pulleys or gears 70.

Each lift actuator system 62(1) and 62(2) can include a rail 76 that extends along the vertical direction V. The rail 76 can be a linear rail. The rail 76 can be supported by the support 71. The track 66 can be configured to ride up and down the rail 76 along the vertical direction V as the track 66 moves between the raised and lowered positions. The track 66 can be coupled to the rail 76. For example, an outermost end of the track 66 can be coupled to the rail 76 such that the track 66 is cantilevered inwardly towards a center of the storage module 10. The track 66 can be coupled to the belt or chain 72 between the outermost end of the track 66 and an innermost end of the track 66. For instance, the track 66 can be coupled to the belt or chain 72 at a location that is spaced from the outermost end of the track 66 along the longitudinal direction L. Use of the rail 76 can limit the amount of torque placed by the track 66 on the belt or chain 72 and can maintain the track 66 in an upright orientation such that the track 66 can be aligned with the upper and lower conveyor segments 16 and 18.

Each lift actuator system 62(1) and 62(2) can optionally include a stop 74 disposed below the track 66. The stop 74 can be configured to obstruct descent of the track 66 in the event of a failure of the actuator 64 such as a belt failure. The stop 74 can be implemented as a force-dampening stop, as a cushion, a spring-loaded plunger, an acceleration plunger, or any other suitable force-dampening device that dampens force applied along the downward direction.

In FIGS. 5 to 8, an upper track 40, a lower track 44, a lift actuator system 62(2), a movement system 50(1), and a pair of vertically spaced hooks 80 are shown as being supported by supports 48 and 71 on an inner side of the storage module 10. As shown, the supports 48 and 71 can support another upper track, another lower track, another lift actuator system, another movement system, and another pair of vertically spaced hooks on an outer side of the storage module 10. The other upper track, lower track, lift actuator system, movement system, and pair of vertically spaced hooks can be used by a neighboring storage module that is adjacent to the storage module 10. Thus, the storage module 10 and the neighboring storage module can share the supports 48 and 71. Sharing supports 48 and 71 can decrease the space between neighboring storage modules, thereby increasing the amount of space that can be used for storage.

Turning now to FIGS. 5 to 8, one method of transferring the container carriers 17 around the movement path 19 in a clockwise direction will be described. In the following discussion, the operation of the storage module 10 at the corner defined by the first module end 12 and the second module side 13 is described. It will be understood that the operation of the storage module 10 at the corner defined by the first module end 12 and the first module side 11 can be identical. In FIG. 5, the vertical lift 60(1) is in the lowered position and the movement system 50(3) is in a first position, which may also be referred to as an outward position. A first container carrier 17(1) is pushed from the lower conveyor segment 18 onto the vertical lift 60(1). In particular, the movement systems 50(2) and 50(4) at the second module end 14 (shown in FIG. 2), push a plurality of container carriers 17 along the lower conveyor segment 18, which in turn push the first container carrier 17(1) onto the vertical lift 60(1). A pivoting hook 80 lowers so as to engage a second container carrier 17(2) that is immediately upstream of the first container carrier 17(1) so as to ensure that the second container carrier 17(2) does not move into the path of the vertical lift 60(1).

Figure 8:
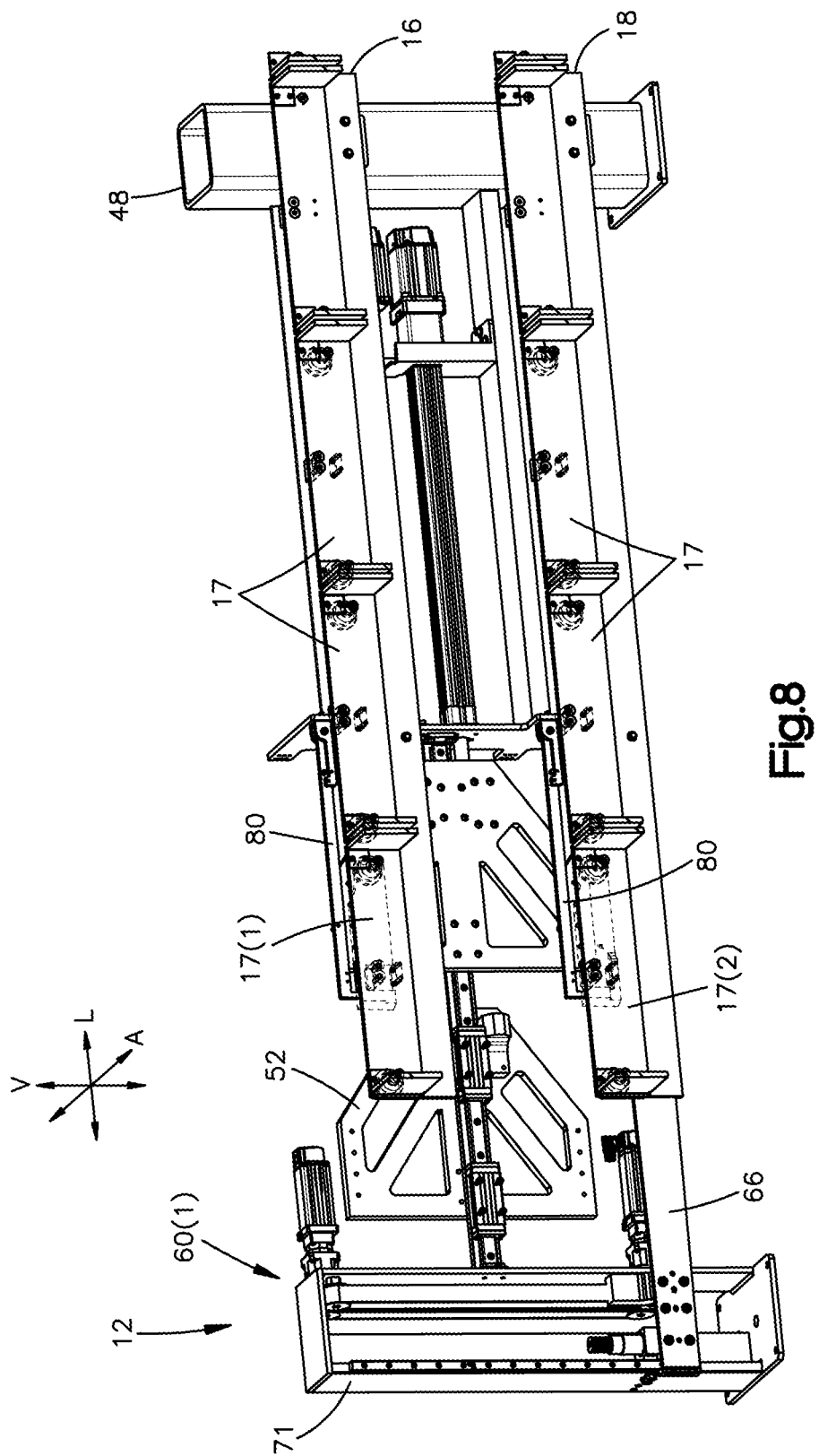
FIG. 8 shows an enlarged cross-sectional perspective view of the corner of FIG. 5 with the movement system in a second position and the vertical lift in the lowered position.

In FIG. 6, the vertical lift 60(1) moves the first container carrier 17(1) from the lowered position to the raised position. As the vertical lift 60(1) moves the first container carrier 17(1), at least some, up to all, of the container carriers 17 on the upper and lower conveyor segments 16 and 18 can remain stationary. In the raised position, the actuator engagement feature 37 of the first container carrier 17(1) is in vertical alignment with the upper carrier engagement surface 56 of the catch 52. In FIG. 7, the actuator 51 moves the catch 52 along the longitudinal direction L towards the second module end 14 from the first position to a second position, which may be referred to as an inward position, thereby causing the upper carrier engagement surface 56 to push the first container carrier 17(1) from the vertical lift 60(1) onto the upper conveyor segment 16. Movement of the first container carrier 17(1) in turn pushes the downstream container carriers 17 on the upper conveyor segment 16 until one of the container carriers (not shown in FIG. 7) is transferred from the upper conveyor segment 16 onto the second vertical lift 60(2) (not shown in FIG. 7). Further, as the actuator 51 actuates, the upper and lower pivoting hooks 80 ride up respective ramped surfaces 58 of the catch 52 so as to raise the pivoting hooks 80 out of engagement with the container carriers 17(1) and 17(2). In FIG. 8, the vertical lift 60(1) is returned from the raised position to the lowered position. As the vertical lift 60(1) is returned to the lowered position, at least some, up to all, of the container carriers 17 on the upper and lower conveyor segments 16 and 18 can remain stationary. The steps of FIGS. 5-8 can then be repeated to transfer the second container carrier 17(2) to the upper conveyor segment 16.

It will be noted that the second module end 14 operates in a similar manner such that the second vertical lift 60(2) transfers container carriers 17 from the upper conveyor segment 16 to the lower conveyor segment 18. It will be understood that the process can also be reversed such that the first vertical lift 60(1) transfers container carriers 17 from the upper conveyor segment 16 to the lower conveyor segment 18, and the second vertical lift 60(2) transfers container carriers 17 from the lower conveyor segment 18 to the upper conveyor segment 16.

Figure 10:
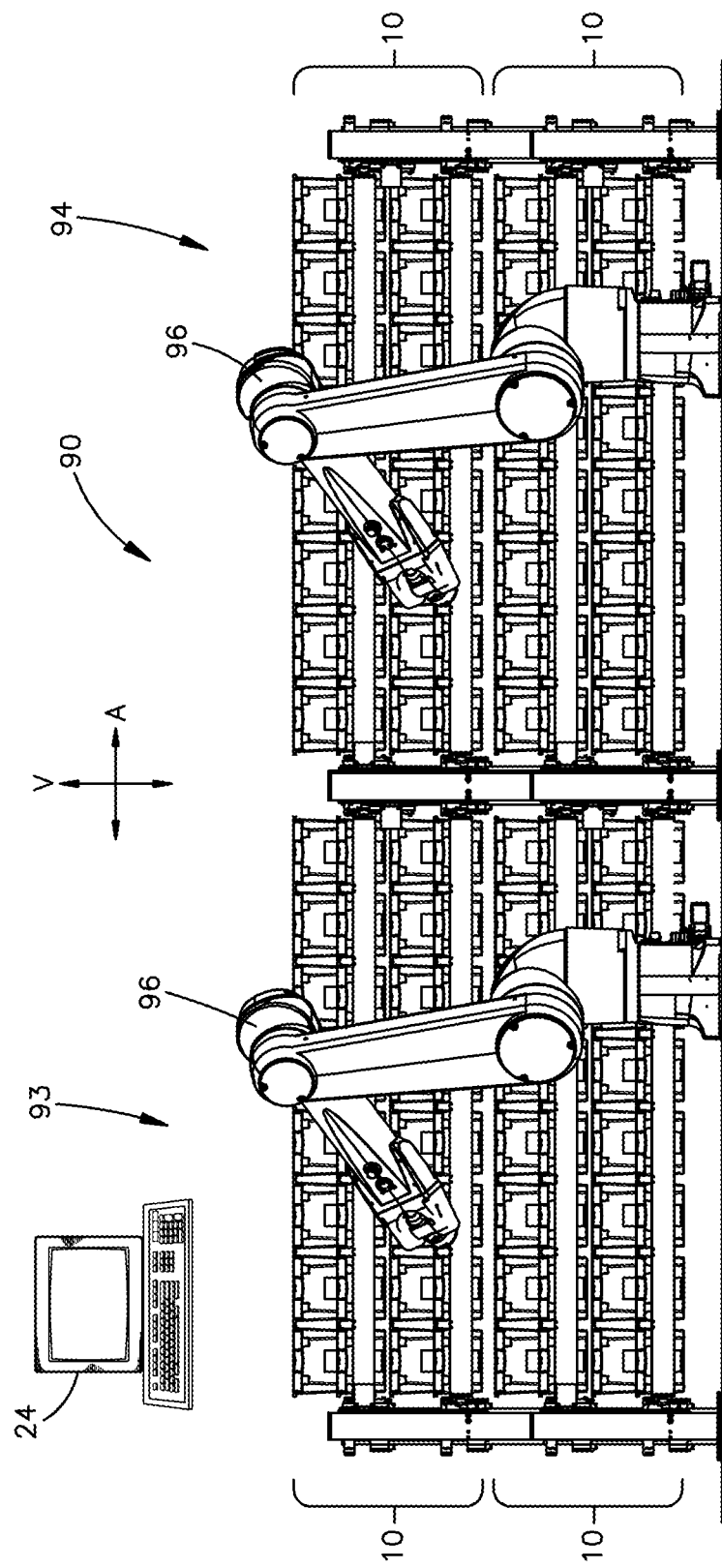
FIG. 10 shows an end view of a storage system according to one embodiment that comprises a plurality of instances of the storage module of FIG. 1.

Referring to FIG. 10, a modular storage and retrieval system 90 is shown that comprises a plurality of instances of the storage module 10 of FIG. 1, each supporting a plurality of storage container 15. In general, storage systems of the disclosure can include at least one vertical stack of storage modules that comprises at least two of the storage modules stacked on top of one another along the vertical direction V. In at least some embodiments, the system 90 can include the storage containers 15 supported by the system 90, although it will be understood that the system 90 can be made and sold without the storage containers 15.

In FIG. 10, the storage system 90 comprises a first system end 91, and a second system end that is spaced from the first system end 91 along the longitudinal direction L. The storage system 90 includes a plurality of instances of the storage module 10, each extending from the first system end 91 to the second system end. The plurality of storage modules 10 includes a first vertical stack 93 of the storage modules 10 that comprises a plurality (e.g., at least two) of the storage modules 10 stacked on top of one another along the vertical direction V. The storage system 90 further includes a second vertical stack 94 of the storage modules 10 that comprises a plurality (e.g., at least two) of the storage modules 10 stacked on top of one another along the vertical direction V. The second vertical stack 94 can be offset from the first vertical stack 93 along the lateral direction A.

Each storage module 10 of the system 90 can be independently operated such that storage containers 15 of each storage module 10 can be driven around their corresponding movement path independently of the storage containers 15 of other storage modules 10 being driven around their corresponding movement path. Although two vertical stacks 93 and 94, each having two storage modules 10 are shown, it will be understood that the number of vertical stacks and the number of storage modules 10 in each vertical stack can vary from that shown. In particular, modular storage and retrieval systems of the disclosure can include at least one vertical stack of storage modules 10 or more than one vertical stack of storage modules 10. Further, each vertical stack of storage modules 10 can have at least two storage modules 10 stacked on top of one another or more than two storage modules 10. Thus, height, width, and length of the system 90 can be scalable to fit within a desired volume in a warehouse space.

The modular storage and retrieval storage system 90 can include supports 95 that are coupled to the conveyor segments in each storage module 10 in each vertical stack 93 and 94 so as to maintain the storage modules 10 in a stacked relation. The supports 95 can further be coupled to laterally adjacent storage modules 10 so as to attach the vertical stacks 93 and 94 of storage modules 90 to one another. The supports 95 can combine to form a frame of the system 90. Note that each support 95 can be formed by coupling or fastening the corresponding supports (see e.g., 48, 71 in FIG. 2) of vertically stacked storage modules 10 to one another, or by making the corresponding supports integral to one another.

The storage modules 10 can be stacked on top of one another so that the space between the storage containers 15 of each storage module 10 and a storage module 10 immediately over top of the storage module 10 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers 15, such as a spacing that is no more than 20 percent of the height of the storage container 15, such as no more than 15 percent of the height of the storage container 15, such as no more than 10 percent of the height of the storage container 15, or such as no more than 5 percent of the height of the storage container 15. Storage density is inversely proportional to the distance between the storage containers 15 of vertically adjacent storage modules 10. Thus, as this distance is decreased, the storage density increases.

The modular storage and retrieval system 90 can also include at least one robotic manipulator 96 and at least one controller 24 that can be implemented as described above. For example, the system 90 can include at least one robotic manipulator 96 that services the first system end of each storage module 10 in a vertical stack. The system 90 can additionally or alternatively include at least one robotic manipulator 96 that services the second system end 14 of each vertical stack of storage modules 10 as shown. In some embodiments, the manipulators 96 at the first system end 91 can be used to stow inventory items or storage containers 15 in the storage modules 10, and the manipulators 96 at the second system end can be used to retrieve inventory items or storage containers 15 from the storage modules 10. Alternative embodiments can include at least manipulator 96 on only one end of a vertical stack, the at least one manipulator 96 configured to perform both stowing and retrieving operations. Additionally or alternatively, one or more of the robotic manipulators 96 can service multiple vertical stacks of storage modules 10. Although not shown, in some embodiments, the at least one robotic manipulator 96 can be configured to move vertically and/or horizontally to service the storage modules 10 of the system 90. For example, a robotic manipulator 96 can be mounted on a horizontal and/or vertical track to enable it to move with respect to the vertical stacks.

Other material conveyance devices (not shown) may also be disposed adjacent to the robotic manipulators 96. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices can be used to transport inventory items and/or storage containers to and from the robotic manipulators 96.

In operation, a method of operating the system 90 comprises causing a desired storage container 15 in the system 90 to be identified to either retrieve an inventory item from or stow an inventory item into. Further, the method comprises causing a location of the storage container 15 in the system 90 to be identified. Identifying the location can include identifying the storage module 10 and optionally the position of the storage container 15 on the identified storage module 10. Once the location is identified, the method comprises causing the container carriers 17, and hence the storage containers 15, of the identified storage module 10 to be translated around the movement path of the identified storage module 10 until the desired storage container 15 is presented at a desired one of the first and second ends 12 and 14 of the identified storage module 10. The translating steps can be performed in a manner similar to that described above in relation to FIGS. 5-8.

The method then comprises retrieving an inventory item from the desired storage container 15, or stowing an inventory item into the desired storage container 15. This step can be performed by a human who manually retrieves an inventory item from the desired storage container 15 or stows the inventory item into the desired storage container 15. Alternatively, this step can comprise causing a robotic manipulator 96 to move so as to retrieve an inventory item from the desired storage container 15, or stow an inventory item into the desired storage container 15. In some embodiments, the human or robotic manipulator 96 can retrieve the desired storage container 15 itself from the system 90, and then the inventory item can be retrieved from the desired storage container 15. The storage container 15 can then be stowed by the human or a robotic manipulator 96 onto a desired one of the storage modules 10. In so doing, the storage container 15 can be stowed onto the same storage module 10 from which the storage container 15 was retrieved or can be stowed in a different storage module. At least one, up to all, of these steps can be controlled by the controller 24.

Description of FIGS. 11 to 21

Turning now to FIGS. 11 to 21, an inventory storage module 100 according to another embodiment is shown. In general, as described above, the storage module 10 has a first end 12, a second end 14, a first side 11, and a second side 13. Further, the storage module 10 has first to fourth conveyor segments 16, 18, 20, and 22. In this embodiment, the first and second conveyor segments 16 and 18 are offset from one another along the vertical direction V. Thus, the first and second conveyor segments 16 and 18 can be referred to as upper and lower conveyor segments, respectively. Further, the storage module 100 is configured to move container carriers 17, where each container carrier 17 supports at least one storage container 15. The upper and lower conveyor segments 16 and 18 are configured to transfer the container carriers 17 along the longitudinal direction L. The third and fourth conveyor segments 20 and 22 are implemented as connecting portions 110a and 112b that connect the upper and lower conveyor segments 16 and 18. Each of the connecting portions 110a and 110b is configured to transfer the container carriers 17 between the upper and lower conveyor segments 16 and 18. Thus, the conveyor segments 16, 18, 20, and 22 together are configured to transfer the container carriers 17 around the movement path 19.

Figure 11:
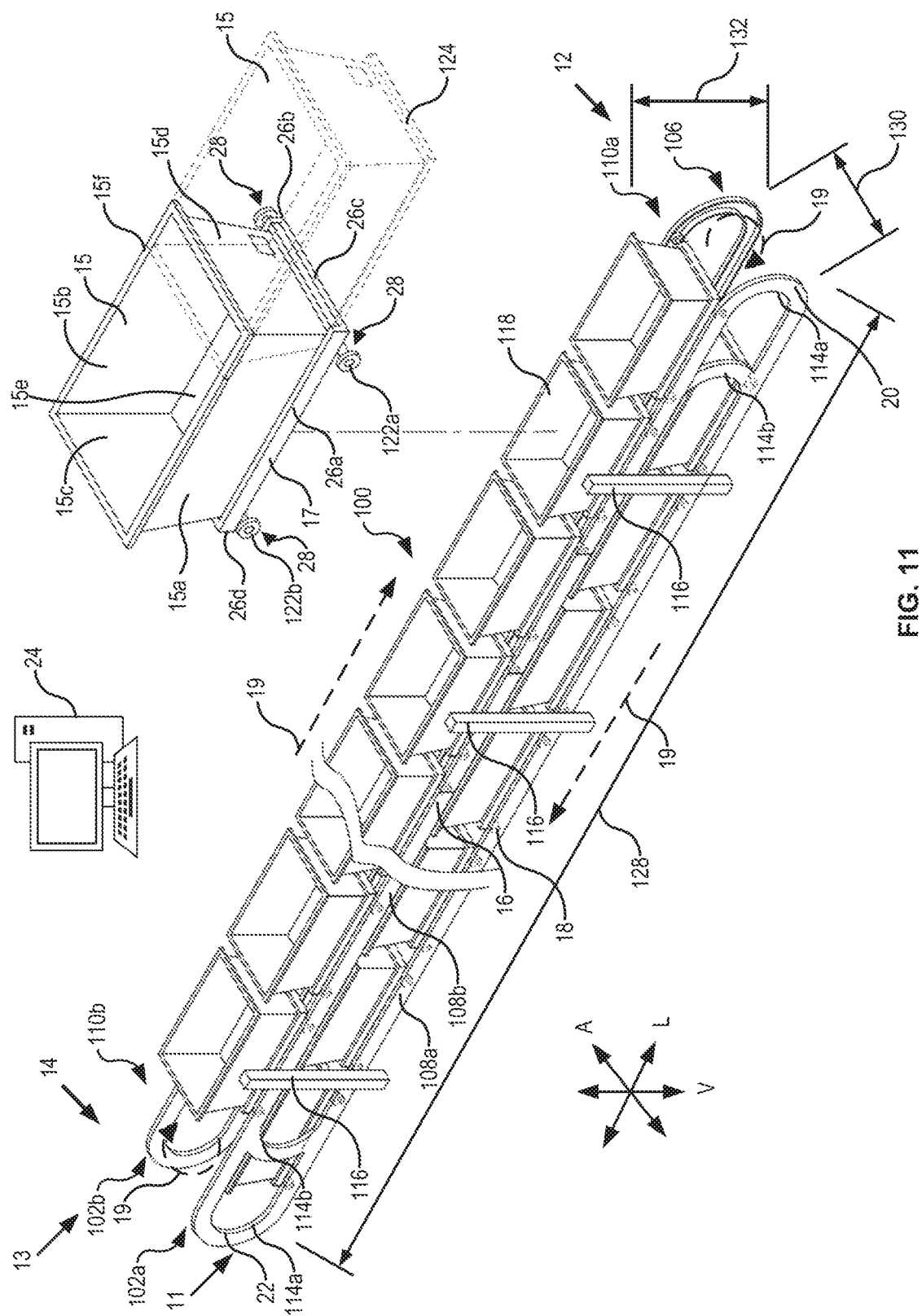
FIG. 11 illustrates a perspective view of a storage module according to a second embodiment.

With specific reference to FIG. 11, the storage module 100 includes a frame 105 including components 102a, 102b. The stackable storage module 100 also includes container carriers 17 and a movement system 106. The frame 102 is formed from a rigid material such as steel, iron, aluminum, high density plastics, or other similar materials. The components 102a, 102b are longitudinally narrow and spaced apart at a width corresponding to the container carrier 17 (e.g., to enable support of the container carriers 17). This spaced apart width, in some examples, may be greater than or equal to 18".

The frame 102 defines two levels, a lower level 108a and an upper level 108b. The upper conveyor segment 16 is at least partially defined by the upper level 108b, and the lower conveyor segment 18 is at least partially defined by the lower level 106a. The lower level 108a is connected to the upper level 108b via a front connecting portion 110a and a rear connecting portion 110b. The third conveyor segment 20 is at least partially defined by the front connecting portion 110a, and the fourth conveyor segment 22 is at least partially defined by the rear connecting portion 110b.

Structurally, each module 100 includes cross members that extend between components 102a and 102b and secure them together. These cross members are positioned out of the path of travel of the carriers and containers, e.g., being positioned along the bottom of each level 108a, 108b of the frame. The frame 102 can include tracks, grooves, pathways, rails, and other guiding structures configured along both levels 108 and the connecting portions 110 to define a carrier movement path 19. In this embodiment, the movement path, which is illustrated by the dashed arrows forms a loop. For example, the connecting portions 110 can include at least two semi-circular portions 114a, 114b. The semi-circular portions 114 are constructed to enable vertical movement of the container carriers 17. In some examples, the semi-circular portions 114 have an arcuate shape that includes one or more curves. In some examples, the movement path 19 is defined as a closed shape such as a generally oval shape, rectangular shape, and other elongated shape.

The frame 102 may also include support structures 116, a few of which are labeled. The support structures 116 may be coupled to the two opposing components 102a, 102b or otherwise formed as part the frame 102. For example, a lower portion of the support structure 116 can be coupled to the lower level 108a and an upper portion of the support structure 116 may be coupled to the upper level 108b. Generally, the support structures 116 are configured to support the stackable storage module 100. In particular, the support structures 116 are configured to enable coupling of multiple stackable storage modules 100. For example, upper portions of the support structures 116 may be configured to couple with lower portions of corresponding support structures 116 of a different stackable storage module 100 disposed above the illustrated stackable storage module 100. In some examples, the support structures 116 define upper support surfaces at upper distal ends of the support structures 116 and lower support surfaces at lower distal ends of the support structures 116. In some examples, the upper distal ends are configured to couple with the lower distal ends. For example, the upper distal ends can have female ends configured to receive corresponding male ends of the lower distal ends. The frame 102 may also include cross members that extend between and connect the components 102a, 102b. The cross members may be positioned out of the path of travel of the container carriers 17 and the storage containers 15, e.g., may be positioned along the bottom of each level 108a, 108b.

The container carriers 17 may be disposed on each level 108 (e.g., in communication with the guiding structures) and configured to support storage containers 15. In some examples, the stackable storage module 100 may be defined by a pair of parallel planes that encloses the used volume of the stackable storage module 100. For example, a first, upper plane may be aligned with the top edges of the storage containers 15 disposed on the upper level 108b. A second, lower plane may be aligned with an underside of the container carriers 17 disposed on the lower level 108a (e.g., below the underside of the container carriers 17 disposed on the lower level 108a).

The container carriers 17 may be moveable along the movement path 19 (e.g., horizontally along each level 108 and along the arcuate paths at each connecting portion 110a, 110b) between the two horizontal planes defined above. The movement system 106, as illustrated in greater detail with reference to FIGS. 14-17, may cause the container carriers 17 (and the corresponding storage containers 15) to sequentially move along the carrier movement path 19 to present individual container carriers 17 at the ends of the frame 102. For example, the movement system 106 may include a linear drive motor and a continuous chain or belt that drives each container carrier 17. In some examples, the movement system 106 moves only one or a few of the container carriers 17 which then push the other container carriers 17 through the carrier movement path 19. In other examples, at least some of the container carriers 17 are themselves mechanized for movement (e.g., include driven electric wheels, nanorobots, or the like) independent of a local movement system 106. In this manner, the mechanized container carriers 17 can drive themselves, and, in some examples, may be used to push the other container carriers 17 through the movement path 19. The movement system 106 may also include a set of electromagnets to propel the container carriers 17. In some examples, the drive motor or other parts of the movement system 106 may be positioned and secured in such a way as to be replaceable by a robotic manipulator.

In some examples, the movement system 106 may include a movement device that is fixedly attached to the frame 102. In this example, the movement device may be connected to a power source via a connector. Communication connections between the movement device and a computing device may be achieved via the connector and/or via a wireless network connection. In some examples, the frame 102 may include an interface to receive the movement device. For example, the interface may be akin to a power take off device or other coupling to receive the movement device. In this manner, the movement device may be "plugged" into the interface to cause the movement of the container carriers 17. This may provide for easy replacement of the movement device and/or utilization of a single movement device for more than one stackable storage module 100.

In some examples, the movement system 106 may include an inductive electric motor inductively coupled to the frame 102. In this example, a stationary field generator may be used to induce a current in the container carriers 17 that would interact with the electric field to generate motion. This may also be performed with magnets, or steel plates (reluctance) that interact with one or more stationary field generators.

In some examples, instead of or in addition to the movement system 106, the action of placing or removing storage containers 15 may be used to cause movement of the container carriers 17. In some examples, the frame 102 may have a slight angle that may allow container carriers 17 to flow from one level to the other.

The container carrier 17 may include a support surface to support an underside of the storage container 15. The support surface may include a platform, a set of grooves, notches, or the like to receive the storage container 15 and retain the storage container 15 at a fixed location. The container carrier 17 may also include a set of wheels 122. The wheels 122 may be configured to engage with the frame 102 to enable rolling movement of the container carrier 17 with respect to the frame 102. In some examples, instead of or in addition to the wheels 122, the container carrier 17 includes a set of surfaces to enable sliding movement of the container carrier 17 with respect to the frame 102. For example, these surfaces may be formed from a low friction material, or a combination of one wheel and one or more sliding surfaces. In some examples, a single wheel 122 may be used. For example, a single wheel may be mounted above the center of mass of the container carrier 17 and/or the storage container 15.

As illustrated, the container carrier 17 may provide for independent movement. For example, the container carrier 17 may include a moving surface 124 that is configured to translate away from the main body of the container carrier 17. The moving surface 124 can be connected to the main body of the container carrier 17 via a set of extendable rail slides (e.g., drawer slides) or other comparable structure. The container carrier 17 may be mechanized to enable the translation depicted in FIG. 11 and other movements. For example, a linear actuator may be coupled to the moving surface 124 to push the moving surface 124 away from the main body of the container carrier 17 and pull the moving surface 124 back toward the container carrier 17. Such movement may be useful for accessing an interior of the storage container 15 (e.g., to retrieve and place items) when the storage container 15 is located at an access position.

The distances between the two levels 108 may be selected to provide clearance for the storage containers 15. This distance may also be selected to optimize storage density of the stackable storage module 100 or other suitable parameter. For example, a vertical dimension between a top surface of a storage container 15 on the lower level 108a and a bottom surface of a container carrier 17 disposed directly above on the upper level 108b may be between 1-2", leaving room for cross members as needed. A longitudinal distance separating each container carrier 17 and/or each storage container 15 may be selected to optimize storage density of the stackable storage module 100 or other suitable parameter. For example, this longitudinal distance may fall within the range of 1-2". In some examples, these dimensions may be different than just recited. Alternatively, the container carriers can contact one another, e.g., in an embodiment in which the container carriers each push adjacent carriers to move the carriers along the frame.

Figure 12:
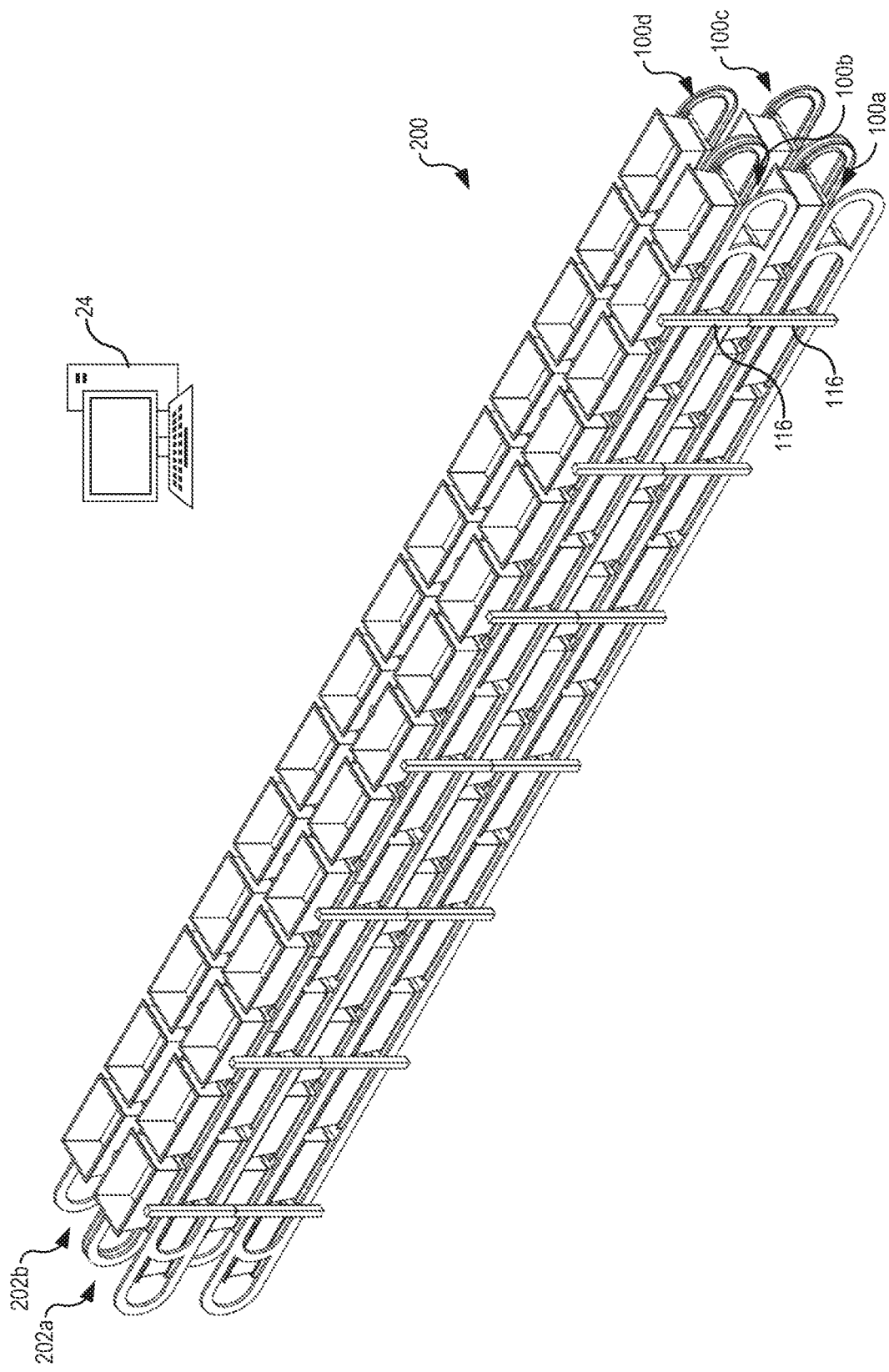
FIG. 12 illustrates a perspective view of an example cluster of instances of the storage module of FIG. 11 according to one embodiment.

FIG. 12 illustrates an example cluster 200 of stackable storage modules 100. The cluster 200 is included to depict how stackable storage modules 100 may be stacked vertically on top of each other and horizontally next to each other. For example, the stackable storage modules 100b, 100d are stacked respectively on top of the stackable storage modules 100a, 100c to form stacks 202a, 202b. The two stacks 202a, 202b are disposed next to one other. To add rigidity to the cluster 200, the sides of the support structures 116 may be coupled together. In some examples, other structures are provided to enable side-to-side coupling of the stacks 202.

In some examples, upper distal portions of the support structures 116 of the stackable storage modules 100a, 100c are in physical contact with lower distal portions of the support structures 116 of the stackable storage modules 100b, 100d. As each of the stackable storage modules 100 include separate movement systems 106, each may be moved independently of the others.

Figure 13:
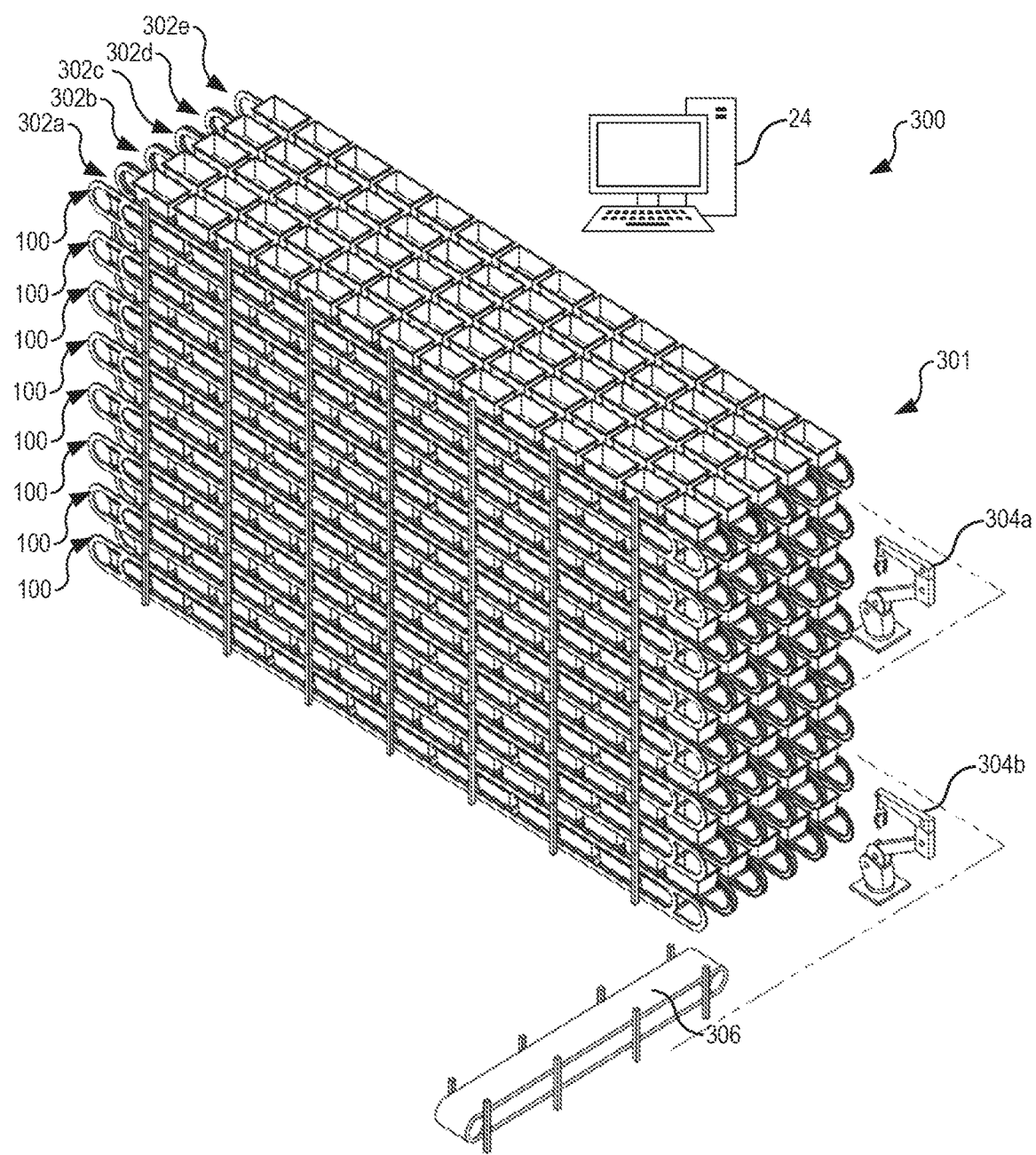
FIG. 13 illustrates a perspective view of an example modular storage and retrieval system including a cluster of instances of the storage module of FIG. 11.

FIG. 13 illustrates an example modular storage and retrieval system 300 including a cluster 301 of stackable storage modules 100, according to at least one example. The cluster 301 is an example of the cluster 200. The cluster 301 includes vertical stacks 302a-302e, each including a plurality of stackable storage modules 100 (e.g., eight stackable storage modules 100). The plurality of stackable storage modules 100 are stacked on top of each as described herein. In some examples, the vertical stacks 302 may be coupled to each other in any suitable manner. In other examples, the vertical stacks 302 may be configured to move laterally and independently of adjacent stacks. For example, the vertical stacks 302 may be mounted for movement in tracks or rails that extend in a direction generally perpendicular to the lengths of the modules and, in some examples, attached to a drive system to enable such movement. This may enable access to the sides of the inner stackable storage modules (e.g., those in the vertical stacks 302b-302d) by creating dynamic aisles between the vertical stacks 302. This may enable maintenance of the stackable storage modules 100.

The modular storage and retrieval system 300 may also include one or more robotic manipulators 304 and other material conveyance device(s) 306. In this example, the cluster 301 may be disposed within a warehouse or other facility and the two robotic manipulators 304 may be disposed on different mezzanines or floors of the facility (as depicted by the phantom lines). In this example, each robotic manipulator 304 is configured to interact with one half of the stackable storage modules 100 of the cluster 301. For example, the robotic manipulator 304a is configured to interact with an upper half of the stacked stackable storage modules 100. Likewise, the robotic manipulator 304b is configured to interact with a lower half of the stacked stackable storage modules 100. A capacity of the robotic manipulators 304 may be matched to the number of individual stackable storage modules 100 each is required to service. For example, assuming the robotic manipulator 304a were capable of removing 20 items per minute from storage containers of the stackable storage modules 100, the robotic manipulator 304a may be able to service all twenty stackable storage modules 100 in the entire upper portion of the cluster 301. This may enable constant movement of the robotic manipulator 304a while the individual stackable storage modules 100 move their respective storage containers 15 to access positions (e.g., positions near the ends of the stackable storage modules 100 where the robotic manipulator 304a can have unimpeded access to the storage containers 15).

Figure 14:
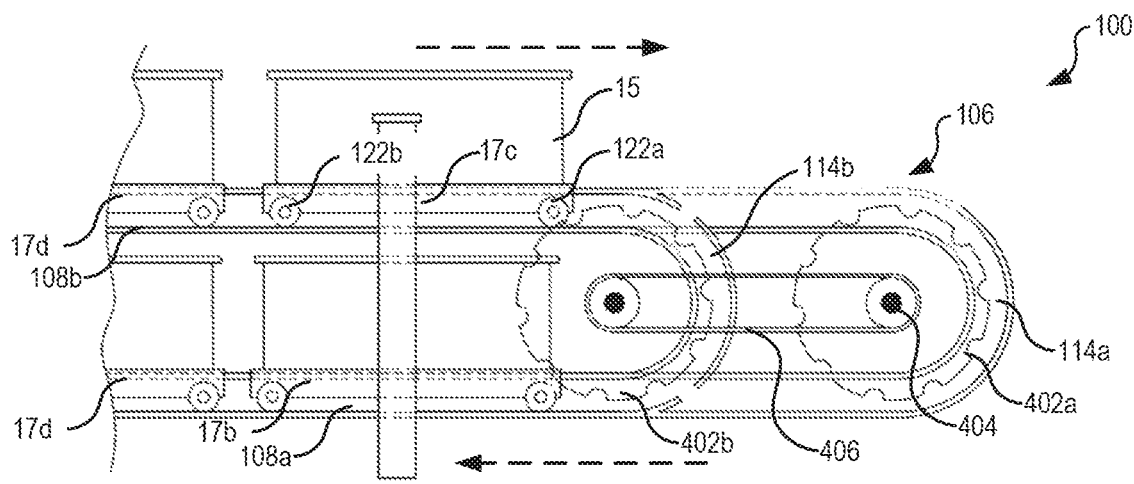
FIG. 14 illustrates a side view of an end of an example storage module, with container carriers at a first state, according to at least one example.
Figure 15:
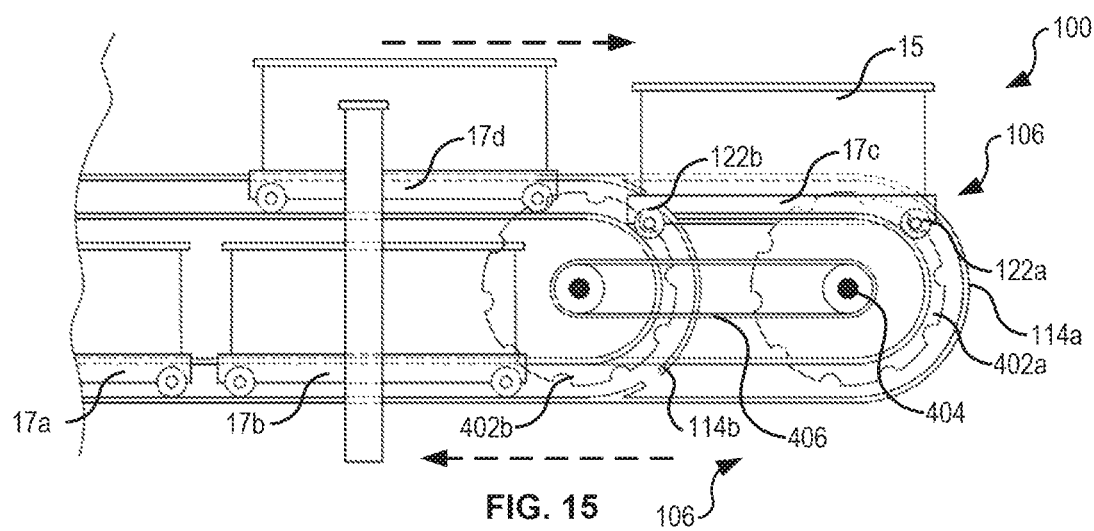
FIG. 15 illustrates a side view of the end of the example storage module of FIG. 14, with the container carriers at a second state, according to at least one example.
Figure 16:
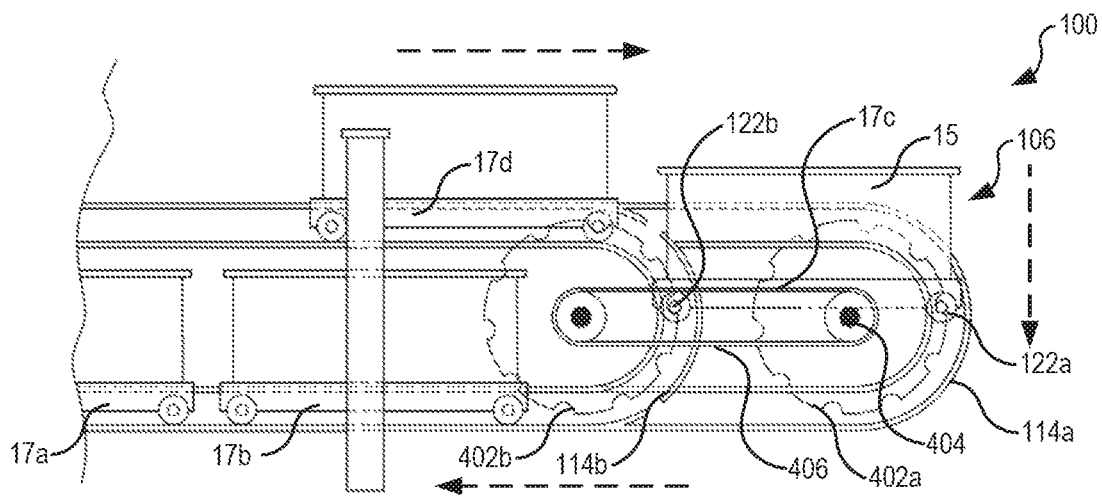
FIG. 16 illustrates a side view of the end of the stackable storage module of FIG. 14, with the container carriers at a third state, according to at least one example.
Figure 17:
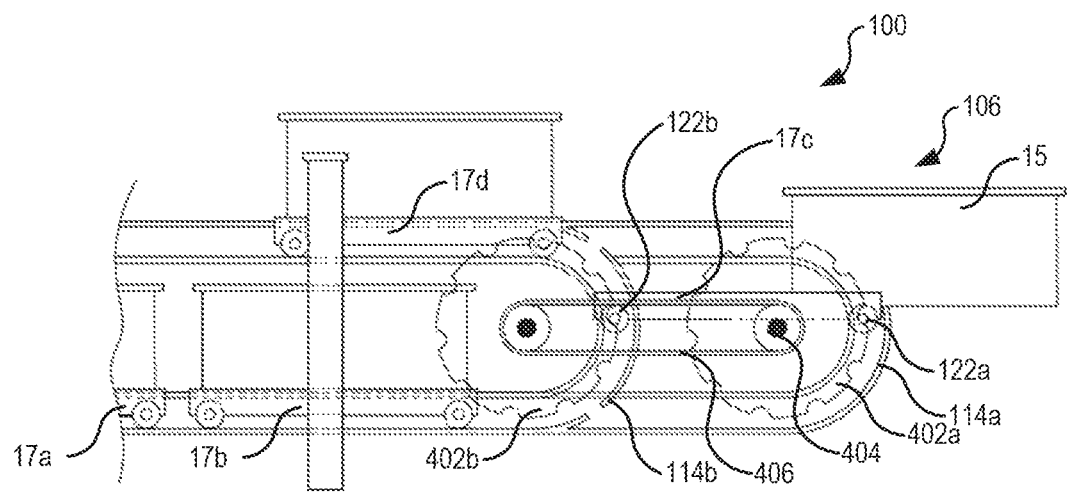
FIG. 17 illustrates a side view of the end of the example stackable storage module of FIG. 14, with a particular container carrier in an extended position, according to at least one example.

FIGS. 14-7 illustrate an end of an example stackable storage module 100, with the container carriers 17 at various states, according to at least one example. In particular, the views shown in these figures are taken as a longitudinal profile extending between the two components 102a, 102b. FIG. 14 illustrates container carriers 17a-17d at first states, FIG. 15 illustrates container carriers 17a-17d at second states, FIG. 16 illustrates container carriers 17a-17d at third states, and FIG. 17 illustrates container carriers 17a-17d at fourth states.

In FIG. 14, the container carriers 17c, 17d are located on the upper level 108b of the stackable storage module 100. The container carriers 17a, 17b are located on the lower level 108a. The wheels 122a, 122b of the container carrier 17c are illustrated and labeled. The stackable storage module 100 also includes the semi-circular portions 114 (e.g., an outer semi-circular portion 114a and an inner semi-circular portion 114b). In FIG. 14, the container carrier 17c is approaching the semi-circular portions 114a, 114b. For example, the movement system 106 may be causing the container carriers 17 to move in the direction of the dashed arrows (e.g., to the right on the upper level 108b and to the left on the lower level 108a). The movement system 106 may also be configured to cause the container carriers 17 to move in the opposite direction (e.g., to the right on the lower level 108a and the left on the upper level 108b). In this manner, the movement system 106 may enable bidirectional movement.

The movement system 106 may include any suitable number of devices, gears, drives, chains, belts, motors, and the like to cause the container carriers 17 to translate along the different levels 108 and between the levels 108. For example, the movement system 106 may include a set of carrier gears 402a, 402b. The carrier gears 402 may be disposed within the semi-circular portions 114 to carry the container carriers 17 through the curves defined by the semi-circular portions 114. For example, one or more carrier gears 402a may be associated with the outer semi-circular portions 114a and one or more carrier gears 402b may be associated with the inner semi-circular portions 114b. The carrier gears 402 may be configured to engage with the wheels 122 and/or axles of the wheels as the wheels 122 are brought near the carrier gears 402. For example, the front wheels 122a may engage with the carrier gear 402a and the rear wheels 122b may engage with the carrier gear 402b. In some examples, at least one of the carrier gears 402 may be driven by a drive motor 404. The drive motor 404 may be a linear drive motor that spans the two sub-components of the frame 102. In some examples, the drive motor 404 is a flat drive motor that is mounted on an outward facing surface of the carrier gear 402. The drive motor 404 may drive one or both carrier gears 402 via a drive mechanism such as a chain or belt 406.

In some examples, the carrier gears 402 are not connected to the drive motor 404. In this example, the carrier gears 402 may simply function to support the container carriers 17 as they move through the ends of the frame 102.

In some examples, the drive motor 404 may be coupled to a continuous chain that runs along the inner semi-circular portions 114b of the stackable storage module 100. In some examples, the container carriers 17 may be attached to the chain at a fixed location on the chain. In other examples, the container carriers 17 include a clamp, hook, or other device that selectively engages with the chain. For example, the container carriers 17 may be attached to the chain as they move horizontally along the levels 108, but may be detached from the chain as the container carriers 17 move vertically at the connecting portions 110. The movement system 106 may engage with an underside, middle portion of an example container carrier 17. The movement system 106 may also engage with one or both exterior edges of the container carrier 17 (e.g., at or near the wheels 122).

In FIG. 15, the container carrier 17d is located on the upper level 108b of the stackable storage module 100. The container carriers 17a, 17b are located on the lower level 108a. The rear wheels 122b of the container carrier 17c and the front wheels 122a of the container carrier 17c are beginning to advance into the semi-circular portions 114a, 114b. In the example, the wheels 122a may engage with cogs of the carrier gear 402a. At or about the same time, the wheels 122b may engage with cogs of the carrier gear 402b. The wheels 122 may remain in the cogs at least until the container carrier 17c has moved from the upper level 108b to the lower level 108a.

In FIG. 16, the container carrier 17d is located on the upper level 108b of the stackable storage module 100. The container carriers 17a, 17b are located on the lower level 108a. The container carrier 17c is located between the lower level 108a and the upper level 108b. In this example, the container carrier 17c has moved vertically down from the upper level 108b. In this example, the rear wheels 122b of the container carrier 17c are disposed entirely within the inner semi-circular portions 114b (and being carried by the carrier gear 402b) and the front wheels 122a of the container carrier 17c are disposed entirely within the outer semi-circular portions 114a (and being carried by the carrier gear 402a). In some examples, the container carrier 17c is held in the position illustrated by FIG. 16. This may achieved by stopping the drive motor 404, causing brake mechanisms on the container carrier 17c to engage with the inner semi-circular portions 114b and/or the outer semi-circular portions 114a or in any other suitable manner. The wheels 122 may be configured to translate to adjust the distance between the front wheels 122a and the rear wheels 122b. For example, the mounts for the wheels 122 on the container carrier 17 may include springs that are biased between the wheel axles and the body of the container carrier 17. This may be desirable to cause the wheels 122 to translate towards each other in order to engage with a front surface of the inner semi-circular portion 114b and a rear surface of the outer semi-circular portion 114a.

The state of the container carrier 17c in FIG. 16 may correspond to an access position. For example, an interior of the storage container 15 of the container carrier 17c may be accessible when the container carrier 17c is in the illustrated state. When another stackable storage module 100 is stacked on top of the illustrated stackable storage module 100, the illustrated state may provide additional clearance between the two stackable storage modules 100 to enable access to the storage container 15. In some examples, the container carrier 17c may be rotated, tipped, translated, or otherwise adjusted to improve access to the interior of the storage container 15. For example, as illustrated in FIG. 17, the container carrier 17c includes a moving surface (e.g., similar to the surface 124 in the embodiment of FIG. 11) on which the storage container 15 is held. In the example illustrated by FIG. 17, the storage container 15 has been translated to enable access to the interior of the storage container 15. In some examples, the translation and/or rotation is selectable (e.g., only performed when needed, not on every container carrier 17 that cycles through the access position). In other examples, the translation and/or rotation is performed on every container carrier 17 that cycles through the access position.

Figure 18:
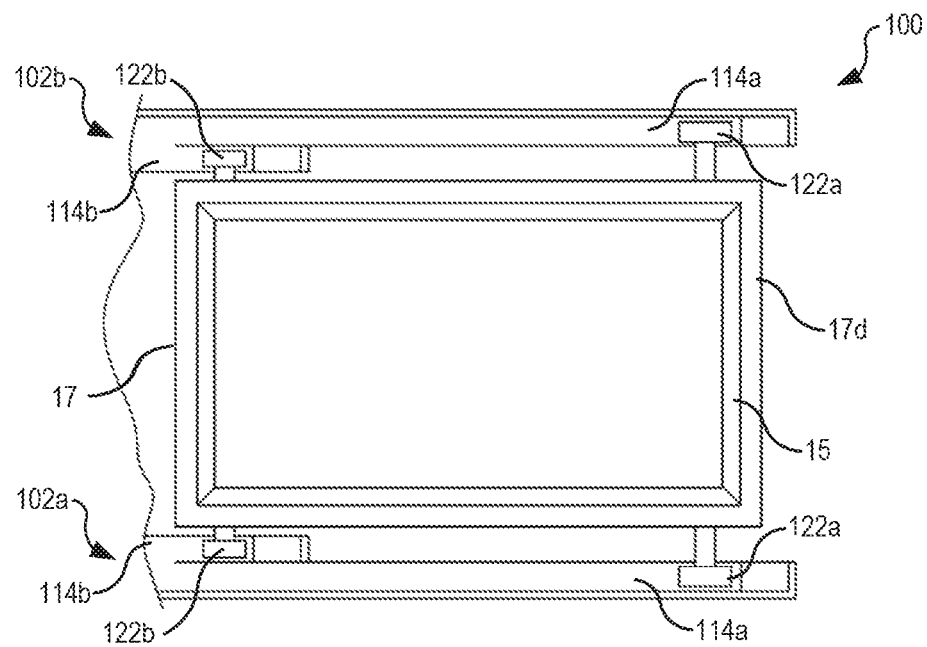
FIG. 18 illustrates a top view of the end of the example stackable storage module of FIG. 14, according to at least one example.

FIG. 18 illustrates a top view of the container carrier 17c at the state illustrated in FIG. 15. In particular, the rear wheels 122b are shown approaching openings defined by the inner semi-circular portions 114b. The front wheels 122a may have a wider wheelbase than the rear wheels 122b. In this manner, the front wheels 122a may pass by the inner semi-circular portions 114b within their own tracks that are part of the outer semi-circular portions 114a. Because of the narrower wheelbase of the rear wheels 122b, the rear wheels 122b may enter the inner semi-circular portions 114b at about the same time as the front wheels 122a enter the outer semi-circular portions 114a. The carrier gears 402 may be configured to engage with the wheels 122 as they enter the semi-circular portions 114. At an opposite end of the stackable storage module 100 according to this example, the rear wheels 122b may be leading wheels, and the front wheels 122a may be trailing wheels. Thus, at the opposite end, the rear wheels 122b roll in the outer semi-circular portions 114a and the front wheels 122a roll in the inner semi-circular portions 114b.

Figure 19:
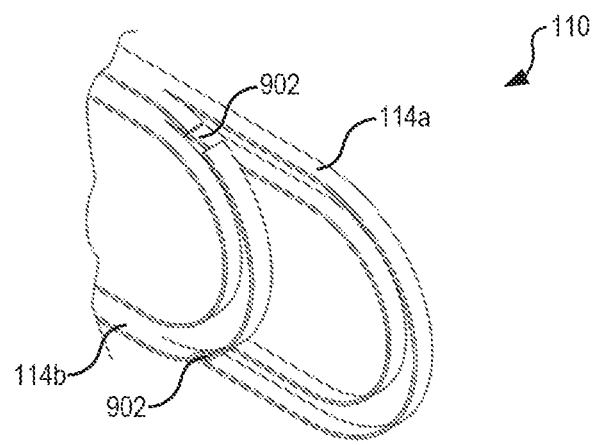
FIG. 19 illustrates a perspective view of a connecting portion of the example stackable storage module of FIG. 14, according to at least one example.

FIG. 19 illustrates a perspective view of the connecting portion 110 of the example stackable storage module of 100, according to at least one example. The connecting portion 110 is part of one of the components 102a of the frame 102. In particular, the illustrated connecting portion 110 together with a mirrored version of the connecting portion 110 may make up a complete end portion of the frame 102.

The connecting portion 110 may include the outer semi-circular portion 114a and the inner semi-circular portion 114b. The inner semi-circular portion 114b may define a first wheel track for the rear wheels 122b. The outer semi-circular portion 114a may define a second wheel track for the front wheels 122a. Axles of the front wheels 122a may pass through axle openings 902 disposed in the inner semi-circular portion 114b as the front wheels 122a move along the second wheel track. At an opposite end of the stackable storage module 100 according to this example, the inner semi-circular portion 114b may be configured to carry the front wheels 122a (e.g., part of the second wheel track), and the outer semi-circular portion 114a may be configured to carry the rear wheels 122b (e.g., part of the first wheel track).

Figure 20:
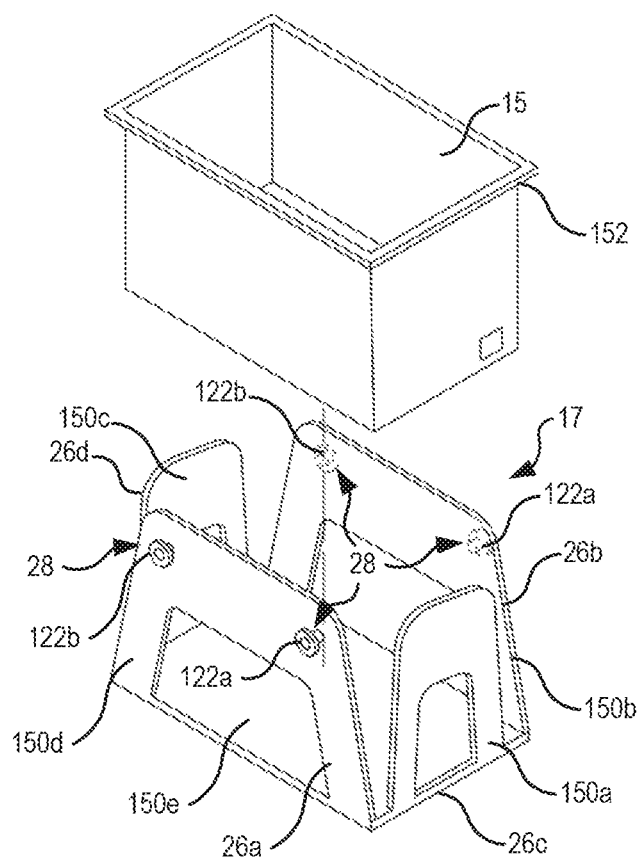
FIG. 20 illustrates a perspective view of an example container carrier and storage container, according to at least one example.

FIG. 20 illustrates a perspective view of an example container carrier 17 and the storage container 15, according to another example. The container carrier 17 may be configured to receive the storage container 15 within a frame 150. The frame 150 may be made up of a set of frame components 150a-150e. The storage container 15, when inserted into the container carrier 17, may be supported by a bottom frame component 150e and the frame components 150a-150d. The container carrier 17 may include the front wheels 122a and the rear wheels 122b attached to or otherwise mounted to the container carrier 17.

In some examples, instead of or in addition to the set of frame components 150a-150e, the container carrier 17 may include a hoop frame to which the wheels 122 may be attached. The hoop frame may be sized to receive the storage container 15 and engage with a lip or protrusion 152 of the storage container 15. In this manner, the hoop frame may support the storage container 15 by the lip 152, instead of or in addition to the container carrier 17 supporting the storage container 15 by an underside of the storage container 15.

Figure 21:
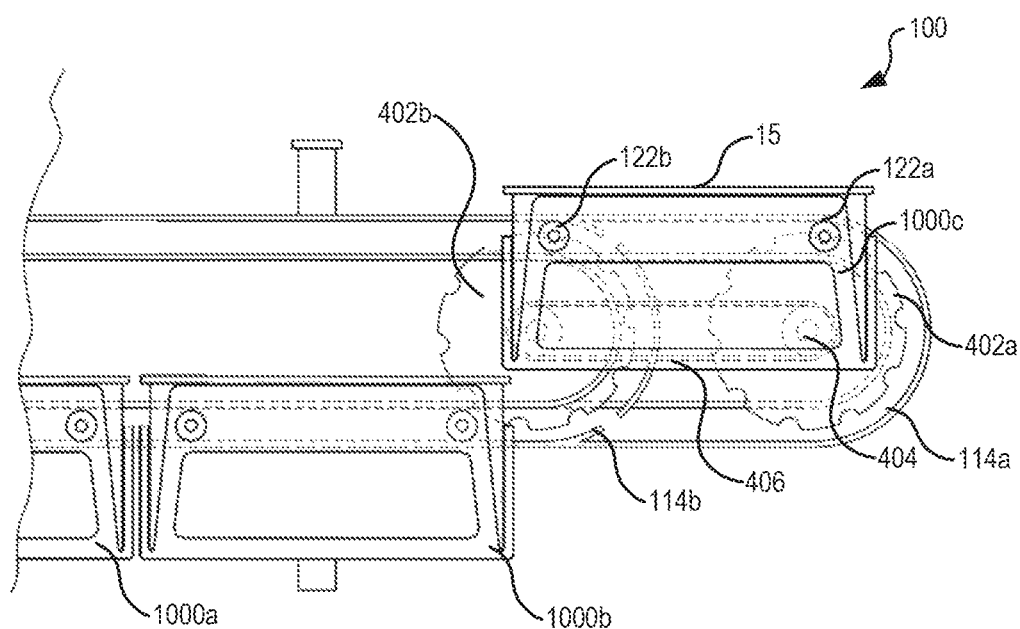
FIG. 21 illustrates a side view of an end of an example stackable storage module including the example container carrier of FIG. 20, according to at least one example.

FIG. 21 illustrates a side view of an end of the stackable storage module 100 including a set of container carriers 17, according to at least one example. The stackable storage module 100 may function to move the set of container carriers 17 through the semi-circular portions 114 as described with reference to FIGS. 14-17. In this example, however, because the container carriers 17 are being utilized, the center of mass of the storage container 15 may be located at or below mounting locations of the wheels 122 on the container carrier 17. In the container carriers 17, mounting locations of the wheels 122 may be located below the center of mass of the storage container 15.

Description of FIGS. 24 to 31

Turning now to FIGS. 24 to 31, an inventory storage module 1100 according to another embodiment is shown. In general, as described above, the storage module 10 has a first end 12, a second end 14, a first side 11, and a second side 13. Further, the storage module 10 has first to fourth conveyor segments 16, 18, 20, and 22. In this embodiment, the first and second conveyor segments 16 and 18 are offset from one another along the vertical direction V. Thus, the first and second conveyor segments 16 and 18 can be referred to as upper and lower conveyor segments, respectively. Further, the storage module 1100 is configured to transfer container carriers 17 that support at least one storage container 15. The upper and lower conveyor segments 16 and 18 are configured to transfer the container carriers 17 along the longitudinal direction L. The third and fourth conveyor segments 20 and 22 are implemented as connecting tracks 116 and 118 that connect the upper and lower conveyor segments 16 and 18. Each of the connecting tracks 116 and 118 is configured to transfer the container carriers 17 between the upper and lower conveyor segments 16 and 18. Thus, the conveyor segments 16, 18, 20, and 22 together are configured to transfer the container carriers 17 around the movement path 19.

Referring more specifically to FIGS. 24 to 28, the storage module 1100 comprises a first guiderail 1102 and a second guiderail 1104 that are spaced from one another along a lateral direction A. The first and second guiderails 1102 and 1104 can be substantially mirror images of one another. The first and second guiderails 1102 and 1104 define first and second loops, respectively, where each loop is defined in a plane that extends in the longitudinal direction L and a vertical direction V, where the longitudinal, lateral, and vertical directions are perpendicular to one another. Thus, the storage module 1100 defines a path that forms a movement path 19 in a plane that extends in the longitudinal direction L and the vertical direction V.

Each guiderail 1102 and 1104 has an upper track 1112 and a lower track 1114 spaced from one another along the vertical direction V. Further, each guiderail 1102 and 1104 has a first connecting track 1116 that connects the upper track 1112 to the lower track 1114 at the first end 12, and a second connecting track 1118 that connects the upper track 1112 to the lower track 1114 at the second end 14. The first and second connecting tracks 1116 and 1118 can curve away one another as they extend from each of the upper and lower tracks 1112 and 1114. For example, each of the first and second connecting tracks 1116 and 1118 can define a u-shape, where the first and second connecting tracks 1116 and 1118 extend away from one another to the respective bottoms of their u-shapes.

The storage module 1100 also has a plurality of container carriers 17, each supported by both the first and second guiderails 1102 and 1104. Each container carrier 17 can be similar to a moving shelf. Each container carrier 17 has a first carrier side 26*a* and a second carrier side 26*b* spaced from one another along the lateral direction A. Each container carrier 17 has a first carrier end 26*c* and a second carrier end 26*d* spaced from one another along the longitudinal direction L. Further, each container carrier 17 has a carrier bottom 1124 that extends between the first and second carrier sides 26*a* and 26*b* and extends between the first and second carrier ends 26*c* and 26*d*.

For each container carrier 17, the storage module 1100 has a first wheel assembly 1126 that is configured to couple the first carrier side 26*a* of the container carrier 17 to the first guiderail 1102 such that the first carrier side 26*a* is transportable around the loop defined by the first guiderail 1102. Similarly, for each container carrier 17, the storage module 1100 has a second wheel assembly 1128 that is configured to couple the second carrier side 26*b* of the container carrier 17 to the second guiderail 1104 such that the second carrier side 26*b* is translatable around the loop defined by the second guiderail 1104. Preferably, in a horizontal portion of guiderails 1102 and 1104, the wheel assemblies 1126 are supported by the guiderails and roll along them.

The container carriers 17 are densely packed along the upper and lower tracks 1112 and 1114. For example, the container carriers 17 along the upper track 1112 are arranged end-to-end such that there is little to no space between adjacent ones of the container carriers 17 on the upper track 1112. Similarly, the container carriers 17 along the lower track 1114 are arranged end-to-end such that there is little to no space between adjacent ones of the container carriers 17 on the lower track 1114. In some embodiments, container carriers 17 along each track may contact one another other. In other embodiments, container carriers 17 may be spaced from each other along each track by a distance that is no more than 10 percent of the length of each container carrier 17 along the track, such as no more than 10 percent of the length of each container carrier 17 along the track or no more than 5 percent of the length of each container carrier 17 along the track.

Space between container carriers 17 on the upper track 1112 and container carriers 17 on the lower track 1114 may optionally be minimized to maximize storage density. In some examples, spacing between container carriers 17 on the upper track 1112 and container carriers 17 on the lower track 1114 may be described by absolute distance, such as a distance ranging from 0.25 to 1.25 inches, such as 0.50 to 1.00 inches. In other examples, spacing between container carriers 17 on the upper track 1112 and container carriers 17 on the lower track 1114 may be described in relation to a height of one of the container carriers, such as a spacing that is no more than 20 percent of the height of the container carrier, such as no more than 15 percent of the height of the container carrier, such as no more than 10 percent of the height of the container carrier, no more than 5 percent of the height of the container carrier. Storage density is directly related to the distance between container carriers 17. Thus, as the distance from the container carriers 17 on the upper track 1112 to the container carriers 17 on the lower track 1114 is decreased, the storage density increases. However, if the distance between the container carriers 17 on the upper track 1112 and the container carriers 17 on the lower track 1114 is too small, then the container carriers 17 might not freely rotate between the upper and lower tracks without colliding. To prevent collisions, the horizontal spacing between container carriers 17 can be increased through acceleration as each container carrier 17 approaches an end 12 or 14. Thus, the density of the container carriers 17 can be lower at the first and second connecting tracks 1116 and 1118 compared to the density at the upper and lower tracks 1112 and 1114 as will be described in further detail below.

The storage module 1100 has at least one movement system 1129 that includes at least one motor 1130 and at least one drivetrain 1132. Each movement system drives the container carriers 17 to translate around the first and second loops in response to a control signal until a desired one of the container carriers 17 is presented at one of the first end 12 and the second end 14. At such position, the desired container carrier 17 can be accessed by a person or machine such as a robotic arm so that an inventory item can then be placed onto the desired container carrier 17 for storage or can be removed from the desired container carrier 17 to fulfill a customer order or for further transporting or processing. In some embodiments, the motor 1130 and drivetrain 1132 can operate in a unidirectional manner such the container carriers 17 can be moved in only a first direction (that is, clockwise or counterclockwise) around the loop of the respective first guiderail 1102 or second guiderail 1104. Alternatively, the at least one motor 1130 and at least one drivetrain 1132 can operate in a bidirectional manner such the container carriers 17 can be selectively rotated in one of the first direction and a second direction, opposite the first direction.

The embodiment in FIGS. 24 to 28 will now be described in further detail. It will be noted that at least one, up to all of, the guiderails 1102 and 1104, the container carriers 17, the wheel assemblies 1126 and 1128, the motor 1130 and drivetrain 1132 can be implemented in any other suitable manner. For example, the guiderails 1102 and 1104, the container carriers 17, and the wheel assemblies 1126 and 1128 can be implemented in a manner similar to that of U.S. patent application Ser. Nos. 15/408,182, 15/408,128, and 15/408,207, each filed on Jan. 17, 2017, the teachings of all of which are hereby incorporated by reference as if set forth in their entirety therein.

As shown in FIG. 26, each guiderail 1102 and 1104 has an outer guiderail surface 1134 that defines an outer perimeter of the respective guiderail 1102 or 1104 and an inner guiderail surface 1136 that defines an inner perimeter of the respective guiderail 1102 or 1104. The inner guiderail surface 1136 is spaced inward of the outer guiderail surface 1134 such that the outer guiderail surface 1134 surrounds the inner guiderail surface 1136. The outer and inner guiderail surfaces 1134 and 1136 can face away from one another. Each guiderail 1102 and 1104 has a guide-rail body 1138 that extends between the outer guiderail surface 1134 and the inner guiderail surface 1136. Each guide-rail body 1138 can be oriented in a plane that extends along the vertical and longitudinal directions. Further, each guide-rail body 1138 can define a guide-rail channel 1140 that extends into the guide-rail body 1138 between the outer and inner guiderail surfaces 1134 and 1136 so as to define a closed loop that is configured to receive a portion of one of the wheel assemblies 1126 and 1128 as described further below.

Referring to FIG. 25, each container carrier 17 can be sized to support at least one storage container 15. In some embodiments, each container carrier 17 can be elongate along the lateral direction A such that each container carrier 17 is configured to carry a plurality of storage containers 15. For example, each container carrier 17 can have an overall carrier width Wc along the lateral direction A, an overall carrier length Lc along the longitudinal direction L, and an overall carrier height Hc along the vertical direction V. The overall carrier width Wc can be greater than the overall carrier length Lc such that each container carrier 17 is elongate along the lateral direction A. Thus, each container carrier 17 can support the plurality of storage containers 15 such that the storage containers are in an end-by-end or side-by-side relation. Supporting a plurality of storage containers 15 in an end-by-end or side-by-side relation between the pair of guiderails 1102 and 1104 can result in a higher storage density than a comparable system in which only one storage container 15 is supported between the pair of guiderails 1102 and 1104.

Each container carrier 17 can have opposed carrier sidewalls 1125 that are spaced from one another along the lateral direction A. The carrier bottom 1124 can extend between the carrier sidewalls 1125. The carrier bottom 1124 can support the storage containers 1142 between the carrier sidewalls 1125. In some embodiments, each container carrier 17 can define a shelf or platform that supports a plurality of storage containers 15. Each storage container 15 can be any suitable storage container as described above.

Figure 24:
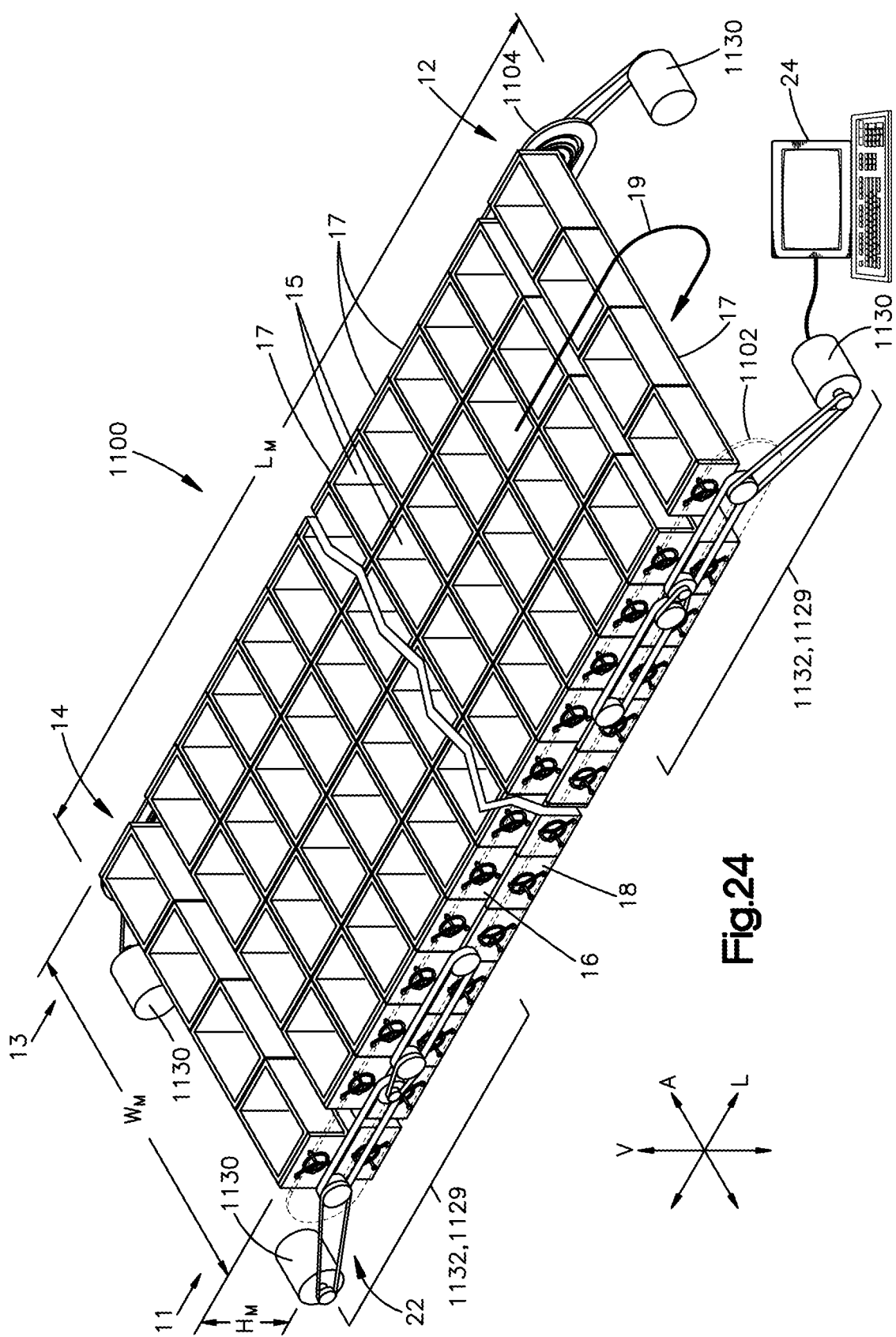
FIG. 24 shows a perspective view of a storage module according to a third embodiment.

Referring to FIG. 26, each wheel assembly 1126 and 1128 includes an outer wheel 1152, an inner wheel 1154, and a rotating coupler 1158 that couples the outer and inner wheels 1152 and 1154 to one of the carrier sidewalls 1125. The outer wheel 1152 can be offset from the inner wheel 1154 with respect to an outward direction. The rotating coupler 1158 supports the outer wheel 1152 such that the outer wheel 1152 translates along the outer guiderail surface 1134 of a respective one of the guiderails 1102 and 1104. Similarly, the rotating coupler 1158 supports the inner wheel 1154 such that the inner wheel 1154 translates along the inner guiderail surface 1136 of the respective one of the guiderails 1102 and 1104. The rotating coupler 1158 rotates with respect to the respective container carrier 17 as the container carrier 17 transitions from an upper track 1112 to a lower track 1114 (as can be seen in FIG. 24). As the rotating coupler 1158 rotates, the outer wheel 1152 remains in contact with the outer guiderail surface 1134 of a respective one of the guiderails 1102 and 1104, and the inner wheel 1154 remains in contact with the inner guiderail surface 1136 of the respective one of the guiderails 1102 and 1104. Further, as the rotating coupler 1158 rotates, the respective container carrier 17 remains upright without rotating. Thus, as each container carrier 17 transitions from an upper track 1112 to a lower track 1114, the upper end 15f of each storage container 15 that is supported by the container carrier 17 remains disposed above the bottom surface 15e of the storage container 15 to prevent the contents of the storage container 15 from spilling.

Each wheel assembly 1126 and 1128 can optionally include a third wheel 1156, and the rotating coupler 1158 can couple the third wheel 1156 to the respective carrier sidewall 1125. The third wheel 1156 can be an outer wheel that translates along the respective outer guiderail surface 1134. Further, the third wheel 1156 can be offset from the inner wheel 1154 with respect to an outward direction, and can be offset from the outer wheel 1152 with respect to a direction that is perpendicular to the outward direction. Thus, the outer wheel 1152, the third wheel 1156, and the inner wheel 1154 can be spaced from one another such that the inner wheel 1154 forms the bottom of a y-shape, and the outer wheel 1152 and third wheel 1156 form the top of a y-shape. Each wheel assembly 1126 and 1128 can further include a y-shaped bracket 1127 that supports the outer wheel 1152, the third wheel 1156, and the inner wheel 1154. In some alternative embodiments, the third wheel 1156 can be an inner wheel that translates along the respective inner guiderail surface 1136. In other alternative embodiments, each wheel assembly 1126 and 1128 can include as few as a one wheel that is guided within a guiderail between inner and outer surfaces of the guiderail, or can have any suitable number of wheels greater than one.

Each wheel assembly 1126 and 1128 can include a guide 1160 that is received in the guide-rail channel 1140, and translates around the guide-rail channel 1140. Each guide 1160 maintains its respective container carrier 17 in an upright position so as to limit occurrences of the container carrier 17 from tipping over. Each guide 1160 can be rotationally fixed relative to its container carrier 17. Further, each wheel assembly 1126 or 1128 can be configured to rotate relative to its respective guide 1160. Thus, as each wheel assembly 1126 or 1128 of a container carrier 17 rotates to maintain its wheels in contact with the outer and inner guiderail surfaces 1134 and 1136, the respective guide 1160 remains rotationally fixed relative to the container carrier 17 to maintain the container carrier 17 fixed in the upright position.

Referring again to FIGS. 24 to 28, the container carriers 17 along the upper and lower tracks 1112 and 1114 can be densely packed. For example, each container carrier 17 on the upper track 1112 can be spaced from an container carrier on the lower track 1114 by a distance that provides a clearance between the container carriers as described above. The storage module 1100 can be elongate along the longitudinal direction L. For instance, the storage module 100 have an overall module length LM along the longitudinal direction L, an overall module height HM along the vertical direction V, and an overall module width $W_M$ along the lateral direction A. The overall module length LM can be greater than the overall module height HM and the overall module width $W_M$. Further, in some embodiments, the overall module width $W_M$ can be greater than the overall module height HM.

As described above, the storage module 1100 has at least one motor 1130 and at least one drivetrain 1132 that drives the container carriers 17 to translate around the first and second guiderails 1102 and 1104. For example, the storage module 100 can have a motor 130 that drives a drivetrain 132 that is adjacent to the first guiderail 1102 at the first end 12. As another example, the storage module 1100 can have a motor 1130 that drives a drivetrain 1132 that is adjacent the first guiderail 1102 at the second end 14. As yet another example, the storage module 1100 can have a motor 1130 that drives a drivetrain 1132 that is adjacent the second guiderail 1104 at the first end 12. As yet still another example, the storage module 1100 can have a motor 1130 that drives a drivetrain 1132 that is adjacent the second guiderail 1104 at the second end 14.

In an alternative embodiment, the storage module 1100 can have a motor that drives both the drivetrains 1132 at the first end 12, and the storage module 1100 can have a motor that drives both the drivetrains 1132 at the second end 14. For example, the drivetrains 1132 adjacent the first and second guiderails 1102 and 1104 at the first end 12 can share a common axle that is driven by one motor 1130, and the drivetrains 1132 adjacent the first and second guiderails 1102 and 1104 at the second end 14 can share a common axle that is driven by one motor 1130. In another alternative embodiment, the storage module 1100 can have a first motor 1130 and drivetrain 1132 that drives an entirety of the first guiderail 1102 and a second motor 1130 and drivetrain 1132 that drives an entirety of the second guiderail 1104. For example, each drivetrain 1132 can extend along the length of a respective one of the first and second guiderails 1102 and 1104. In yet another alternative embodiment, the storage module 1100 can have one motor 1130 and a pair of drivetrains 1132 that drive an entirety of both the first and second guiderails 1102 and 1104. For example, the pair of drivetrains 1132 can share a common axle that is driven by one motor 1130, and each drivetrain 1132 can extend along the length of a respective one of the first and second guiderails 1102 and 1104.

The at least one motor 1130 and at least one drivetrain 1132 can be configured to drive the container carriers 17 to translate along the upper and lower tracks 1112 and 1114 at a first speed. Further, the at least one motor 1130 and drivetrain 1132 can be configured to drive the container carriers 17 to translate along one of the first and second connecting tracks 1116 and 1118 at a second speed, faster than the first speed, when each container carrier 17 transitions between the upper track 1112 and the lower track 1114. As such, when a transitioning container carrier 17 translates along one of the first and second connecting tracks 1116 and 1118, the transitioning container carrier 17 accelerates away from a following container carrier 17, which is translating at the first speed, to increase spacing between the transitioning container carrier 17 and the subsequent container carrier 17. Further, the transitioning container carrier 17 accelerates towards a preceding container carrier 17, which is translating at the first speed, so as to catch up to the preceding container carrier 17. Thus, the density of the container carriers 17 can be smaller at the first and second connecting tracks 1116 and 1118 than that of the upper and lower tracks 1112 and 1114 so as to provide sufficient space around the first and second connecting tracks 1116 and 1118 for each transitioning container carrier 17 to separate from a subsequent container carrier 17. Accelerating each transitioning container carrier 17 in such a manner can prevent the transitioning container carrier 17 from colliding with the following and preceding container carriers 17 as the transitioning container carrier 17 translates along one of the first and second connecting tracks 1116 and 1118.

Each drivetrain 1132 comprises a lower-speed pulley or gear system 1166 and a higher-speed pulley or gear system 1168. The lower-speed system 1166 is configured to drive the container carriers 17 along a respective one of the upper and lower tracks 1112 and 1114 at the first speed and to a respective one of the connecting tracks 1116 and 1118. Further, the lower-speed system 1166 is configured to drive the container carriers 17 away from the respective one of the connecting tracks 1116 and 1118 at the first speed and along the other one of the upper and lower tracks 1112 and 1114. In this regard, the low-speed system pushes a carrier 17, which pushes all the carriers 17 in front of it. The higher-speed system 1168 is configured to drive the container carriers 17 along a respective one of the connecting tracks 1116 and 1118 to the other one of the upper and lower tracks 1112 and 1114 at the second speed, which is faster than the first speed as stated above. Thus, the higher-speed system 1168 is configured to drive each container carrier 17 to separate from the slower moving container carriers 17 on the respective one of the upper and lower tracks 1112 and 1114 and to catch up to the slower moving container carriers 17 on the other one of the upper and lower tracks 1112 and 1114.

Each higher-speed system 1168 is disposed at a respective one of the first and second connecting tracks 1116 or 1118. For example, each higher-speed system 1168 can extend from one of the first and second ends 12 and 14 towards the other of the first and second ends 12 and 14. Each higher-speed system 1168 can include a pulley or gear system configured to engage each container carrier 17 as it approaches a respective one of the first and second connecting tracks 1116 or 1118 and drive the container carrier 17 from the respective upper track 1112 to the respective lower track 1114. For example, each higher-speed system 1168 can include a first pulley or gear 1170 proximate to one of the first and second ends 12 and 14, and a second pulley or gear 1172 that is spaced from the first pulley or gear 1170 along the longitudinal direction L towards the other one of the first and second ends 12 and 14. The higher-speed system 1168 can further include a chain or belt 1174 that loops around the first and second pulleys or gears 1170 and 1172. As each container carrier 17 approaches the higher-speed system 1168, the chain or belt 1174 engages the inner wheel 1154 of the container carrier 17 such that the chain or belt 1174 and the inner wheel 1154 are translationally fixed to one another. Thus, translation of the chain or belt 1174 around the first pulley or gear 1170 and the second pulley or gear 1172 causes the inner wheel 1154, and consequently the container carrier 17, to translate with the chain or belt 1174.

Each lower-speed system 1166 can extend from a respective one of the higher-speed systems 1168 at one of the first and second ends 12 and 14 towards the other one of the first and second ends 12 and 14. In some examples, each lower-speed system 1166 extends only part of the way towards the other one of the first and second ends 12 and 14 such that the lower-speed system 1166 is configured to drive only one or a few of the container carriers 17 at a time. The container carriers 17 driven by the lower-speed portion 1166 then push the preceding container carriers 17 towards the other of the first and second ends 12 and 14. In some embodiments, the lower-speed portion 1166 can terminate before a midpoint of respective guiderail 1102 or 1104 along the longitudinal direction L. In alternative embodiments, each guiderail 1102 and 1104 can have a single lower-speed portion 1166 that extends from a higher-speed portion 1168 at its first end 12 to the higher-speed portion 1168 at its second end 14 such that all container carriers 17 between the higher-speed portions 1168 are driven by the lower-speed portion 1166.

Each lower-speed system 1166 can include a pulley or gear system configured to engage container carriers 17 at the ends of a respective upper track 1112 and a respective lower track 1114. For example, each lower-speed system 1166 can include a first pulley or gear 1180 proximate to a respective higher-speed system 1168 at one of the first and second ends 12 and 14, and a second pulley or gear 1182 that is spaced from the first pulley or gear 1180 along the longitudinal direction L towards the other one of the first and second ends 12 and 14. The lower-speed system 1166 can further include a lower-speed chain or belt 1184 that loops around the first and second pulleys or gears 1180 and 1182. As each container carrier 17 approaches the lower-speed system 1166, the lower-speed chain or belt 1184 engages the inner wheel 1154 of the container carrier 17 such that the lower-speed chain or belt 1184 and the inner wheel 1154 are translationally fixed to one another. Thus, translation of the lower-speed chain or belt 1184 around the first pulley or gear 1180 and the second pulley or gear 1182 causes the inner wheel 1154, and consequently the container carrier 17, to translate with the lower-speed chain or belt 1184.

Each drivetrain 1132 can include a speed changing system 1186. The speed changing system 1186 can be coupled to both the lower-speed system 1166 and the higher-speed system 1168. The speed changing system 1186 can be driven by one of the higher-speed system 1168 and the lower-speed system 1166 at one speed, and can resultantly drive the other one of the higher-speed system 1168 and the lower-speed system 1166 at another speed. In one embodiment, and as shown, the speed changing system 1186 can be a speed reduction system that is driven by the higher-speed system 1168 at the second speed, and that drives the lower-speed system 1166 at the first speed, lower than the second speed. In alternative embodiments, the speed changing system 1186 can be a speed increasing system that is driven by the lower-speed system 1166 at the first speed, and that drives the higher-speed system 1168 at the second speed, faster than the first speed.

The speed changing system 1186 can include a smaller pulley or gear 1188 and a larger pulley or gear 1190. The smaller pulley or gear 1188 can have a diameter that is smaller than the larger pulley or gear 1190. The smaller pulley or gear 1188 can be coaxial with, and rotationally fixed with respect to, the second pulley or gear 1172 of the higher-speed system 1168 such that the smaller pulley or gear 1188 rotates at the same rate as the second pulley or gear 1172. Further, the larger pulley or gear 1190 can be coaxial with, and rotationally fixed with respect to, the first pulley or gear 1180 of the lower-speed system 1166 such that the first pulley or gear 1180 rotates at the same rate as the larger pulley or gear 1190.

The smaller pulley or gear 1188 can be coupled to the larger pulley or gear 1190 such that one of the smaller pulley or gear 1188 and the larger pulley or gear 1190 drives the other one of the smaller pulley or gear 1188 and the larger pulley or gear 1190. The speed changing system 1186 can be configured such that the smaller pulley or gear 1188 completes more than one full rotation for each full rotation of the larger pulley or gear 1190. The speed changing system 1186 can include a driving chain or belt 1192 that loops around both the smaller pulley or gear 1188 and the larger pulley or gear 1190. In an alternative embodiment (not shown), an outer surface or teeth of the smaller pulley or gear 1188 can engage an outer surface or teeth of the larger pulley or gear 1190.

In one embodiment (as shown), rotation of the second pulley or gear 1172 of the higher-speed system 1168 can cause the smaller pulley or gear 1188 to correspondingly rotate at the second speed. Further, rotation of the smaller pulley or gear 1188 can cause the larger pulley or gear 1190 to rotate at the first speed, thereby causing the first pulley or gear 1180 of the lower-speed system 1166 to correspondingly rotate at the first speed. In an alternative embodiment (not shown), rotation of the first pulley or gear 1180 of the lower-speed system 1166 cause the larger pulley or gear 1190 to correspondingly rotate at the first speed. Further, rotation of the larger pulley or gear 1190 can cause the smaller pulley or gear 1188 to rotate at the second speed, thereby causing the second pulley or gear 1172 of the higher-speed system 1168 to correspondingly rotate at the second speed. In yet another alternative embodiment (not shown), each guiderail 1102 and 1104 can have a single motor 1130 and a single drivetrain 1130 or both guiderails 1102 and 1104 can be driven by the same motor 1130. For example, the lower-speed system 1166 can extend from the higher-speed system 1168 at the first end 12 to the higher-speed system 1168 at the second end 14. Thus, the higher-speed system 1168 at the first end 12 can drive the lower-speed system 1166, which can in turn drive the higher-speed system 1168 at the second end 14.

As described above, each drivetrain 1132 can be driven by at least one motor 1130. The at least one motor 1130 can drive one of the lower-speed system 1166 and the higher-speed system 1168, which can in turn drive the other one of the lower-speed system 1166 and the higher-speed system 1168. For example, in one embodiment (as shown), the at least one motor 1130 can drive the higher-speed system 1168, which can in turn drive the lower-speed system 1166. In an alternative embodiment (as shown), the at least one motor 1130 can drive the lower-speed system 1166, which can in turn drive the higher-speed system 1168. Further, in another alternative embodiment (not shown), each of the lower-speed system 1166 and the higher-speed system 1168 can be driven individually by its own motor 1130, in which case the speed changing system 1186 can be eliminated.

Each motor 1130 can be uni-directional so as to drive the container carriers 17 in a first direction around the loop of the respective guiderail 1102 or 1104, or can be bidirectional so as to selectively drive the container carriers 17 in the first direction or a second direction, opposite the first direction. Each motor 1130 can act indirectly on its respective higher-speed system 1168 or lower-speed system 1166. For example, as shown, each motor 1130 can be outwardly spaced from its respective guiderail 1102 or 1104 and can be coupled to the higher-speed system 1168 by a drive chain or belt. In some embodiments, the motor 1130 can be spaced from its respective guiderail 1102 or 1104 with respect to the longitudinal direction L. Outwardly spacing the motor 1130 from its respective guiderail 1102 or 1104 can enable the motor 1130 to be accessible for repair, replacement, or general maintenance. The motor 1130 can act indirectly on one of the first pulley or gear 1170 and the second pulley or gear 1172. For example, each drivetrain 1132 can include a driving pulley or gear 1176 and a driving chain or belt 1178 that loops around the driving pulley or gear 1176 and a rotating axle 1131 of the motor 1130. The driving pulley or gear 1176 can be coaxial with, and rotationally fixed with respect to, the first pulley or gear 1170 as shown. Thus, rotation of the motor axle 1131 by the motor 1130 causes the drive chain or belt to rotate, which causes the driving pulley or gear 1176 to rotate, which in turn causes the first pulley or gear 1170 to rotate.

In an alternative embodiment (not shown), the driving pulley or gear 1176 can be coaxial with, and rotationally fixed with respect to, the second pulley or gear 1172. Thus, rotation of the motor axle 1131 by the motor 1130 can cause the drive chain or belt to rotate, which can cause the driving pulley or gear 1176 to rotate, which in turn can cause the second pulley or gear 1172 to rotate. In yet another alternative embodiment (not shown), the motor 1130 can act directly on one of the first pulley or gear 1170 and the second pulley or gear 1172. For example, the motor 1130 and drivetrain 1132 can be configured such that the axle of the one of the first pulley or gear 1170 and the second pulley or gear 1172 is the rotational axle 1131 of the motor 1130. Thus, rotation of the motor axle 1131 can directly rotate the one of the first pulley or gear 1170 and the second pulley or gear 1172 without a driving chain or belt connected between the motor 1130 and the one of the first pulley or gear 1170 and the second pulley or gear 1172. In yet still another alternative embodiment (not shown), the motor 1130 can act indirectly on one of the first pulley or gear 1180 and the second pulley or gear 1182 of the lower-speed system 1166 in a manner similar to that described above with respect to the higher-speed system 1168.

The storage module 1100 can include at least one controller 24 configured to provide a control signal to the at least one motor 1130 so as to control the operation of the at least one motor 1130. In some embodiments, the controller 24 can control the speed in which the axle 1131 is rotated. Further, in some embodiments, the controller 24 can control the direction in which the axle 1131 is rotated, and hence the direction in which the container carriers 17 are translated. Yet further, in some embodiments, the controller 24 can stop the at least one motor 1130 when a desired one of the container carriers 17 is presented at one of the first end 12 and the second end 14.

Figure 29:
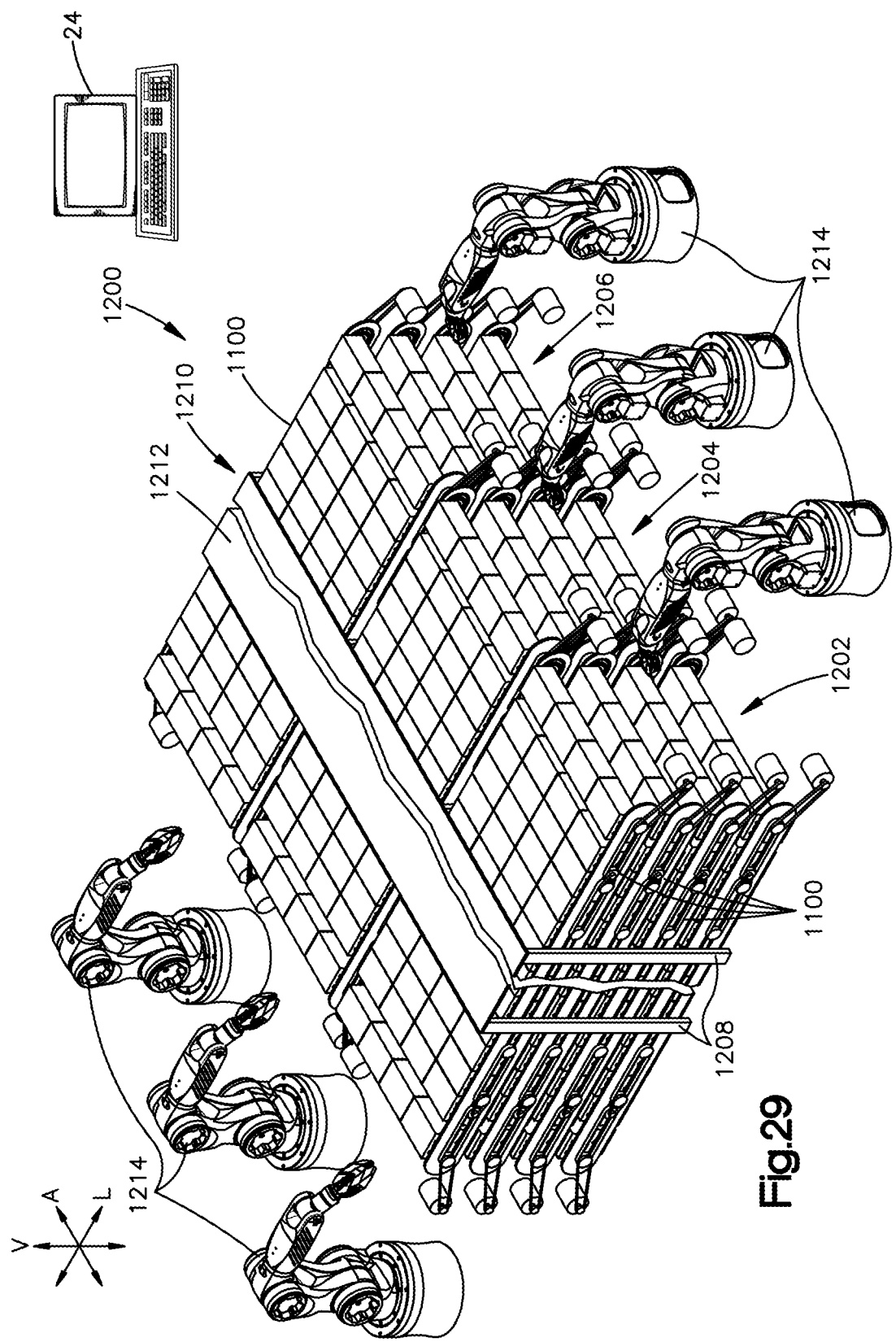
FIG. 29 shows a perspective view of a storage system comprising a plurality of the storage modules of FIG. 24.

Turning now to FIG. 29, a modular storage and retrieval system 1200 is shown that comprises a plurality of instances of the storage module 1100 of FIG. 24. The system 1200 includes a first vertical stack1 202 of the storage modules 1100 that comprises a plurality (e.g., 4) of the storage modules 1100 stacked on top of one another along the vertical direction V. The system 1200 can further include a second vertical stack 1204 of the storage modules 1100 that comprises a plurality (e.g., 4) of the storage modules 1100 stacked on top of one another along the vertical direction V. The second vertical stack 1204 can be offset from the first vertical stack 1202 along the lateral direction A. The storage system 1200 can yet further include a third vertical stack 1206 of the storage modules 1100 that comprises a plurality (e.g., 4) of the storage modules 1100 stacked on top of one another along the vertical direction V. The third vertical stack 1206 can be offset from the second vertical stack 1204 along the lateral direction A such that the second vertical stack 1204 is between the first and third vertical stacks 1202 and 1206. Each storage module 1100 of the system 1200 can be independently operated such that the container carriers 17 of each storage module 1100 can be driven around their corresponding movement path independently of the container carriers 17 of other storage module 1100 being driven around their corresponding movement path. Although three vertical stacks 1202, 1204, and 1206, each having four storage modules 1100 are shown, it will be understood that the number of vertical stacks and storage modules 1100 in each vertical stack can vary from that shown. In particular, modular storage and retrieval systems of the disclosure can include at least one vertical stack of storage modules 1100 or more than one vertical stack of storage modules 1100. Further, each vertical stack of storage modules 1100 can have at least two storage modules 1100 stacked on top of one another or more than two storage modules 1100. Thus, height, width, and length of the system 1200 can be scalable to fit within a desired volume in a warehouse space.

The modular storage and retrieval storage system 1200 can include supports 1208 that are coupled to the storage modules 1100 in each vertical stack 1202, 1204, and 1206 so as to maintain the storage modules 1100 in a stacked relation. The supports 1208 can further be coupled to the storage modules 1100 so as to attach the vertical stacks 1202, 1204, and 1206 of storage modules 1100 to one another. The supports 1208 can combine to form a frame1 210 of the system 1200. The system 1200 can further include a platform 1212 that extends across the top of the vertical stacks 1202, 1204, and 1206 of storage modules 1100. The platform 1212 can be coupled to the supports 1208. Further, the platform 1212 can be used for maintenance and inspection of the modular storage and retrieval system 1200.

The modular storage and retrieval system 1200 can also include at least one robotic manipulator 1214. For example, the system 1200 can include at least one robotic manipulator 1214 that services the first end 12 of each vertical stack of storage modules 1100 as shown. The system 1200 can also include at least one robotic manipulator 1214 that services the second end 14 of each vertical stack of storage modules 1100 as shown. In some embodiments, the manipulators 1214 at the first end 12 can be used to stow inventory items in the storage modules 1100, and the manipulators 1214 at the second end 14 can be used to retrieve inventory items from the storage modules 1100. Alternative embodiments can include at least manipulator 1214 on only one end of a vertical stack, the at least one manipulator 1214 configured to perform both stowing and retrieving operations. Additionally or alternatively, one or more of the robotic manipulators 1214 can service multiple vertical stacks of storage modules 1100. Although not shown, in some embodiments, the at least one robotic manipulator 1214 can be configured to move vertically and/or horizontally to service the storage modules 1100 of the system 1200. For example, a robotic manipulator 1214 can be mounted on a horizontal and/or vertical track to enable it to move with respect to the vertical stacks.

Each robotic manipulator 1214 can be configured as described above. Other material conveyance devices (not shown) may also be disposed adjacent to the robotic manipulators 1214. The other material conveyance devices can be any suitable material conveyance system including, for example, a horizontal conveyor belt system, a pneumatic conveyor system, a vibrating conveyor system, a flexible conveyor system, a vertical conveyor system, a spiral conveyor system, an overhead conveyor system, and/or any other suitable material conveyance system suitable for conveying items. The other material conveyance devices can be used to transport inventory items and/or storage containers to and from the robotic manipulators 1214.

Figure 30:
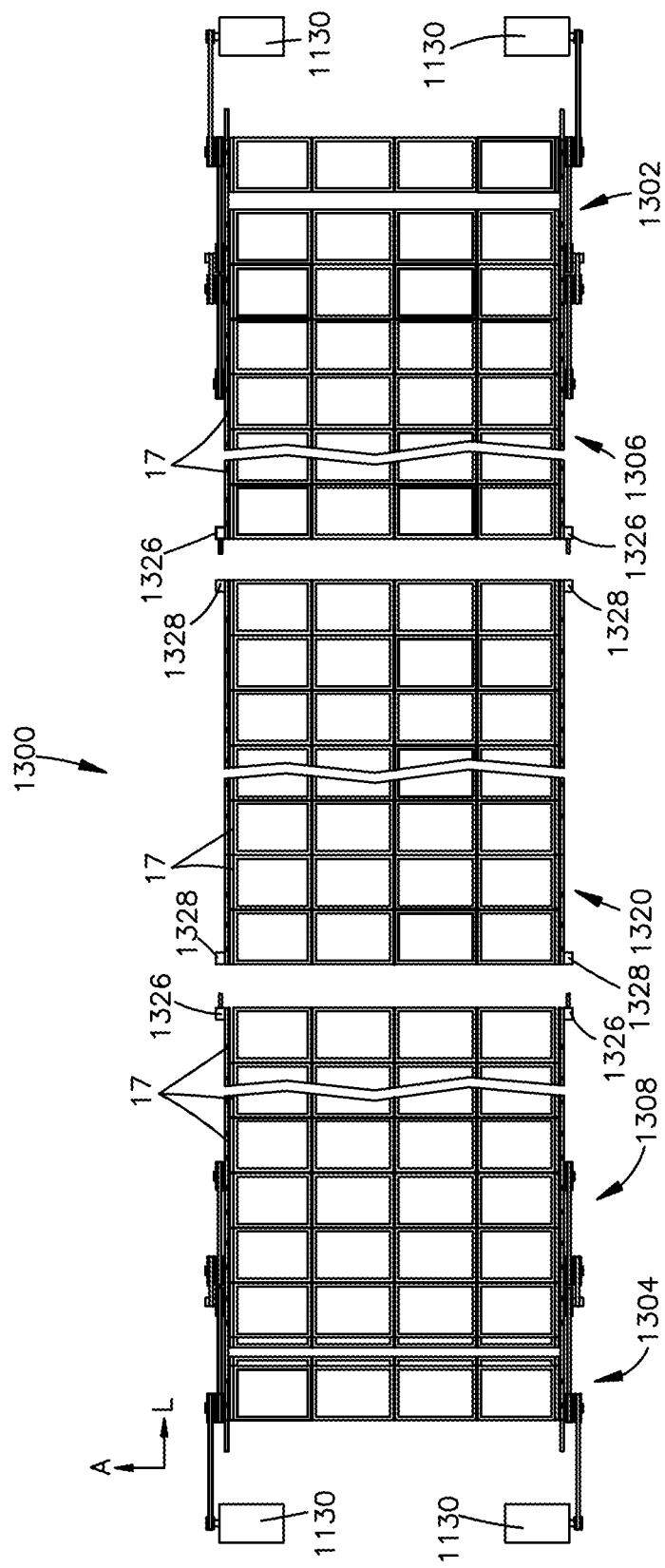
FIG. 30 shows an exploded top plan view of a storage system according to one embodiment.
Figure 31:
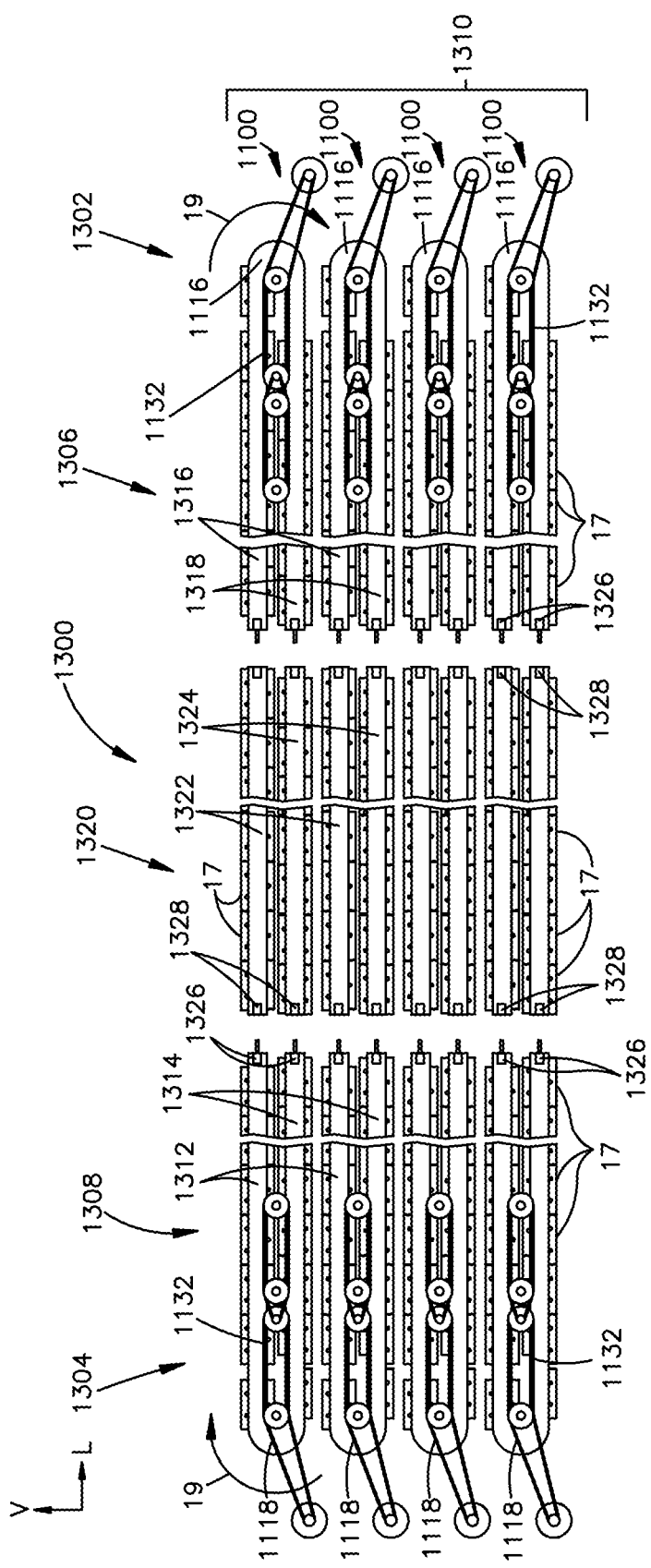
FIG. 31 shows an exploded side elevation view of the storage system of FIG. 30.

Turning now to FIGS. 30 and 31, a modular storage and retrieval system 1300 is shown according to one embodiment that is configured to be transported by truck or intermodal storage container and assembled upon delivery. The system 1300 can be implemented as described above in relations to FIGS. 24 to 29. Further, the system 1300 can be divided into at least a first end section 1306 and a second end section 1308, each of which can be transported individually in a truck or intermodal shipping container. In some embodiments, the system 1300 can also include at least one intermediate section 1320 that can be transported individually in a truck or intermodal shipping container. For example, in one embodiment, each section 1306, 1308, and 1320 can have a length of 50 feet, for an overall system length of 150 feet. The number of intermediate sections 1320 can be dependent upon the overall length of the system 1300. For example, longer systems 1300 can have more intermediate sections 1320 than smaller systems 1300. Thus, the length of system 1300 can be scalable by adding further intermediate sections 1320.

The storage system 1300 comprises at least one vertical stack 1310 of the storage modules 1100. In some embodiments, the system 1300 can comprise a plurality of vertical stacks 1310. The height of system 1300 can be scalable by adding additional instances of the vertical stack 1310 on top of one another. Additionally, the width of system 1300 can be scalable by adding additional instances of the vertical stack 1310 next to one another in a manner similar to that shown in FIG. 29. Each instance of the vertical stack 1310 can have first and second end sections similar to first and second end sections 1306 and 1308, and can optionally include one or more intermediate sections 1320. The sections (e.g., 1306, 1308, and 1320) of each instance of the vertical stack 1310 can be transported separately to a destination, and then assembled together at the destination. Assembling the system 1300 in this manner can reduce startup time for the system 1300 as compared to transporting and assembling each component of each storage module 1100 individually.

The vertical stack 1310 has a first stack end 1302 and a second stack end 1304 that are spaced from one another along the longitudinal direction L. The storage modules 1100 are stacked on top of one another along the vertical direction V. Each storage module 1100 defines a path that forms a movement path 19 in a plane that extends in the longitudinal direction L and vertical direction V, and each storage module 1100 has a plurality of container carriers 17 that translate around the movement path 19 as discussed above.

The first end section 1306 extends from the first stack end 1302 towards the second stack end 1304, and terminates before the second stack end 1304, such that the first end section 1306 includes a first end of each movement path 19 of the vertical stack 1310. Similarly, the second end section 1308 extends from the second stack end 1304 towards the first stack end 1302, and terminates before the first stack end 1302, such that the second end section 1308 includes a second end of each movement path 19 of the vertical stack 1310. At least one, such as both, of the first and second end sections 1306 and 1308 includes a drivetrain 1132 configured to drive container carriers 17 around the movement path 19. Each drivetrain 1132 can be configured as discussed above.

The first and second end sections 1306 and 1308 are coupleable to one another. In some embodiments, the first and second end sections 1306 and 1308 are removeably coupleable to one another, meaning that the sections 1306 and 1308 can be separated from one another without damaging the sections. For example, the first end section 1304 can include the first connecting track 1116 of each storage module 1100, a first upper track section 1312 of each upper track 1112 that extends from the first connecting track 1116, and a first lower track section 1314 of each lower track 1114 that extends from the first connecting track 1116. The second end section 1308 can include the second connecting track 1118 of each storage module 1100, a second upper track section 1316 of each upper track 1112 that extends from the second connecting track 1118, and a second lower track section 1318 of each lower track that 1114 that extends from the second connecting track 1118.

The first and second end sections 1306 and 1308 are coupleable to one another such that each first upper track section 1312 is coupled to a corresponding one of the second upper track sections 1316 and each first lower track section 1314 is coupled to a corresponding one of the second lower track sections 1318. The first and second end sections 1306 and 1306 are individually sized to be transported in a truck or intermodal storage container. For example, each end section The intermediate section 1320 extends between the first and second end sections 1306 and 1308. The intermediate section 1320 includes an intermediate portion of each movement path 19. In some embodiments, the intermediate section 1320 can be devoid of a drivetrain that drives the container carriers 17 as shown. The intermediate section 1320 includes an intermediate upper track section 1322 of each upper track 1112 and an intermediate lower track section of 1324 each lower track 1114. The intermediate section 1320 is coupleable to both the first and second end sections 1306 and 1308 such that each intermediate upper track section 1322 couples corresponding first and second upper track sections 1312 and 1316 to one another and each intermediate lower track section 1324 couples corresponding first and second lower track 1314 and 1318 sections to one another. Thus, a first end of the intermediate section 1320 is coupleable to the first end section 1306 and a second end of the intermediate section 1320 is coupleable to the second end section 1308 so as to couple the first end section 1306 to the second end section 1308. In some embodiments, the first and second end sections 1306 and 1308 are removeably coupleable to one another such that the sections 1306, 1308, and 1320 can be separated from one another without damaging the sections.

The storage system 1300 comprises a plurality of couplers 1326 and 1328 configured to couple the first and second end sections 1306 and 1308 to one another. For example, the first upper and lower track sections 1312 and 1314 can each include a coupler 1326 configured to couple to a coupler 1328 of a corresponding intermediate upper or intermediate lower track section 1322 or 1324. Similarly, the second upper and lower track sections 1316 and 1318 can each include a coupler 1326 configured to couple to a coupler 1328 of a corresponding intermediate upper or intermediate lower track section 1322 or 1324.

In operation, the first end section 1306 of the vertical stack 1310 of storage modules 1100 can be transported and received by truck or intermodal storage container. The second end section 1308 of the vertical stack 1310 can be separately received by truck or intermodal storage container. The intermediate section or sections 1320 (if present) can also be separately received by truck or intermodal storage container. Once received, the first and second end sections 1306 and 1308 can be coupled to one another so as to assemble the vertical stack 1310. For example, the first and second end sections 1306 and 1308 can be coupled to one another via one or more intermediate sections 1320 or can be directly coupled to one another without an intermediate section 1320 therebetween.

Description of FIGS. 32 to 44

Turning now to FIGS. 32-44, an inventory storage module 2100 according to another embodiment is shown. In general, as described above, the storage module 10 has a first end 12, a second end 14, a first side 11, and a second side 13. Further, the storage module 10 has first to fourth conveyor segments 16, 18, 20, and 22. In this embodiment, the first and second conveyor segments 16 and 18 are offset from one another along the vertical direction V. Thus, the first and second conveyor segments 16 and 18 can be referred to as upper and lower conveyor segments, respectively. Further, the storage module 2100 is configured to move storage containers 15 that are not supported by container carriers. However, it will be understood that in alternative embodiments, the storage module 2100 could move container carriers that support the storage containers 15. The upper and lower conveyor segments 16 and 18 are configured to transfer storage containers 15 along the longitudinal direction L. The third and fourth conveyor segments 20 and 22 are implemented as vertical lifts 2200(1) and 2200(2) that connect the upper and lower conveyor segments 16 and 18. The first vertical lift 2200(1) is disposed at the first module end 12 and the second vertical lift 2200(2) is disposed at the second module end 14. Each of the vertical lifts 2200(1) and 2200(2) is configured to transfer the storage containers 15 (see FIG. 33) between the upper and lower conveyor segments 16 and 18. Thus, the conveyor segments 16, 18, 20, and 22 together are configured to transfer the storage containers 15 around the movement path 19.

Figure 32:
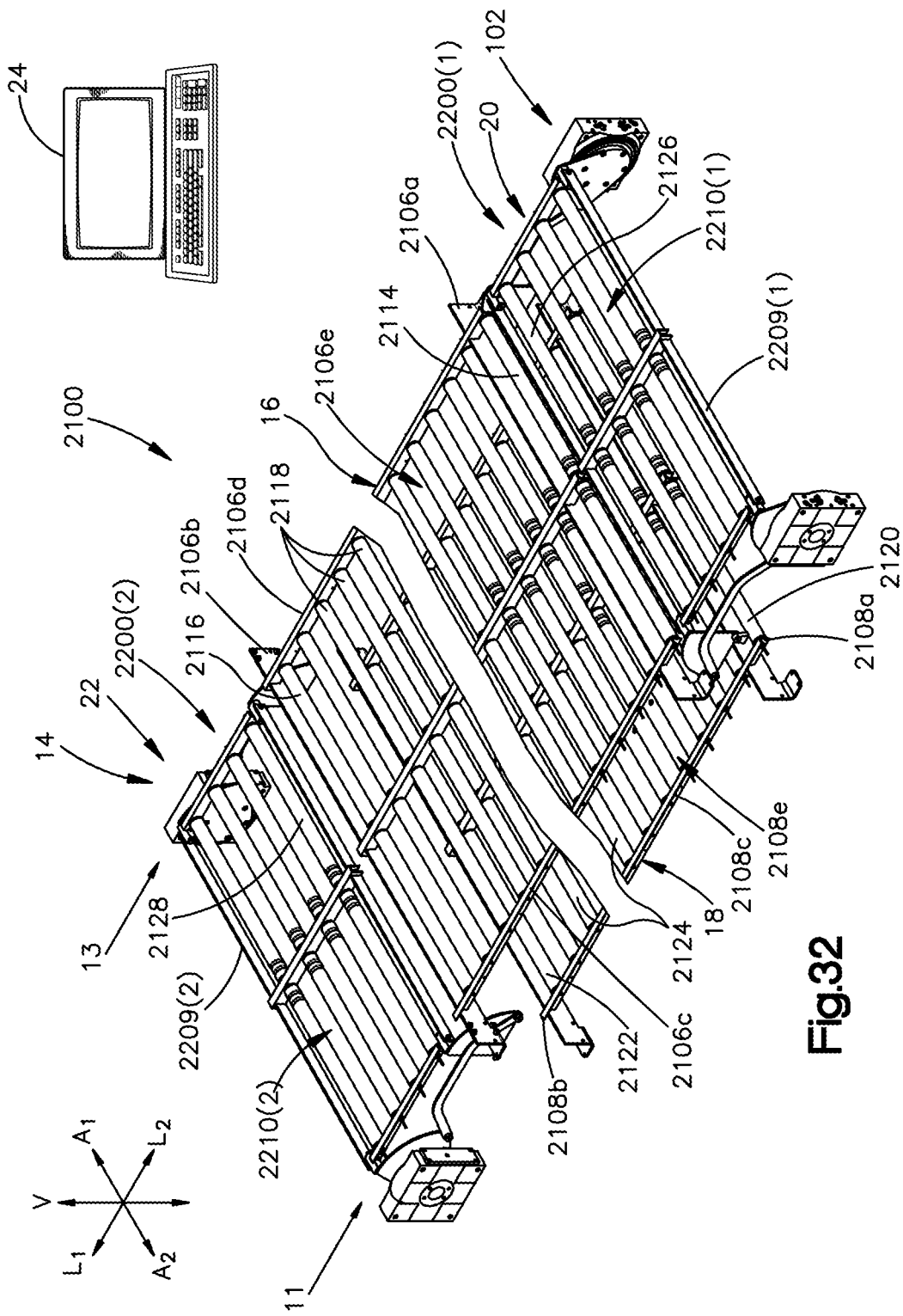
FIG. 32 shows a perspective view of a storage module according to one embodiment.

Referring more specifically to FIG. 32, the first conveyor segment 16 has a first segment end 2106a, and a second segment end 2106b that is offset from the first segment end 2106a along the first longitudinal direction $L_1$. The first and second ends 2106a and 2106b can be terminal free ends that are free from fixed connection to another track. The first conveyor segment 16 is elongate from the first end 2106a to the second end 2106b. The first conveyor segment 16 has a first lateral side 2106c and a second lateral side 2106d spaced from the first lateral side 2106c along the first lateral direction $A_1$, perpendicular to the first longitudinal direction $L_1$. The first conveyor segment 16 further has at least one conveyor surface 2106e (herein referred to as a first conveyor surface) that extends between the first and second ends 2106a and 2106b and between the first and second lateral sides 2106c and 2106d.

The first conveyor segment 16 is configured to translate storage containers 15 along the first conveyor surface 2106e from the first end 2106a to the second end 2106b along the first longitudinal direction $L_1$ when the conveyor segments operate in a counterclockwise direction as viewed looking in the first lateral direction $A_1$. Additionally or alternatively, the first conveyor segment 16 is configured to translate storage containers 15 along the conveyor surface 2106e from the second end 2106b to the first end 2106a along a second longitudinal direction $L_2$, opposite the first longitudinal direction $L_1$, when the conveyor segments operate in a clockwise direction as viewed looking in the first lateral direction $A_1$.

Similarly, the second conveyor segment 18 has a first segment end 2108a, and a second segment end 2108b that is offset from the first end 2108a along the first longitudinal direction $L_1$. The first and second ends 2108a and 2108b can be terminal free ends that are free from fixed connection to another track. The second conveyor segment 18 is elongate from the first end 2108a to the second end 2108b. The second conveyor segment 18 has a first lateral side 2108c and a second lateral side 2108d spaced from the first lateral side 2108c along the first lateral direction $A_1$. The second conveyor segment 18 further has at least one conveyor surface 2108e (herein referred to as a second conveyor surface) that extends between the first and second ends 2108a and 2108b and between the first and second lateral sides 2108c and 2108d.

The second conveyor segment 18 is configured translate storage containers 15 along the second conveyor surface 2108e from the second end 2108b to the first end 2108a along the second longitudinal direction $L_2$ when the conveyor segments operate in a counterclockwise direction as viewed looking in the first lateral direction $A_1$. Additionally or alternatively, the second conveyor segment 18 is configured to translate storage containers 15 along the second conveyor surface 2108e from the first end 2108a to the second end 2108b along the first longitudinal direction $L_1$ when the conveyor segments operate in a clockwise direction as viewed looking in the first lateral direction $A_1$. The second conveyor segment 18 is offset from the first conveyor segment 16 along the vertical direction V.

The first vertical lift 2200(1) is configured to transfer storage containers 15 between the first end 2106a of the first conveyor segment 16 and the first end 2108a of the second conveyor segment 18. For instance, the first vertical lift 2200(1) transfers storage containers 15 from the first end 2106a of the first conveyor segment 16 to the first end 2108a of the second conveyor segment 18 when the storage module 100 operates in the clockwise direction, and from the first end 2108a of the second conveyor segment 18 to the first end 2106a of the first conveyor segment 16 when the storage module 100 operates in the counterclockwise direction. Similarly, the second vertical lift 2200(2) is configured to transfer storage containers 15 between the second end 2106b of the first conveyor segment 16 and the second end 2108b of the second conveyor segment 18. For instance, the second vertical lift 2200(2) transfers storage containers 15 from the second end 2106b of the first conveyor segment 16 to the second end 2108b of the second conveyor segment 18 when the storage module 100 operates in the counterclockwise direction, and from the second end 2108b of the second conveyor segment 18 to the second end 2106b of the first conveyor segment 16 when the storage module 100 operates in the clockwise direction.

Figure 34:
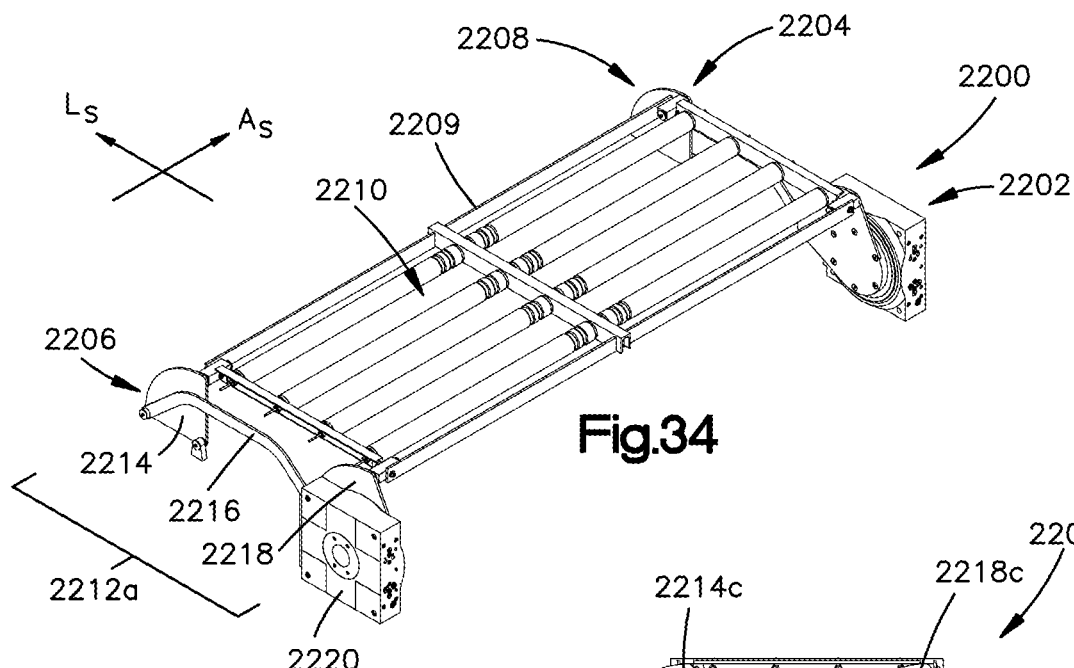
FIG. 34 shows a perspective top view of a vertical lift of the storage module of FIG. 32 in a raised position.
Figure 35:
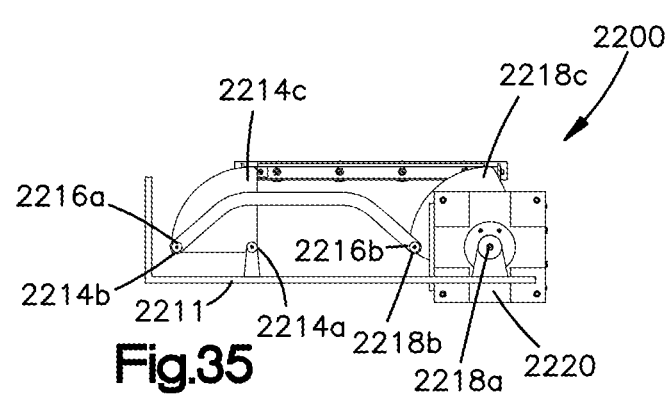
FIG. 35 shows a side elevation view of the vertical lift of FIG. 34.
Figure 36:
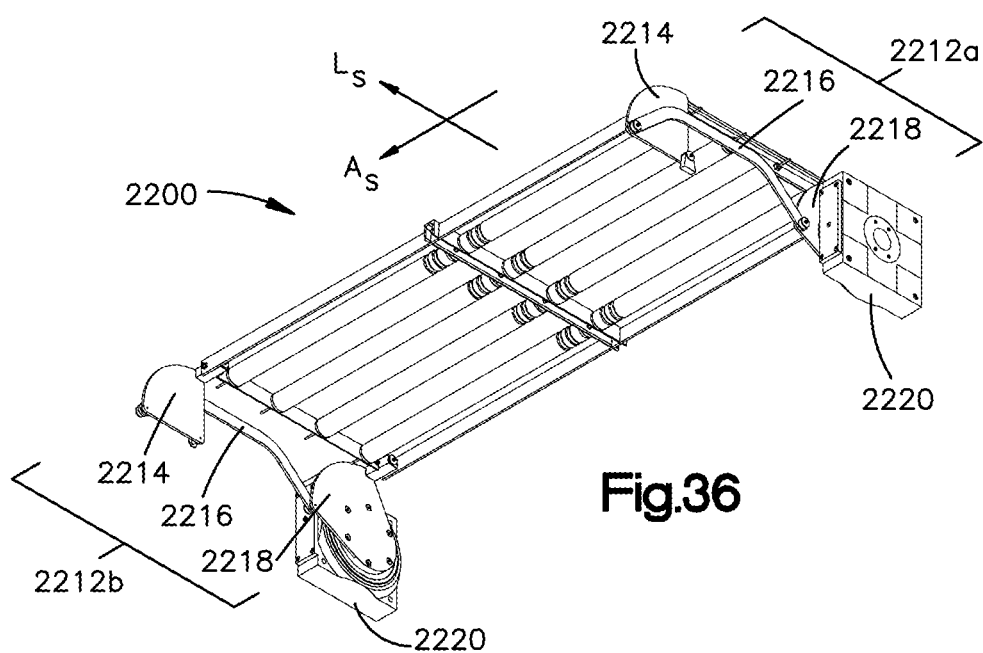
FIG. 36 shows a bottom perspective view of the vertical lift of FIG. 34.

Turning now to FIGS. 34 to 36, a vertical lift 2200 is shown according to one embodiment. One or both of the first and second vertical lifts 2200(1) and 2200(2) in FIG. 32 can be implemented in the manner shown in FIGS. 34 to 6. It will be understood that, in alternative embodiments, one or both of the first and second vertical lifts 2200(1) and 2200(2) can be implemented in a manner different from that shown in FIGS. 34 to 36. The vertical lift 2200 has a first or outer longitudinal end 2202, and a second or inner longitudinal end 2204 that is offset from the first longitudinal end 2202 along a select longitudinal direction $L_S$. The vertical lift 2200 has a first lateral side 2206, and a second lateral side 2208 that is offset from the first lateral side 2206 along a select lateral direction $A_S$. The vertical lift 2200 defines a lift conveyor segment 2209 that includes a conveyor surface 2210 that extends between the first and second longitudinal ends 2202 and 2204 and between the first and second lateral sides 2206 and 2208. When implementing the first vertical lift 2200(1), the select longitudinal direction $L_S$ can be the first longitudinal direction $L_1$ and the select lateral direction $A_S$ can be the first lateral direction $A_1$. When implementing the second vertical lift 2200(2), the select longitudinal direction $L_S$ can be the second longitudinal direction $L_2$ and the select lateral direction $A_S$ can be the second lateral direction $A_2$.

The vertical lift 2200 can comprise at least one linkage that is configured to raise and lower the conveyor segment 2209 along the vertical direction V. The at least one linkage can include a plurality of links that are interconnected with one another. Further, each linkage can be driven by an actuator that moves the links relative to one another so as to raise and lower the conveyor segment 2209. For example, the vertical lift 2200 can include a first linkage 2212a and a second linkage 2212b that is offset from the first linkage along the select lateral direction $A_S$. Each linkage can include a support 2211, such as a bracket, that attaches the linkage to at least one of the first and second conveyor segments 16 and 18.

Each linkage can include a first link 2214 and a second link 2218 offset from one another along the select longitudinal direction $L_S$. The first link 2214, the second link 2218, the support 2211, and the conveyor segment 2209 together can define a four-bar linkage as will be discussed in further detail below. Each linkage can also include a third link 2216. The third link 2216 can define a fifth bar, which is in addition to the four bars of the four-bar linkage. The third link 2216 can be configured to prevent the first and second links 2214 and 2218 from rotating in opposite directions, thereby maintaining the conveyor segment 2209 in a horizontal or upright position. The vertical lift 2200 can also include, for each linkage, an actuator 2220 configured to move the second link 2218, which in turn can move the conveyor segment 2209 and the third link 2216, which can in turn move the first link 2214. The actuator 2220 can be a rotary actuator, such as a pneumatic rotary actuator made by Festo, or any other suitable actuator.

The first and second links 2214 and 2218 can each be pivotally connected to the conveyor segment 2209, and the third link 2216 can be pivotally connected to the both the first and second links 2214 and 2218. The first link 2214 can define three pivot points 2214a, 2214b, and 2214c. The three pivot points 2214a, 2214b, and 2214c can define the vertices of a triangle. The triangle can be a right triangle as shown or other suitable triangle, the leg length and angles of which can be chosen according to the desired movement of the conveyor surface 2210. The first pivot point 2214a can define the vertex opposite the hypotenuse of the triangle, and can be fixed relative to the first and second conveyor segments 2206 and 2208. The second pivot point 2214b can be pivotally coupled to a first end 2216a of the third link 2216. The third pivot point 2214c can be pivotally coupled to the conveying segment 2209 at the inner longitudinal end 2204 of the vertical lift 2200. The third link 2216 can be a bar having a first end that defines a first pivot point 2216a and a second end that defines a second pivot point 2216b. The first pivot point 2216a can be pivotally coupled to the second pivot point 2214b of the first link 2214. The second pivot point 2216b can be pivotally coupled to the second link 2218.

The second link 2218 can define three pivot points 2218a, 2218b, and 2218c. The three pivot points 2218a, 2218b, and 2218c can define the vertices of a triangle. The triangle can be any suitable triangle, the length and angles of which can be chosen according to the desired movement of the conveyor surface 2210. The first pivot point 2218a can be pivotally coupled to the actuator 2220. The second pivot point 2218b can be pivotally coupled to the second end 2216b of the third link 2216. The third pivot point 2214c can be pivotally coupled to conveyor segment 2209 at the outer longitudinal end 2202 of the vertical lift 2200. The support 2211 can be positionally and rotationally fixed relative to the first and second conveyor segments 16 and 18. The support can be coupled to the first link 2214 at the first pivot point 2214a of the first link 2214, and to the second link 2218 at the first pivot point 2218a of the second link 2218.

Each actuator 2220 can be configured to rotate a corresponding second link 2218 back and forth. For example, each actuator can be configure to rotate a corresponding second link 2218 in a clockwise direction as viewed in the select lateral direction $A_S$ so as to raise the conveyor segment 2209, and in a counterclockwise direction as viewed in the select lateral direction $A_S$ so as to lower the conveyor segment 2209. Each actuator 2220 can rotate about less than 360 degrees. For example, each actuator 2220 can rotate in the clockwise direction from, for example, a six o'clock position to a three o'clock positon to a 12 o'clock position. Additionally, each actuator 2220 can rotate in the counterclockwise direction from, for example, the 12 o'clock position to the three o'clock positon to the six o'clock position. The conveyor surface 2210 remains horizontal throughout the rotation.

Each linkage 2212a and 2212b can be configured such that rotation of its second link 2218 in a clockwise direction causes its conveyor segment 2209 to raise, which in turn causes its first link 2214 to rotate in a clockwise direction. Further, each linkage 2212a and 2212b can be configured such that rotation of its second link 2218 in a counterclockwise direction causes its conveyor segment 2209 to lower, which in turn causes its first link 2214 to rotate in a counterclockwise direction. The third link 2216 can be employed to ensure that the first link 2214 rotates in the same direction as the second link 2214 so as to maintain the conveyor surface 2210 in a horizontal orientation. Thus, the third link 2216 can ensure that the first link 2214 rotates in a clockwise direction when the second link 2218 rotates in a clockwise direction, and that the first link 2214 rotates in a counterclockwise direction when the second link 2218 rotates in a counterclockwise direction.

The first link 2214, the second link 2218, the support 2211, and the conveyor segment 2209 together can define a standard four-bar linkage. In particular, the first link 2214 can define a first bar of the four-bar linkage, where the first bar extends from the first pivot point 2214a to the third pivot point 2214c of the first link 2214. The second link 2218 can define a second bar of the four-bar linkage, where the second bar extends from the first pivot point 2218a to the third pivot point 2218c of the second link 2218. In one example, the first bar can have a length from the first pivot point 2214a to the third pivot point 2214c that is equal to a length of the second bar from the first pivot point 2218a to the third pivot point 2218c. The conveyor segment 2209 can define a third bar of the four-bar linkage from the third pivot point 2214c of the first link 2214 to the third pivot point 2218c of the second link 2218. The support 2211 can define a fourth bar of the four-bar linkage from the first pivot point 2214a of the first link 2214 to the first pivot point 2218a of the second link 2218. In one example, the third bar can have a length from the third pivot point 2214c to the third pivot point 2218c that is equal to a length of the fourth bar from the first pivot point 2214a to the first pivot point 2218a.

The conveyor segment 2209 is configured such that storage containers 15 can be translated along the conveyor surface 2210 along the select longitudinal direction $L_S$ so as to move the storage containers 15 from the conveyor surface 2210 to one of the first and second conveyor segments 16 and 18. Further, the conveyor segment 2209 is configured such that storage containers can be translated along the conveyor surface 2210 along a direction that is opposite the select longitudinal direction $L_S$ so as to move the storage containers 15 from one of the first and second conveyor segments 16 and 18 onto the conveyor surface 2210.

Referring to FIG. 44, as described above, the vertical lift 2200 can include a first linkage 2212a and a second linkage 2212b. The second linkage 2212b can be implemented as a substantial mirror image of the first linkage 2212a as shown in the vertical lift on the left-hand side. Thus, the actuators 2220 of the first linkage 2212a and the second linkage 2212b can be aligned with one another along the select lateral direction $A_S$. Alternatively, as shown in the vertical lift on the right-hand side, the second linkage 2212b can be a substantial copy of the first linkage 2212a, rotated 180 degrees. Thus, the actuators 2220 of the first linkage 2212a and the second linkage 2212b can be staggered such that they are not aligned with one another along the select lateral direction $A_S$. Staggering the actuators 2220 in such a manner can permit a vertical lift (e.g., the vertical lift on the right-hand side) of a first storage module to be nested with a vertical lift (e.g., the vertical lift on the left-hand side) of an adjacent storage module so that the adjacent storage modules can be spaced closer to one another.

In general, conveyor segments of the present disclosure can be implemented using any suitable type of conveyor technology or any combination of suitable technologies. For example, each conveyor segment of the present disclosure can include at least one sliding surface (not shown), at least one rotating conveyor element, or any combination thereof, where each sliding surface or rotating conveyor element at least partially defines the conveyor surface of the conveyor segment. The at least one rotating conveyor element can include at least one powered rotating conveyor element that is configured to rotate in a direction that drives the storage containers 15 to translate along a respective one of the conveyor surfaces.

For example, the at least one powered rotating conveyor element can include (without limitation) (i) a motor-driven roller that is driven by a motor that is disposed within the roller such as those made by Interroll, (ii) a chain- or belt-driven roller that is driven by a chain or belt that is in turn driven by a motor that is external to the roller, (iii) a conveyor belt or wire-mesh belt, (iv) any other suitable powered rotating conveyor element, or (v) any combination thereof. The at least one powered rotating conveyor element can extend across only a portion of a conveyor segment such as (without limitation) adjacent an end of the conveyor segment, or can extend across an entire length of a conveyor segment. For example, a conveyor belt or wire-mesh belt can extend adjacent an end of the conveyor segment or can extend across an entire length of a conveyor segment. Similarly, one or more rollers can be disposed adjacent one end of the conveyor segment, or a plurality of rollers can be disposed across an entire length of the conveyor segment.

Additionally or alternatively, the at least one rotating conveyor element can include at least one unpowered rotating conveyor element that rotates in response to an item being translated thereon. The at least one unpowered rotating conveyor element can include (i) a ball, (ii) a roller, (iii) a skate wheel, (iv) any other suitable rotating conveyor element that is configured to roll in response to an storage container being translated thereon, or (v) any combination thereof. The at least one powered rotating conveyor element can extend across only a portion of a conveyor segment such as (without limitation) adjacent a middle portion of the conveyor segment, or can extend across an entire length of a conveyor segment. In some embodiments, the storage module can include at least one actuator in addition to, or alternatively to, at least one powered rotating conveyor elements. Each actuator can be configured to push the storage containers along a conveyor surface, and may be used in combination with or in lieu of at least one powered rotating conveyor elements to drive the storage containers along the conveyor surface.

Referring now more specifically to the embodiment of FIG. 32, the first conveyor segment 16 can include a plurality of rotating conveyor elements that define the first conveyor surface 2106e. For example, the first conveyor segment 16 can include a plurality of rollers, each having a central axis that extends along the first lateral direction $A_1$. The plurality of rollers can include a first powered roller 2114 adjacent the first end 2106a and a second powered roller 2116 adjacent the second end 2106b. The first and second powered rollers 2114 and 2116 can assist in driving storage containers 15 onto the vertical lifts 2200(1) and 2200(2). The plurality of rotating conveyor segments can further include at least one unpowered rotating conveyor element 2118 between the first and second powered rollers 2114 and 2116. The at least one unpowered rotating conveyor element 2118 can include a plurality of unpowered rollers as shown. It will be understood that, in alternative embodiments, the conveyor surface 2106e of the first conveyor segment 16 can be implemented using any suitable type of conveyor technology or any combination of suitable technologies as described above. For example, the conveyor surface 2106e can be implemented entirely by unpowered rotating conveyor elements, and the storage containers 15 can be driven along the conveyor surface 2106e by at least one linear actuator that pushes the storage containers 15 along the conveyor surface 2106e.

The second conveyor segment 18 can be implemented in a manner that is substantially similar to that of the first conveyor segment 16, although the second conveyor segment 18 is configured to translate items in a direction opposite from that of the first conveyor segment 16. The second conveyor segment 18 can include a plurality of rotating conveyor elements that define the first conveyor surface 2108e. For example, the second conveyor segment 18 can include a plurality of rollers, each having a central axis that extends along the first lateral direction $A_1$. The plurality of rollers can include a first powered roller 2120 adjacent the first end 2108a and a second powered roller 2122 adjacent the second end 2108b. The first and second powered rollers 2120 and 2122 can assist in driving storage containers 15 onto the vertical lifts 2200(1) and 2200(2). The second conveyor segment 18 can further include at least one unpowered rotating conveyor element 2124 between the first and second powered rollers 2120 and 2122. The at least one unpowered rotating conveyor element 2124 can includes a plurality of unpowered rollers as shown. It will be understood that, in alternative embodiments, the conveyor surface 2108e of the second conveyor segment 18 can be implemented using any suitable type of conveyor technology or any combination of suitable technologies as described above. For example, the conveyor surface 2108e can be implemented entirely by unpowered rotating conveyor elements, and the storage containers 15 can be driven along the conveyor surface 2108e by at least one linear actuator that pushes the storage containers 15 along the conveyor surface 2108e.

The first vertical lift 2200(1) can include a third conveyor segment 2209(1). The first vertical lift 2200(1) can be configured to move between a raised position, wherein the third conveyor 2209(1) segment is vertically aligned with the first conveyor segment 16, and a lowered position, wherein the third conveyor segment 2209(1) is vertically aligned with the second conveyor segment 18. The third conveyor segment 2209(1) includes plurality of rotating conveyor elements that define a conveyor surface 2210(1) (herein referred to as a third conveyor surface) of the first vertical lift 2200(1). For example, the first vertical lift 2200(1) can include a plurality of rollers, each having a central axis that extends along the first lateral direction $A_1$. The plurality of rollers can include at least one powered roller 2126 that is configured to assist in driving storage containers 15 onto the first vertical lift 2200(1). It will be understood that, in alternative embodiments, the third conveyor surface 2210(1) of the first vertical lift 2200(1) can be implemented using any suitable type of conveyor technology or any combination of suitable technologies as described above. For example, the third conveyor surface 2210(1) can be implemented entirely by unpowered rotating conveyor elements, and the storage containers 15 can be driven onto and off of the third conveyor surface 2210(1) by at least one linear actuator that pushes the storage containers 15 onto or off of the third conveyor surface 2210(1).

The second vertical lift 2200(2) can include a fourth conveyor segment 2209(2). The second vertical lift 2200(2) can be configured to move between a raised position, wherein the fourth conveyor segment 2209(2) is vertically aligned with the first conveyor segment 16, and a lowered position, wherein the fourth conveyor segment 2209(2) is vertically aligned with the second conveyor segment 18. The fourth conveyor segment 2209(2) can include a plurality of rotating conveyor elements that define a conveyor surface 2210(2) (herein referred to as the fourth conveyor surface) of the second vertical lift 2200(2). For example, the second vertical lift 2200(2) can include a plurality of rollers, each having a central axis that extends along the first lateral direction $A_1$. The plurality of rollers can include at least one powered roller 2128 that is configured to assist in driving storage containers 15 onto the vertical lift 2200(2). It will be understood that, in alternative embodiments, the fourth conveyor surface 2210(2) of the vertical lift 2200(2) can be implemented using any suitable type of conveyor technology or any combination of suitable technologies as described above. For example, the fourth conveyor surface 2210(2) can be implemented entirely by unpowered rotating conveyor elements, and the storage containers 15 can be driven onto and off of the fourth conveyor surface 2210(2) by at least one linear actuator that pushes the storage containers 15 onto or off of the fourth conveyor surface 2210(2).

Figure 33:
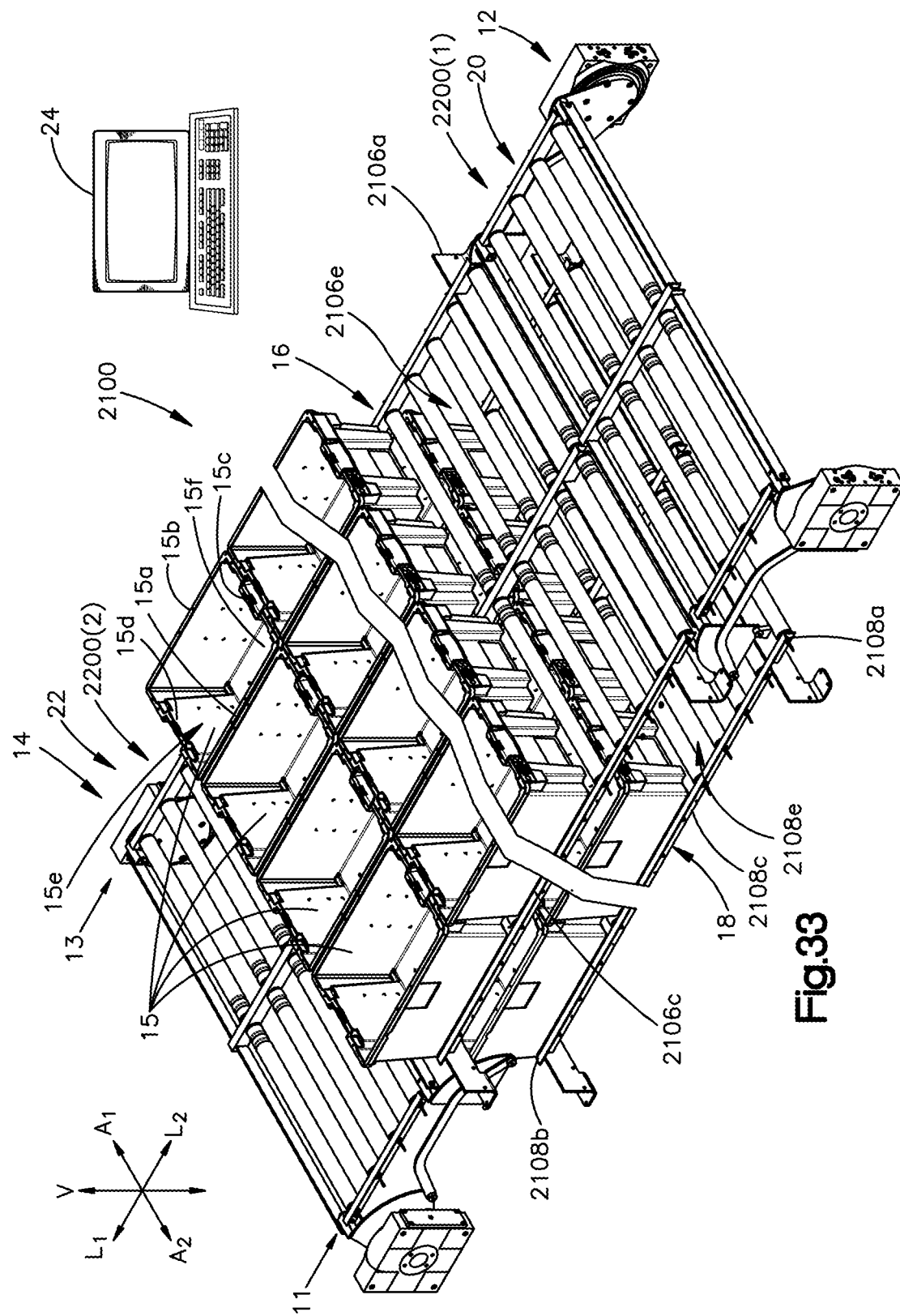
FIG. 33 shows a perspective view of a system comprising the storage module of FIG. 32 with a plurality of container carriers.

Turning now to FIG. 33, a system is shown comprising a storage module 2100 and a plurality of storage containers 15. Each storage container 15 can be any suitable storage container as described above that is configured to be supported by the storage module 2100 and to hold inventory items. The storage containers 15 can be densely packed along the first and second conveyor segments 16 and 18. For example, the storage containers 15 carried by the first conveyor segment 16 can be arranged end-to-end such that there is little to no space between adjacent ones of the storage containers 15. Similarly, the storage containers 15 carried by the second conveyor segment 18 can be arranged end-to-end such that there is little to no space between adjacent ones of the storage containers 15. In some embodiments, storage containers 15 along each conveyor segment may contact one another other. In other embodiments, storage containers 15 may be spaced from each other by a distance that is no more than 10 percent of the overall length $L_S$ of each storage container 15 along the conveyor segment or no more than 5 percent of the overall length $L_S$ of each storage container 15 along the conveyor segment. In some embodiments, the storage module 2100 can be configured such that each of at least one of the storage containers 15 may have one or more storage container 15 stacked on top of the storage container 15. Stacking the storage containers 15 on top of one another can increase the storage density of the storage module 2100 over that of storage modules in which the storage containers are not stacked.

The storage containers 15 can also be densely packed along the vertical direction. In particular, the first conveyor segment 16 can be stacked above the storage containers 15 on the second conveyor segment 18 (or the bottom level) so that the space between each storage container 15 on the bottom level and the first conveyor segment 16 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers, such as a spacing that is no more than 20 percent of the height of the storage container, such as no more than 15 percent of the height of the storage container, such as no more than 10 percent of the height of the storage container, or such as no more than 5 percent of the height of the storage container. Storage density is inversely proportional to the distance between an storage container and the conveyor segment 16 immediate over top of the storage container 15. Thus, as this distance is decreased, the storage density increases.

The storage module 2100 can have an overall module width $W_M$ along the first lateral direction $A_1$ from the first side 11 to the second side 13. The overall module width $W_M$ can be greater than or equal to the storage container width $W_S$ such that the storage module 2100 is configured to support at least one storage container 15 from the first side 11 to the second side 13. As shown in FIG. 2, in some embodiments, the storage module 2100 can have an overall module width $W_M$ that is greater than the storage container width $W_S$ such that the storage module 2100 is configured to support a plurality of storage containers 15 side-by-side between the first side 11 and the second side 13. In such embodiments, the storage containers 15 can be densely packed from the first side 11 to the second side 13. For example, the storage containers 15 carried by the first conveyor segment 16 can be arranged side-to-side such that there is little to no space between adjacent ones of the storage containers 15. Similarly, the storage containers 15 carried by the second conveyor segment 18 can be arranged side-to-side such that there is little to no space between adjacent ones of the storage containers 15. In some embodiments, the storage containers 15 that are arranged side-to-side may contact one another other. In other embodiments, the storage containers 15 that are arranged side-to-side may be spaced from each other by a distance that is no more than 10 percent of the overall width $W_S$ of each storage container 15 or no more than 5 percent of the overall width $W_S$ of each storage container 15.

Referring now to FIGS. 37 to 42, one method of translating the storage containers 15 around a vertical movement path of the storage module 2100 in a clockwise direction will now be described. In this method, one vertical lift 2200(1) or 2200(2) transitions storage containers 15 between the first and second conveyor segments 16 and 18 of the module 2100 at a time. However, it will be understood that, in alternative methods, both vertical lifts 2200(1) and 2200(2) could transition storage containers 15 between the first and second conveyor segments 16 and 18 concurrently. As the storage containers 15 are translated around the vertical movement path, the orientation of each storage container 15 remains fixed. Thus, the second end wall 15d of each storage container 15 remains spaced from the first end wall 15c of the storage container 15 along the first longitudinal direction $L_1$ as the storage container 15 is translated around the movement path. Similarly, the upper end 15e remains spaced above the bottom surface 15f as the storage container 15 is translated around the movement path. It will be understood that the storage containers 15 can additionally or alternatively be translated in a counterclockwise direction.

In FIG. 37, a step is shown that comprises causing the storage containers 15 to be translated along the upper level of the storage module 2100 along the second longitudinal direction $L_2$. This step can include causing a first storage container 15(1) to be translated from the first conveyor segment 16 onto the first vertical lift 2200(1) along the second longitudinal direction $L_2$, where the first vertical lift 2200(1) is shown in a raised position. The storage module 2100 can include at least one movement system 2141 that is configured to push the storage containers 15 along the second longitudinal direction $L_2$ until the first storage container 15(1) is at least partially disposed on the first vertical lift 2200(1). Each movement system 2141 can include an actuator 2142. In one example, the actuator 2142 can be a linear actuator having a shaft 2144 that extends in the second longitudinal direction $L_2$ so as to engage and drive the storage containers 15 in the second longitudinal direction $L_2$, although it will be understood that alternative linear actuators may be used. The first conveyor segment 16 can be devoid of powered rotating conveyor elements, and the storage containers can be driven along the second longitudinal direction $L_2$ entirely by the actuator or other mechanism.

In alternative embodiments, the storage module 2100 can include at least one powered rotating conveyor element (discussed above) that drives the storage containers 15 in the second longitudinal direction $L_2$ until the first storage container 15(1) is at least partially disposed on the first conveyor segment 16. The at least one powered rotating conveyor element can assist an actuator in pushing the storage containers 15. Alternatively, the at least one powered rotating conveyor element can drive each of the storage containers without needing the storage containers to push one another and/or without needing an actuator to push the storage containers. The unpowered rotating conveyor elements 2118 (if any) of the first conveyor segment 16 are configured to spin in response to the storage containers 15 being translated thereon so as to limit the amount of force that is needed to push the storage containers 15.

In FIG. 38, a step is shown that comprises causing the first vertical lift 2200(1) (and optionally the second vertical lift 2200(2)) to be transitioned from the raised position in FIG. 37 to an intermediate position, and in FIG. 39, a step is shown that comprises causing the first vertical lift 2200(1) (and optionally the second vertical lift 2200(2)) to be transitioned from the intermediate position to a lowered position. In the intermediate position, an inventory item can be retrieved from, or stowed into, the first storage container 15(1), or the first storage container 15(1) can be removed from the storage module 2100 so that an inventory item can be retrieved from, or stowed into, the first storage container 15(1). However, it will be understood that, in alternative embodiments, this stowing and retrieving can be performed in in any one or more of the raised position in FIG. 37, the intermediate position in FIG. 38, and the lowered position in FIG. 39.

In FIG. 40, a step is shown that comprises causing the storage containers 15 to be translated along the lower level of the storage module 2100 along the first longitudinal direction $L_1$. This step can include causing a second storage container 15(2) to be translated from the second conveyor segment 18 onto the second vertical lift 2200(2) along the first longitudinal direction $L_1$, where the second vertical lift 2200(2) is shown in the lowered position. The storage module 2100 can include an actuator 2142 that is configured to push the storage containers 15 along the first longitudinal direction $L_1$ until the second storage container 15(2) is at least partially disposed on the second vertical lift 2200(2). In one example, the actuator 2142 can be a linear actuator having a shaft 2144 that extends in the first longitudinal direction $L_1$ so as to engage and drive the storage containers 15 in the first longitudinal direction $L_1$, although it will be understood that alternative linear actuators may be used. The second conveyor segment 18 can be devoid of powered rotating conveyor elements, and the storage containers can be driven along the second longitudinal direction $L_2$ entirely by the actuator or other mechanism.

In alternative embodiments, the storage module 2100 can include at least one powered rotating conveyor element (discussed above) that drives the storage containers 15 in the first longitudinal direction $L_1$ until the second storage container 15(2) is at least partially disposed on the second vertical lift 2200(2). The at least one powered rotating conveyor element can assist an actuator in pushing the storage containers 15. Alternatively, the at least one powered rotating conveyor element can drive each of the storage containers without needing the storage containers to push one another and/or without needing an actuator to push the storage containers. The unpowered rotating conveyor elements 2124 (if any) of the second conveyor segment 18 are configured to spin in response to the storage containers 15 being translated thereon so as to limit the amount of force that is needed to push the storage containers 15.

In FIG. 41, a step is shown that comprises causing the second vertical lift 2200(2) (and optionally the first vertical lift 2200(1)) to be transitioned from the lowered position in FIG. 40 to an intermediate position, and in FIG. 42, a step is shown that comprises causing the second vertical lift 2200(2) (and optionally the first vertical lift 2200(1)) to be transitioned from the intermediate position to a raised position. In the intermediate position, an inventory item can be retrieved from, or stowed into, the second storage container 15(2), or the second storage container 15(2) can be removed from the storage module 2100 so that an inventory item can be retrieved from, or stowed into, the second storage container 15(2). However, it will be understood that, in alternative embodiments, this stowing and retrieving can be performed in in any one or more of the raised position in FIG. 42, the intermediate position in FIG. 41, and the lowered position in FIG. 40. It will be understood that method of FIGS. 37 to 42 can begin at any one of the steps of FIGS. 37 to 42, depending on the positions of the storage containers 15. Further, at least one, up to all, of the steps in FIGS. 37 to 42 can be repeated as desired to present a desired one of the storage containers 15 at one of the first and second ends 12 and 14.

Figure 43:
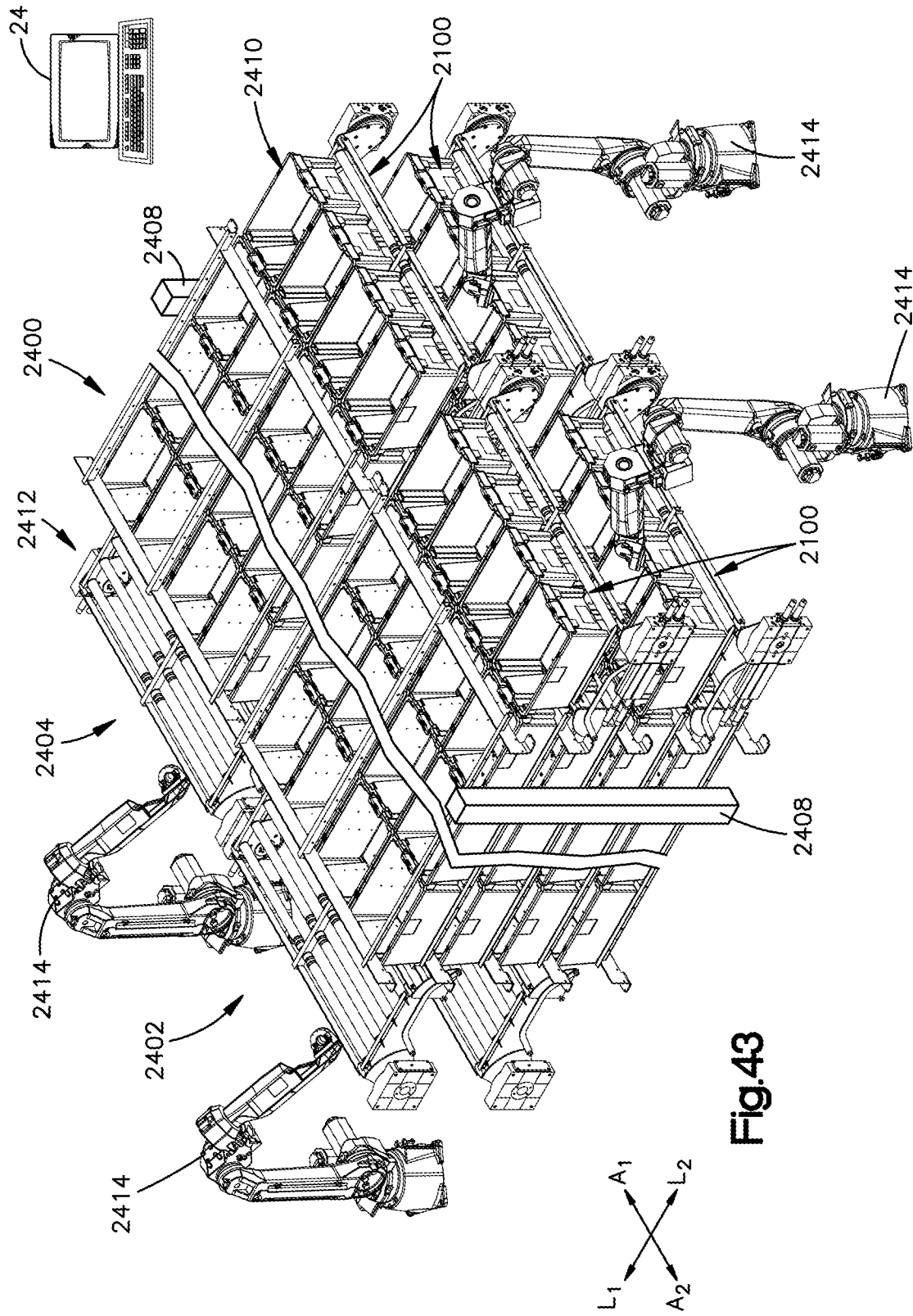
FIG. 43 shows a perspective view of a modular storage and retrieval system according to one embodiment that comprises a plurality of instances of the storage module of FIG. 32 and a plurality of container carriers.

Referring now to FIG. 43, a modular storage and retrieval system 2400 is shown that comprises a plurality of instances of the storage module 2100 of FIG. 32, each supporting a plurality of storage containers 15. In general, storage systems of the disclosure can include at least one vertical stack of storage modules that comprises at least two of the storage modules stacked on top of one another along the vertical direction V. In at least some embodiments, the system 2400 can include the storage containers 15 supported by the system 2400, although it will be understood that the system 2400 can be made and sold without the storage containers 15.

The storage system 2400 comprises a first system end 2410, and a second system end 2412 that is spaced from the first system end 2410 along the first longitudinal direction $L_1$. The storage system 2400 includes a plurality of instances of the storage module 2100, each extending from the first system end 2410 to the second system end 2412. The plurality of storage modules 2100 includes a first vertical stack 2402 of the storage modules 2100 that comprises a plurality (e.g., at least two) of the storage modules 2100 stacked on top of one another along the vertical direction V. The storage system 2400 further includes a second vertical stack 2404 of the storage modules 2100 that comprises a plurality (e.g., at least two) of the storage modules 2100 stacked on top of one another along the vertical direction V. The second vertical stack 2404 can be offset from the first vertical stack 2402 along the first lateral direction $A_1$.

Each storage module 2100 of the system 2400 can be independently operated such that the storage containers 15 of each storage module 2100 can be driven around their corresponding movement path independently of the storage containers 15 of other storage modules 2100 being driven around their corresponding movement path. Although two vertical stacks 2402 and 2404, each having two storage modules 2100 are shown, it will be understood that the number of vertical stacks and storage modules 2100 in each vertical stack can vary from that shown. In particular, modular storage and retrieval systems of the disclosure can include at least one vertical stack of storage modules 2100 or more than one vertical stack of storage modules 2100. Further, each vertical stack of storage modules 2100 can have at least two storage modules 2100 stacked on top of one another or more than two storage modules 2100. Thus, height, width, and length of the system 2400 can be scalable to fit within a desired volume in a warehouse space.

The modular storage and retrieval storage system 2400 can include supports 2408 that are coupled to the storage modules 2100 in each vertical stack 2402 and 2404 so as to maintain the storage modules 2100 in a stacked relation. The supports 2408 can further be coupled to the storage modules 2100 so as to attach the vertical stacks 2402 and 2404 of storage modules 2100 to one another. The supports 2408 can combine to form a frame of the system 2400.

The storage modules 2100 can be stacked on top of one another so that the space between each storage container 15 and a storage module 2100 immediately over top of the storage container 15 can be minimized to maximize storage density. In some examples, this spacing can be described by absolute distance, such as a distance ranging from 0.25 to 1.25 inches, such as 0.50 to 1.00 inches. In other examples, this spacing can be described in relation to a height of one of the storage containers, such as a spacing that is no more than 20 percent of the height of the storage container, such as no more than 15 percent of the height of the storage container, such as no more than 10 percent of the height of the storage container, or such as no more than 5 percent of the height of the storage container. Storage density is inversely proportional to the distance between an storage container and the storage module immediate over top of the storage container 15. Thus, as this distance is decreased, the storage density increases.

The modular storage and retrieval system 2400 can also include at least one robotic manipulator 2414. The at least one robotic manipulator 2414 can be configured as described above. For example, the system 2400 can include at least one robotic manipulator 2414 that services the first module end 12 of each vertical stack of storage modules 2100. The system 2400 can additionally or alternatively include at least one robotic manipulator 2414 that services the second module end 14 of each vertical stack of storage modules 2100 as shown. In some embodiments, the manipulators 2414 at the first module ends 12 can be used to stow inventory items or storage containers 15 in the storage modules 2100, and the manipulators 2414 at the second module end 14 can be used to retrieve inventory items or storage containers 15 from the storage modules 2100. Alternative embodiments can include at least one manipulator 2414 on only one end of a vertical stack, the at least one manipulator 2414 configured to perform both stowing and retrieving operations. Additionally or alternatively, one or more of the robotic manipulators 2414 can service multiple vertical stacks of storage modules 2100. Although not shown, in some embodiments, the at least one robotic manipulator 2414 can be configured to move vertically and/or horizontally to service the storage modules 2100 of the system 2400. For example, a robotic manipulator 2414 can be mounted on a horizontal and/or vertical track to enable it to move with respect to the vertical stacks.

In operation, a method of operating the system 2400 comprises causing a desired storage container 15 in the system 2400 to be identified to either retrieve an inventory item from or stow an inventory item into. Further, the method comprises causing a location of the storage container 15 in the system 2400 to be identified. Identifying the location can include identifying the storage module 100 that supports the identified storage container 15 and optionally the position of the storage container 15 on the identified storage module 2100. Once the location is identified, the method comprises causing the storage containers 15 of the identified storage module 2100 to be translated around the movement path of the identified storage module 2100 until the desired storage container 15 is presented at a desired one of the first and second ends 12 and 14 of the identified storage module 2100. The method then comprises retrieving an inventory item from, or stowing an inventory item into, the desired storage container 15. This step can be performed by a human who manually retrieves an inventory item from the desired storage container 15 or stows the inventory item into the desired storage container 15. Alternatively, this step can comprise causing a robotic manipulator 2414 to move so as to retrieve an inventory item from the desired storage container, or stow an inventory item into the desired storage container 15. In some embodiments, the human or robotic manipulator 2414 can retrieve the desired storage container 15 itself from the system 2400, and then the inventory item can be retrieved from the desired storage container 15. The storage container 15 can then be stowed by the human or a robotic manipulator 2414 onto a desired one of the storage modules 2100. In so doing, the storage container 15 can be stowed onto the same storage module 2100 from which the storage container 15 was retrieved for can be stowed in a different storage module. At least one, up to all, of these steps can be controlled by the controller 2416.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A storage module configured to store inventory items, the storage module comprising:
    first and second module ends that are spaced from one another along a longitudinal direction;
    a first conveyor segment, and a second conveyor segment spaced below the first conveyor segment along a vertical direction, the first and second conveyor segments each extending between the first and second module ends and each having first and second terminal free ends that are spaced from one another along the longitudinal direction;
    a first vertical lift disposed at the first terminal free ends and comprising a first lift actuator system having a first track and a first actuator coupled to the first track, the first lift actuator system configured to translate the first track along the vertical direction so as to move inventory storage containers between the first and second conveyor segments at the first module end, a portion of the first track being ramped relative to the longitudinal direction; and
    a second vertical lift disposed at the second terminal free ends and comprising a second lift actuator system having a second track and a second actuator coupled to the second track, the second lift actuator system configured to translate the second track along the vertical direction so as to move inventory storage containers between the first and second conveyor segments at the second module end, a portion of the second track being ramped relative to the longitudinal direction,
    wherein the first conveyor segment, the second conveyor segment, the first vertical lift, and the second vertical lift together define a closed movement path that has a closed shape, and the storage module is configured to translate inventory storage containers around the closed movement path, without transferring storage containers outside of the closed movement path, until a desired one of the inventory storage containers is presented at one of the first module end and the second module end.

2. The storage module of claim 1, wherein each of the first and second vertical lifts includes a conveyor surface, and the first and second vertical lifts are configured to move their respective conveyor surfaces between a raised position and a lowered position.

3. The storage module of claim 2, wherein, in the raised position, the conveyor surfaces are vertically aligned with the first conveyor segment, and in the lowered position, the conveyor surfaces are vertically aligned with the second conveyor segment.

4. The storage module of claim 1, wherein the portion of each track is ramped downward as it extends away from a center of the storage module along the longitudinal direction.

5. The storage module of claim 1, wherein each of the first and second lift actuator systems includes a pair of lift actuator systems that are spaced from one another along a lateral direction that is perpendicular to the longitudinal direction and the vertical direction, each pair of lift actuator systems configured to move inventory storage containers between a lowered position and a raised position.

6. The storage module of claim 5, wherein each track defines a conveyor surface, and each actuator is configured to move its respective conveyor surface between the lowered and raised positions.

7. The storage module of claim 6, further comprising a plurality of container carriers, each container carrier configured to carry at least one of the inventory storage containers, and the container carriers configured to engage the conveyor surfaces of the first lift actuator system when a container carrier is supported by the first vertical lift and the conveyor surfaces of the second lift actuator system when a container carrier is supported by the second vertical lift.

8. The storage module of claim 5, wherein each actuator is a belt- or chain-driven actuator that includes:
    a pair of pulleys or gears that are spaced apart from one another along the vertical direction;
    a belt or chain that defines a closed loop that wraps around the pair of pulleys or gears, wherein a respective one of the tracks is fastened to the belt or chain; and
    a drive configured to rotate one of the pulleys or gears so as to move the respective one of the tracks between the lowered and raised positions.

9. The storage module of claim 5, wherein each lift actuator system includes a rail that extends along the vertical direction, and a respective one of the tracks is configured to ride up and down the rail along the vertical direction as the respective one of the tracks moves between the lowered and raised positions.

10. A storage system, comprising:
    at least first and second vertical stacks of inventory storage modules stacked on top of one another and offset from one another along a lateral direction, each inventory storage module comprising:
        first and second module ends that are spaced from one another along a longitudinal direction;
        first and second conveyor segments that are spaced from one another along a vertical direction, the first and second conveyor segments each configured to transfer inventory storage containers between the first and second module ends along the longitudinal direction; and
        first and second vertical lifts disposed at the first and second module ends, respectively, the first and second vertical lifts each comprising at least one lift actuator system that has at least one track and at least one actuator that is coupled to the at least one track, the at least one actuator configured to translate the at least one track along the vertical direction so as to move the inventory storage containers between the first and second conveyor segments,
    wherein the first conveyor segment, the second conveyor segment, the first vertical lift, and the second vertical lift together define a closed movement path that has a closed shape in a plane that extends along the vertical and longitudinal directions, and
    wherein each storage module is configured to translate its respective inventory storage containers around its respective closed movement path, without transferring storage containers outside of its respective closed movement path, until a desired one of its inventory storage containers is presented at one of its first and second module ends, independently of other ones of the inventory storage modules translating their respective inventory storage containers around their respective movement paths.

11. The storage system of claim 10, comprising at least one robotic manipulator disposed adjacent the first module ends, the at least one robotic manipulator configured to retrieve inventory items from the storage containers supported by the inventory storage modules of the at least one vertical stack of inventory storage modules.

12. The storage system of claim 10, wherein each of the first and second vertical lifts includes a conveyor surface, and the first and second vertical lifts are configured to move their respective conveyor surfaces between a raised position and a lowered position.

13. The storage system of claim 12, wherein, in the raised position, the conveyor surfaces are vertically aligned with the first conveyor segment of their respective storage modules, and in the lowered position, the conveyor surfaces are vertically aligned with the second conveyor segment of their respective storage modules.

14. The storage system of claim 10, wherein each lift actuator system includes a pair of lift actuator systems that are spaced from one another along a lateral direction that is perpendicular to the longitudinal direction, each track defines a conveyor surface, and each actuator is configured to move its respective conveyor surface between the lowered and raised positions.

15. The storage system of claim 14, wherein each storage module comprises a plurality of container carriers, each container carrier configured to carry at least one of the inventory storage containers, and the container carriers configured to engage the conveyor surfaces of the first lift actuator system of a respective one of the storage modules when a container carrier is supported by the first vertical lift of the respective one of the storage modules and engage the conveyor surfaces of the second vertical lift of the respective one of the storage modules when a container carrier is supported by the second vertical lift of the respective one of the storage modules.

16. The storage system of claim 10, where each of the at least one track has a portion being ramped relative to the longitudinal direction.

17. The storage system of claim 10, where each of the at least one actuators is a belt- or chain-driven actuator.

18. A method of operating a storage system configured to store inventory items, the method comprising:
- causing a desired inventory storage container to be identified from a plurality of inventory storage containers supported by the storage system;
- causing a location of the desired inventory storage container within the storage system to be identified by identifying a select storage module that supports the desired inventory storage container from a plurality of storage modules of the storage system that are stacked on top of one another, each storage module comprising a first conveyor segment, a second conveyor segment below the first conveyor segment, a first vertical lift at a first end of the storage module, and a second vertical lift at a second end of the storage module that together define a movement path that has a closed shape in a plane that extends along a vertical direction and a longitudinal direction;
- causing inventory storage containers supported by the select storage module to be translated around the movement path of the select storage module until the desired inventory storage container is presented at a desired one of the first and second ends of the select storage module, wherein at least one actuator of the first vertical lift translates a track of the first vertical lift along the vertical direction so as to move inventory storage containers between the first and second conveyor segments and at least one actuator of the second vertical lift translates a track of the second vertical lift along the vertical direction so as to move inventory storage containers between the first and second conveyor segments; and
- causing a robotic manipulator to move so as to retrieve or stow an inventory item from or into the desired inventory storage container.

19. The method of claim 18, wherein causing the inventory storage containers to be translated comprises:
- causing one of the first and second vertical lifts of the select storage module to move between a raised position and a lowered position so as to transfer at least one first inventory storage container from the first conveyor segment to the second conveyor segment; and
- causing another one of the first and second vertical lifts of the select storage module to move between a lowered position and a raised position so as to transfer at least one second inventory storage container from the second conveyor segment to the first conveyor segment.

20. The method of claim 19, wherein causing the inventory storage containers to be translated comprises:
- causing first and second actuators of the first vertical lift to translate first and second tracks of the first vertical lift along the vertical direction so as to move storage containers between the raised position and the lowered position; and
- causing first and second actuators of the second vertical lift to translate first and second tracks of the second vertical lift along the vertical direction so as to move a second conveyor surface between the lowered position and the raised position.

* * * * *